United States Patent
Moeller et al.

(10) Patent No.: US 11,691,597 B2
(45) Date of Patent: *Jul. 4, 2023

(54) SYSTEMATIC INTEGRATION VIA AN INTRUSION DETECTION DEVICE

(71) Applicant: Keep Technologies, Inc., Atlanta, GA (US)

(72) Inventors: David E. Moeller, Atlanta, GA (US); Rahul Maran, Atlanta, GA (US); Aditya Chavan, Atlanta, GA (US)

(73) Assignee: Keep Technologies, Inc., Atlanta, GA (US)

( * ) Notice: Subject to any disclaimer, the term of this patent is extended or adjusted under 35 U.S.C. 154(b) by 350 days.

This patent is subject to a terminal disclaimer.

(21) Appl. No.: 16/988,436

(22) Filed: Aug. 7, 2020

(65) Prior Publication Data

US 2021/0039601 A1    Feb. 11, 2021

Related U.S. Application Data

(60) Provisional application No. 62/883,875, filed on Aug. 7, 2019.

(51) Int. Cl.
*B60R 25/31*    (2013.01)
*B60R 25/30*    (2013.01)
(Continued)

(52) U.S. Cl.
CPC .............. *B60R 25/31* (2013.01); *B60R 1/00* (2013.01); *B60R 25/102* (2013.01);
(Continued)

(58) Field of Classification Search
CPC ....... B60R 25/31; B60R 25/102; B60R 25/33; B60R 25/245; B60R 25/34; B60R 25/406;
(Continued)

(56) References Cited

U.S. PATENT DOCUMENTS 4,249,160 A    2/1981 Chilvers
4,479,110 A  * 10/1984 Cipri ................... B60R 25/1003
                                                     340/430
(Continued)

FOREIGN PATENT DOCUMENTS

CN    1968561 A    5/2007
EP    0067256 A1   12/1982
(Continued)

OTHER PUBLICATIONS

Sandra Henderson, "Light-Based Burglar Alarm", Novus Light Today, Dec. 25, 2017.
(Continued)

*Primary Examiner* — Nay Tun
(74) *Attorney, Agent, or Firm* — Morris, Manning & Martin, LLP; Daniel E. Sineway, Esq.; Adam J. Thompson, Esq.

(57) ABSTRACT

A vehicle theft-prevention apparatus can include at least one computing device couple to a plurality of sensors and a wireless transceiver. The plurality of sensors can be configured to sense measurements proximate to a vehicle. The at least one computing device can be configured to read a plurality of first measurements of a first sensor of the plurality of sensors. Based on the plurality of first measurements from the first sensor, the at least one computing device can determine that a key fob moved outside of a range of the first sensor. In response to the key fob moving outside of the range of the first sensor, the at least one computing device can transition to an armed state. The at least one computing device can read a plurality of second measurements from a subset of the plurality of sensors. Based on the plurality of second measurements, the at least one computing device can determine that a person has entered the vehicle.

20 Claims, 34 Drawing Sheets

(51) Int. Cl.
| | |
|---|---|
| *B60R 25/102* | (2013.01) |
| *B60R 25/33* | (2013.01) |
| *B60R 25/10* | (2013.01) |
| *B60R 1/00* | (2022.01) |
| *G01V 11/00* | (2006.01) |
| *G06F 21/57* | (2013.01) |
| *B60R 25/25* | (2013.01) |
| *B60R 11/00* | (2006.01) |
| *B60R 25/34* | (2013.01) |
| *G01B 17/00* | (2006.01) |
| *G01J 5/00* | (2022.01) |
| *G01P 13/00* | (2006.01) |
| *B60R 25/24* | (2013.01) |
| *G06F 3/01* | (2006.01) |
| *G06F 3/16* | (2006.01) |
| *G06F 8/65* | (2018.01) |
| *G06Q 20/10* | (2012.01) |
| *G06Q 20/32* | (2012.01) |
| *G06Q 20/40* | (2012.01) |
| *G06Q 30/0601* | (2023.01) |
| *H04L 9/06* | (2006.01) |
| *H04L 9/08* | (2006.01) |
| *H04L 9/32* | (2006.01) |
| *H04W 4/021* | (2018.01) |
| *B60R 25/32* | (2013.01) |
| *G06T 7/174* | (2017.01) |
| *B60R 25/04* | (2013.01) |
| *G07C 9/00* | (2020.01) |
| *B60R 25/40* | (2013.01) |
| *G08B 21/18* | (2006.01) |
| *G06V 20/59* | (2022.01) |
| *G06V 40/16* | (2022.01) |
| *H04L 51/224* | (2022.01) |

(52) U.S. Cl.
CPC ........ *B60R 25/1009* (2013.01); *B60R 25/305* (2013.01); *B60R 25/33* (2013.01); *G01V 11/002* (2013.01); *G06F 21/572* (2013.01); *B60R 11/00* (2013.01); *B60R 25/04* (2013.01); *B60R 25/1003* (2013.01); *B60R 25/1004* (2013.01); *B60R 25/1018* (2013.01); *B60R 25/1025* (2013.01); *B60R 25/24* (2013.01); *B60R 25/245* (2013.01); *B60R 25/25* (2013.01); *B60R 25/307* (2013.01); *B60R 25/32* (2013.01); *B60R 25/34* (2013.01); *B60R 25/403* (2013.01); *B60R 25/406* (2013.01); *B60R 2011/0007* (2013.01); *B60R 2025/0405* (2013.01); *B60R 2025/1013* (2013.01); *B60R 2300/103* (2013.01); *B60R 2300/8006* (2013.01); *B60R 2300/8073* (2013.01); *B60R 2325/10* (2013.01); *B60R 2325/101* (2013.01); *B60R 2325/103* (2013.01); *B60R 2325/20* (2013.01); *B60R 2325/205* (2013.01); *G01B 17/00* (2013.01); *G01J 5/0025* (2013.01); *G01P 13/00* (2013.01); *G06F 3/017* (2013.01); *G06F 3/167* (2013.01); *G06F 8/65* (2013.01); *G06Q 20/102* (2013.01); *G06Q 20/3278* (2013.01); *G06Q 20/40145* (2013.01); *G06Q 30/0635* (2013.01); *G06T 7/174* (2017.01); *G06T 2207/10016* (2013.01); *G06V 20/59* (2022.01); *G06V 40/172* (2022.01); *G07C 9/00182* (2013.01); *G07C 2009/00396* (2013.01); *G07C 2009/00539* (2013.01); *G07C 2009/00769* (2013.01); *G07C 2009/00984* (2013.01); *G08B 21/182* (2013.01); *H04L 9/0643* (2013.01); *H04L 9/0869* (2013.01); *H04L 9/3231* (2013.01); *H04L 51/224* (2022.05); *H04L 2209/84* (2013.01); *H04W 4/021* (2013.01)

(58) Field of Classification Search
CPC .......... B60R 2325/10; B60R 2325/205; G07C 2009/00396; G07C 2009/00539; G07C 2009/00769; G08B 21/182
See application file for complete search history.

(56) References Cited

U.S. PATENT DOCUMENTS

| | | | |
|---|---|---|---|
| 4,866,417 A | 9/1989 | DeFino et al. | |
| 4,996,515 A | 2/1991 | Schaffer et al. | |
| 5,005,004 A | 4/1991 | Udofot | |
| 5,079,538 A * | 1/1992 | DeFino | B60R 25/1003 |
| | | | 340/429 |
| 5,258,741 A | 11/1993 | Fuller | |
| 5,323,140 A * | 6/1994 | Boyles | B60R 25/1018 |
| | | | 340/426.22 |
| 5,334,969 A * | 8/1994 | Abe | B60R 25/1009 |
| | | | 180/173 |
| 5,495,243 A | 2/1996 | McKenna | |
| 5,534,845 A | 7/1996 | Issa et al. | |
| 5,602,535 A * | 2/1997 | Boyles | B60R 25/24 |
| | | | 340/5.72 |
| 5,663,704 A * | 9/1997 | Allen | G07C 9/00182 |
| | | | 340/426.25 |
| 5,869,908 A * | 2/1999 | Moczygemba | G07C 9/00182 |
| | | | 180/287 |
| 5,927,370 A | 7/1999 | Judkins | |
| 6,028,511 A | 2/2000 | Peterson et al. | |
| 6,094,148 A | 7/2000 | Henry et al. | |
| 6,243,022 B1 * | 6/2001 | Furukawa | G07C 9/00182 |
| | | | 340/13.31 |
| 6,539,358 B1 * | 3/2003 | Coon | G06F 1/1632 |
| | | | 704/E15.045 |
| 6,827,318 B1 * | 12/2004 | Hsu Li | F16M 13/02 |
| | | | 224/558 |
| 7,319,378 B1 | 1/2008 | Thompson et al. | |
| 7,532,107 B2 * | 5/2009 | Hara | B60R 25/00 |
| | | | 307/10.6 |
| 8,049,602 B2 | 11/2011 | Bauer et al. | |
| 8,054,200 B1 | 11/2011 | Nelson | |
| 8,145,821 B2 * | 3/2012 | Mead | G06F 1/1632 |
| | | | 361/679.55 |
| 8,217,774 B2 * | 7/2012 | Elias | E05B 77/28 |
| | | | 340/5.72 |
| 9,315,152 B1 | 4/2016 | Maestas et al. | |
| 9,592,795 B1 | 3/2017 | Whiteside | |
| 9,738,254 B2 | 8/2017 | Shigetomi | |
| 9,747,795 B1 * | 8/2017 | Espinosa | G08B 15/00 |
| 9,988,014 B2 * | 6/2018 | Parasurama | B60R 25/1001 |
| 10,304,319 B2 | 5/2019 | Sager et al. | |
| 10,358,115 B2 * | 7/2019 | Jeong | B60R 25/102 |
| 10,906,379 B1 * | 2/2021 | O'Brien | B60H 1/2225 |
| 11,213,119 B1 * | 1/2022 | Mohammed | A46B 5/0058 |
| 2003/0189480 A1 * | 10/2003 | Hamid | G08C 17/00 |
| | | | 340/5.52 |
| 2004/0148083 A1 * | 7/2004 | Arakawa | G07C 5/085 |
| | | | 701/50 |
| 2004/0160314 A1 * | 8/2004 | Utter | B60R 25/102 |
| | | | 307/10.3 |
| 2005/0237166 A1 * | 10/2005 | Chen | B60R 25/1003 |
| | | | 455/99 |
| 2005/0279869 A1 * | 12/2005 | Barklage | B60N 3/00 |
| | | | 241/236 |
| 2006/0244577 A1 | 11/2006 | Tanaka | |
| 2007/0025527 A1 | 2/2007 | Eichenseer | |
| 2007/0200691 A1 | 8/2007 | Lam | |
| 2007/0236364 A1 * | 10/2007 | Hubbard | B60R 1/00 |
| | | | 348/148 |
| 2007/0281619 A1 * | 12/2007 | Chen | H04M 1/6091 |
| 2009/0017756 A1 | 1/2009 | Tsfaty | |

(56) References Cited

U.S. PATENT DOCUMENTS

| | | |
|---|---|---|
| 2009/0024274 A1 | 1/2009 | Nagai |
| 2009/0069954 A1* | 3/2009 | Aladesuyi .............. B60R 25/33 701/2 |
| 2010/0332084 A1* | 12/2010 | Chiu ....................... B60R 25/00 701/45 |
| 2011/0149078 A1 | 6/2011 | Fan et al. |
| 2011/0316682 A1 | 12/2011 | Pan Clement |
| 2012/0313750 A1* | 12/2012 | Au ......................... G08C 17/02 340/5.61 |
| 2014/0306799 A1 | 10/2014 | Ricci |
| 2015/0077253 A1* | 3/2015 | Spahl ................. G07C 9/00182 340/568.1 |
| 2015/0178532 A1* | 6/2015 | Brule .................... G06Q 20/321 705/41 |
| 2015/0266451 A1 | 9/2015 | Oohara |
| 2017/0066406 A1 | 3/2017 | Ricci |
| 2017/0136989 A1 | 5/2017 | Haber |
| 2017/0197583 A1 | 7/2017 | Izraeii |
| 2017/0270295 A1 | 9/2017 | Park |
| 2017/0372537 A1* | 12/2017 | Zielinski .................. H04K 3/46 |
| 2018/0072263 A1 | 3/2018 | Green |
| 2018/0139485 A1 | 5/2018 | Ansari |
| 2018/0268532 A1 | 9/2018 | Wang |
| 2018/0366965 A1* | 12/2018 | Ghabra ................. H02J 7/0048 |
| 2019/0001812 A1 | 1/2019 | Moore |
| 2019/0037307 A1 | 1/2019 | Zimmerman |
| 2019/0095662 A1* | 3/2019 | Wilding ............. G06K 7/10366 |
| 2019/0337483 A1 | 11/2019 | Winston |
| 2020/0086785 A1* | 3/2020 | Lee ........................ G08B 21/22 |
| 2020/0099168 A1 | 3/2020 | Inoue |
| 2020/0130604 A1* | 4/2020 | Macneil .................. H04M 1/04 |
| 2020/0160633 A1 | 5/2020 | Zhang |
| 2020/0172050 A1 | 6/2020 | Schwarz |
| 2020/0189501 A1* | 6/2020 | Kim ........................ G10L 15/07 |
| 2020/0189522 A1* | 6/2020 | An ........................... B60Q 1/50 |
| 2020/0193132 A1 | 6/2020 | Schwetz |

FOREIGN PATENT DOCUMENTS

| | | |
|---|---|---|
| GB | 2222289 A | 2/1990 |
| KR | 0137733 B1 | 6/1998 |

OTHER PUBLICATIONS

Alibaba, "Easy install cigarette lighte gps tracker car alarm with car charger", https://www.alibaba.com/product-detail/Easy-install-cigarette-lighter-gps-tracker_62004216393.html?spm=a2700.7724857.normalList.2.45ed6273wy8hVS, Jul. 16, 2019.

Stickable car alarm, https://community.particle.io/t/stickable-car-alarm/14101, Aug. 2015.

Non-final Office Action from U.S. Appl. No. 16/988,465 dated Sep. 17, 2020.

Non-final Office Action from U.S. Pat. App. No. 481 dated Sep. 21, 2020.

* cited by examiner

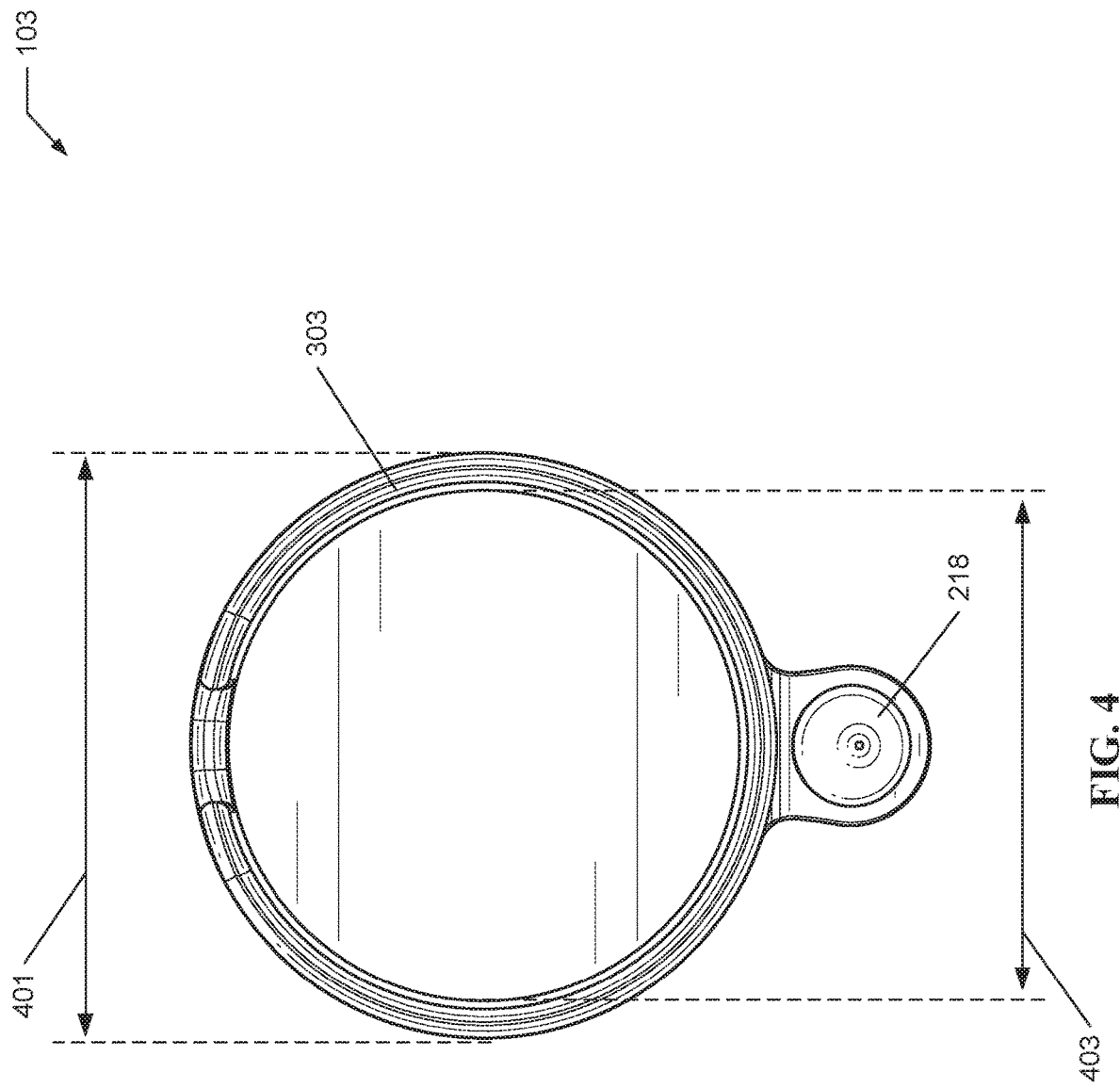

SYSTEMATIC INTEGRATION VIA AN INTRUSION DETECTION DEVICE

CROSS-REFERENCE TO RELATED APPLICATION

This application claims the benefit of and priority to U.S. Patent Application No. 62/883,875, filed Aug. 7, 2019, titled "SYSTEMS, METHODS, AND APPARATUSES FOR AUTOMOBILE ACCESS AND INTRUSION DETECTION," which is incorporated herein by reference in its entirety.

TECHNICAL FIELD

The present disclosure relates generally to systems, methods, apparatuses, and devices for detecting intrusions, and more particularly to detecting, monitoring, and preventing intrusions in a vehicle.

BACKGROUND

Previous approaches to intrusion detection systems for vehicles generally include outdated technology, such as switches built into door locks, for detecting entry into a locked vehicle. The typical response to detecting such entry is sounding an alarm sourced from the vehicle; however, the alarm is only made known to those within a close proximity to the vehicle to hear the alarm, and is frequently not effective for alerting the vehicle owner of the intrusion. Furthermore, environmental factors (e.g., loud noises, strong winds, etc.) frequently cause false alarms, which creates confusion for automobile owners and nearby pedestrians, and also has led to desensitivity to audio-only car alarms. In addition, previous alarm systems may only be controllable onsite and, thus, a user may be unable to deactivate, activate, or monitor the alarm system remotely.

Therefore, there exists a long-felt but unresolved need for improved systems, methods, and apparatuses for automobile access and intrusion detection.

BRIEF SUMMARY OF THE DISCLOSURE

Briefly described, and according to one embodiment, aspects of the present disclosure generally relate to intrusion detection systems.

In one embodiment, the intrusion detection system includes one or more security devices configured to communicate with a computing environment and/or a mobile application running on a mobile device, such as a smartphone. The security device can be installed within or on a vehicle and can include one or more sensors for detecting activities in and around the vehicle. The security device, computing environment, and/or mobile application can analyze readings from the sensor to determine if a potential intrusion event is about to occur or has already occurred. Generally, an intrusion event refers to a human presence (authorized or unauthorized) within a vehicle or within a predetermined proximity to the vehicle.

According to various aspects of the present disclosure, the system includes one or more sensors that can be located throughout a vehicle and/or integrated into a security device, each sensor being configured for communication over a network. The sensors may include passive infrared ("PIR") sensors, audio sensors, video sensors (e.g., wide-angle and high-definition video cameras), microwave sensors, GPS sensors, radar sensors, other motion detection sensors, etc.

In some embodiments, in response to one or more of the sensors detecting a trigger event, an alarm state may be initiated at the security device, wherein the alarm state causes the device to emit a sound and/or transmit a notification to the mobile device for presenting an alert relating to the detected trigger event. The detected trigger event could be a noise detected within the monitored automobile (e.g., sound from a shattered window), body heat detected via the PIR sensor, an opened door detected via a radar sensor, etc. In certain embodiments, sound from shattering a window is typically within a certain decibel and frequency range, which can be detected by the audio sensor. Thus, in various embodiments, the system can process noises to recognize a shattered window with relatively high confidence, and not mistake a different loud noise (such as other cars honking) as an intrusion.

In one example scenario, if the PIR sensor detects body heat within the automobile, the PIR sensor may transmit a command to the system processor for entering the alarm state. In various embodiments, the alarm state may initiate an audible alarm at the device/apparatus in the automobile for deterring the intruder, initiate recording of the interior (and/or exterior) of the automobile via the video sensor, and transmit notice of the alarm state to the one or more mobile computing devices associated with the apparatus. In a particular embodiment, transmitting notice of the alarm state to the one or more mobile computing devices may include transmitting a message (e.g., SMS or the like) to the mobile computing device, where the message includes a text description relating to the alarm state. In certain embodiments, the message is received at a mobile application, where a user may access the message and furthermore establish a real-time session for receiving data from the sensors. This real-time session can include an audio and video stream of the monitored area (e.g., the automobile interior), or other data readings. The real-time session can be automatically initiated at the mobile application in response to the security device detecting a potential event and/or upon the security device being configured to an alarm or other particular state.

In some embodiments, the security device and/or sensors are calibrated based on a profile of a vehicle in which they are installed. For example, frequency thresholds for audio sensors can be lowered based on a profile of the vehicle that indicates the windows thereof are thicker than windows of vehicles of other makes (e.g., and thus corresponding to a lower frequency sound being emitted during breakage). In at least one embodiment, the security device is configured to communicate with one or more external systems including, but not limited to, manufacturer services systems or emergency systems, such as UConnect® or OnStar®, ecommerce systems, such as online retailers or point-of-sale devices, and Internet-of-Things systems, such as smart speakers, appliances, garages, etc.

According to a first aspect, a vehicle theft-prevention apparatus, comprising: A) a first portion of a cylindrical body; B) a second portion of the cylindrical body, the first portion configured to rotate about the second portion; C) a locking mechanism configured to: 1) engage based on rotation of the first portion relative to the second portion in a first direction, and 2) disengage based on a rotation of the first portion relative to the second portion in a second direction; and D) a slip clutch mechanism configured to prevent the locking mechanism from further engaging from rotation in the first direction relative to the second portion based on a magnitude of force applied.

According to a further aspect, the vehicle theft-prevention apparatus of the first aspect or any other aspect, wherein the cylindrical body is configured to mount in a cup holder of a vehicle.

According to a further aspect, the vehicle theft-prevention apparatus of the first aspect or any other aspect, wherein the locking mechanism is configured to engage by providing an outward force on the cup holder and the slip clutch mechanism prevents a magnitude of the outward force from meeting or exceeding a predefined threshold.

According to a further aspect, the vehicle theft-prevention apparatus of the first aspect, further comprising: A) a plurality of sensors disposed within the cylindrical body; and B) at least one computing device in communication with the plurality of sensors and disposed within the cylindrical body, wherein the at least one computing device is configured to: 1) enter into an armed mode; 2) determine an intrusion into a vehicle while in the armed mode based at least in part on measurements from the plurality of sensors; and 3) generate an alarm in response to the intrusion.

According to a further aspect, the vehicle theft-prevention apparatus of the first aspect or any other aspect, further comprises a plurality of legs configured to extend outward as the first portion is rotated relative to the second portion in the first direction.

According to a further aspect, the vehicle theft-prevention apparatus of the first aspect or any other aspect, wherein each of the plurality of legs comprises a first material at a distal end with a coefficient of friction greater than that of a second material of the plurality of legs.

According to a second aspect, a device for use in a vehicle, comprising: A) a first portion of a body; B) a second portion of the body, the first portion configured to rotate about the second portion; C) a locking mechanism embedded within the second portion and configured to: 1) extend at least one leg based on rotation of the first portion relative to the second portion in a first direction; and 2) retract the at least one leg based on a rotation of the first portion relative to the second portion in a second direction; and 3) a clutch mechanism embedded within the body and configured to prevent the locking mechanism from further extending the at least one leg from rotation in the first direction relative to the second portion based on a magnitude of force applied.

According to a further aspect, the device of the second aspect or any other aspect, wherein the clutch mechanism comprises: a first disk and a second disk configured to rotate about an axis of rotation of the first portion and the second portion.

According to a further aspect, the device of the second aspect or any other aspect, further comprising a third disk coupled to a cam and mechanically coupled to the first portion of the body, the third disk comprising at least one pin and being configured to: A) move between a first position and a second position along the axis of rotation based on a movement of the cam; B) cause the at least one pin to pass through at least one aperture in the first disk when moving from the first position to the second position; and C) cause the at least one pin to retract from the at least one aperture in the first disk when moving from the second position to the first position, wherein the first disk rotates responsive to a rotation of the first portion relative to the second portion when the at least one pin passes through the at least one aperture, and the first disk remains stationary responsive to a rotation of the first portion relative to the second portion when the at least one pin is retracted from the at least one aperture.

According to a further aspect, the device of the second aspect or any other aspect, wherein the first disk comprises a protrusion configured to: A) contact an inclined plane of the second disk when the first portion rotates relative to the second portion in the first direction; B) apply a force to the inclined plane according to a force applied to the first portion to rotate relative to the second portion; and C) cause a rotation of the second disk based on the force applied to the incline plane.

According to a further aspect, the device of the second aspect or any other aspect, wherein the protrusion is configured to contact a second inclined plane of the second disk when the first portion rotates relative to the second portion in the second direction.

According to a further aspect, the device of the second aspect or any other aspect, wherein an angle of friction of the inclined plane is less than an angle of friction of the second inclined plane.

According to a further aspect, the device of the second aspect or any other aspect, wherein the protrusion comprises a spring and the clutch mechanism prevents the locking mechanism from further extending by the at least one leg based on the magnitude of force by: A) compressing the spring based on a vertical component of the force applied to the inclined plane until the magnitude of the force meeting or exceeding the threshold; and B) causing the protrusion to traverse the inclined plane based on a movement of the protrusion.

According to a third aspect, a method for securing a theft-prevention apparatus into a vehicle, comprising: A) inserting the theft-prevention apparatus into a cup holder of the vehicle; B) rotating a first portion of a theft-prevention apparatus relative to a second portion of the theft-prevention apparatus; C) extending at least one protrusion outward from a body of the theft-prevention apparatus in a direction substantially perpendicular to an axis of rotation of the first portion about the second portion; and D) triggering a clutch mechanism when a force of rotation of the first portion about the second portion meets or exceeds a predetermined threshold.

According to a further aspect, the method of the third aspect or any other aspect, wherein extending the at least one protrusion outward comprises moving the at least one protrusion along an elongated track to guide the at least one protrusion outward from the body of the theft-prevention apparatus.

According to a further aspect, the method of the third aspect or any other aspect, further comprising translating, via the clutch mechanism, a rotational motion of the first portion into a linear motion of the at least one protrusion.

According to a further aspect, the method of the third aspect or any other aspect, wherein the at least one protrusion comprises a plurality of legs configured to apply an outward force against an interior facing surface of the cup holder.

According to a further aspect, the method of the third aspect or any other aspect, further comprising: A) receiving, via at least one computing device, a request from a network to disable engagement of a locking mechanism of the theft-prevention apparatus, the locking mechanism comprising the first portion, the second portion, and the clutch mechanism; and B) in response to the request, rotating a cam to retract at least one pin from at least one aperture of the clutch mechanism.

According to a further aspect, the method of the third aspect or any other aspect, further comprising: A) receiving, via at least one computing device, a request from a network to enable engagement of a locking mechanism of the theft-prevention apparatus, the locking mechanism comprising the first portion, the second portion, and the clutch mechanism; and B) in response to the request, rotating a cam to extend at least one pin into at least one aperture of the clutch mechanism.

According to a further aspect, the method of the third aspect or any other aspect, wherein the at least one protrusion extends outward through at least one slot in the body.

According to a fourth aspect, a vehicle theft-prevention apparatus, comprising: A) a first portion of a cylindrical body; B) a second portion of the cylindrical body, the first portion configured to rotate about the second portion; C) a locking mechanism; and D) at least one computing device configured to: 1) determine that the locking mechanism has transitioned from an unlocked state to a locked state; 2) in response to determining that the locking mechanism has transitioned to the locked state, disable an engaging component of the locking mechanism; 3) receive, via a network, a command to enable the engaging component; and 4) in response to receiving the command, enabling the engaging component of the locking mechanism.

According to a further aspect, the vehicle theft-prevention apparatus of the fourth aspect or any other aspect, wherein the at least one computing device comprises a processor and a memory embedded within the vehicle theft-prevention apparatus.

According to a further aspect, the vehicle theft-prevention apparatus of the fourth aspect or any other aspect, wherein the locking mechanism comprises a cam motor and the at least one computing device is configured to disable the engaging component of the locking mechanism by transmitting an electrical signal to cause the cam motor to rotate a cam.

According to a further aspect, the vehicle theft-prevention apparatus of the fourth aspect or any other aspect, wherein the cam is configured to lift at least one pin from at least one aperture to mechanically decouple the first portion from a plurality of legs.

According to a further aspect, the vehicle theft-prevention apparatus of the fourth aspect or any other aspect, wherein the locking mechanism is configured to: A) disengage the lock based on a rotation of the first portion relative to the second portion in a first direction when the engaging component is enabled; and B) remain engaged based on a rotation of the first portion relative to the second portion in a first direction when the engaging component is disabled.

According to a further aspect, the vehicle theft-prevention apparatus of the fourth aspect or any other aspect, wherein the locking mechanism is configured to: A) engage the lock based on a rotation of the first portion relative to the second portion in a second direction when the engaging component is enabled; and B) remain engaged based on a rotation of the first portion relative to the second portion in the second direction when the engaging component is disabled.

According to a further aspect, the vehicle theft-prevention apparatus of the fourth aspect or any other aspect, wherein the at least one computing device is configured to determine that the locking mechanism has transitioned from the unlocked state to the locked state responsive to receiving a command over a network from a mobile computing device.

According to a further aspect, the vehicle theft-prevention apparatus of the fourth aspect or any other aspect, wherein the at least one computing device is configured to determine that the locking mechanism has transitioned from the locked state to the unlocked state responsive to receiving a second command over the network from the mobile computing device.

According to a further aspect, the vehicle theft-prevention apparatus of the fourth or any other aspect, wherein the at least one computing device is configured to determine that the locking mechanism has transitioned from the unlocked state to the locked state in response to determining that a clutch mechanism has slipped.

According to a further aspect, the vehicle theft-prevention apparatus of the fourth aspect or any other aspect, wherein the at least one computing device is further configured to: A) determine that a mobile computing device is within a predetermined distance from the vehicle theft-prevention apparatus; and B) enable the engaging component in response to the mobile computing device being within the predetermined distance.

According to a further aspect, the vehicle theft-prevention apparatus of the fourth aspect or any other aspect, wherein the at least one computing device is further configured to: A) determine that a mobile computing device is outside of a predetermined distance from the vehicle theft-prevention apparatus; and B) disable the engaging component in response to the mobile computing device being outside of the predetermined distance.

According to a further aspect, the vehicle theft-prevention apparatus of the fourth aspect or any other aspect, wherein the at least one computing device is further configured to: A) determine that a key fob is within a predetermined distance from the vehicle theft-prevention apparatus; and B) enable the engaging component in response to the key fob being within the predetermined distance.

According to a fifth aspect, a vehicle theft-prevention system, comprising: A) a mobile software application that, when executed by at least one first computing device, causes the at least one first computing device to: 1) receive a request to disable an engagement component of a locking mechanism of a theft-prevention device; and 2) send a command to the theft-prevention device to disable the engagement component; and B) the theft-prevention device comprising: 1) the locking mechanism comprising the engagement component; and 2) at least one second computing device configured to: 1) receive the command to disable the engagement component from the at least one first computing device; and 2) in response to receiving the command, disable the engagement component of the locking mechanism.

According to a further aspect, the vehicle theft-prevention system of the fifth aspect or any other aspect, wherein the theft-prevention device further comprises: A) a first portion of a body; and B) a second portion of the body, the first portion configured to rotate about the second portion.

According to a further aspect, the vehicle theft-prevention system of the fifth aspect or any other aspect, wherein the locking mechanism is configured to: A) cause a plurality of legs to extend in response to a rotation of the first portion relative to the second portion in a first direction when the engagement component is enabled; and B) cause the plurality of legs to remain stationary in response to a rotation of the first portion relative to the second portion in the first direction when the engagement component is disabled.

According to a further aspect, the vehicle theft-prevention system of the fifth aspect or any other aspect, wherein the locking mechanism is configured to: A) cause the plurality of legs to retract in response to a rotation of the first portion relative to the second portion in a second direction when the engagement component is enabled; and B) cause the plurality of legs to remain stationary in response to a rotation of the first portion relative to the second portion in the second direction when the engagement component is disabled.

According to a further aspect, the vehicle theft-prevention system of the fifth aspect or any other aspect, wherein the engagement component comprises a cam motor configured to rotate a cam, the cam being configured to pull a plurality of pins from within a plurality of apertures to mechanically decouple a first portion from a plurality of legs.

According to a further aspect, the vehicle theft-prevention system of the fifth aspect or any other aspect, wherein the engagement component comprises a cam motor configured to rotate a cam, and the cam is configured to push a plurality of pins into a plurality of apertures to mechanically couple a first portion to a plurality of legs.

According to a sixth aspect, a method of disengaging a locking mechanism, comprising: A) rotating a first portion of a vehicle theft-prevention apparatus in a first direction relative to a second portion; B) extending, via a locking mechanism, a plurality of legs to secure the vehicle theft-prevention apparatus into a cup holder of a vehicle based on the first portion rotating relative to the second portion; and C) subsequent to extending the plurality of legs, mechanically decoupling the first portion from the plurality of legs.

According to a further aspect, the method of the sixth aspect or any other aspect, further comprising: A) preventing movement of the plurality of legs when the plurality of pins are retracted from the plurality of apertures; and B) retracting the plurality of legs in response to a rotation of the first portion relative to the second portion when the plurality of pins are inserted into the plurality of apertures.

According to a seventh aspect, a vehicle theft-prevention apparatus, comprising: A) a first sensor configured to sense a first type of measurement; B) a second sensor configured to sense a second type of measurement; C) at least one computing device coupled to the first sensor and second sensor, the at least one computing device configured to: 1) read a plurality of measurements of the first type of measurement from the first sensor at a predetermined frequency from within a vehicle; 2) in response to one of the plurality of measurements meeting a predetermined threshold, read at least one measurement from the second sensor in the vehicle; and 3) determining that the one of the plurality of measurements meeting or exceeding the predetermined threshold corresponds to a false positive based on the at least one measurement from the second sensor.

According to a further aspect, the vehicle theft-prevention apparatus of the seventh aspect or any other aspect, wherein the first sensor is a passive infrared (PIR) sensor and the second sensor is one of: a microwave sensor or an ultrasound sensor.

According to a further aspect, the vehicle theft-prevention apparatus of the seventh aspect or any other aspect, wherein a power usage of the first sensor when performing measurements is less than a power usage of the second sensor when performing measurements.

According to a further aspect, the vehicle theft-prevention apparatus of the seventh aspect or any other aspect, wherein the second sensor is disabled until the one of the plurality of measurements meets the predetermined threshold and the at least one computing device is further configured to enable the second sensor responsive to the predetermined threshold being met.

According to a further aspect, the vehicle theft-prevention apparatus of the seventh aspect or any other aspect, wherein a power usage of the apparatus is greater when the second sensor is enabled.

According to a further aspect, the vehicle theft-prevention apparatus of the seventh aspect or any other aspect, wherein the at least one computing device is further configured to configure a sensitivity for the first sensor and the second sensor based on a downloaded profile.

According to an eighth aspect, a vehicle theft-prevention apparatus, comprising: A) a first sensor configured to sense a first type of measurement; B) a second sensor configured to sense a second type of measurement; C) at least one computing device coupled to the first sensor and second sensor, the at least one computing device configured to: 1) read a plurality of measurements of the first type of measurement from the first sensor at a predetermined frequency from within a vehicle; 2) in response to one of the plurality of measurements meeting or exceeding a predetermined threshold, read at least one measurement from the second sensor within the vehicle; and 3) determining that the one of the plurality of measurements meeting or exceeding the predetermined threshold does not correspond to a false positive based on the at least one measurement from the second sensor.

According to a further aspect, the vehicle theft-prevention apparatus of the eighth aspect or any other aspect, wherein the at least one computing device is further configured to: A) receive a profile corresponding to a type of the vehicle; and B) configure a sensitivity for at least one of the first sensor and the second sensor based on the profile.

According to a further aspect, the vehicle theft-prevention apparatus of the eighth aspect or any other aspect, further comprising a battery device configured to power the vehicle theft-prevention apparatus.

According to a ninth aspect, a method for detecting a vehicle intrusion, comprising: A) reading, via a first sensor, a plurality of measurements of a first type at a predetermined frequency from within a vehicle; B) responsive to at least one of the plurality of measurements meeting a threshold, reading, via a second sensor, at least one measurement of a second type; and C) determining whether the at least one of the plurality of measurements meeting the threshold corresponds to a false positive based on the at least one measurement of the second type.

According to a further aspect, the method of the ninth aspect or any other aspect, further comprising initiating a warning action in response to a false positive.

According to a further aspect, the method of the ninth aspect or any other aspect, wherein the first sensor and the second sensor are enclosed within a vehicle theft-prevention apparatus.

According to a further aspect, the method of the ninth aspect or any other aspect, wherein the first sensor is a passive infrared (PIR) sensor and the second sensor is one of: a microwave sensor or an ultrasound sensor.

According to a further aspect, the method of the ninth aspect or any other aspect, wherein a power usage of the first sensor when performing measurements is less than a power usage of the second sensor when performing measurements.

According to a further aspect, the method of the ninth aspect or any other aspect, further comprising disabling the second sensor until the one of the plurality of measurements meets the predetermined threshold.

According to a further aspect, the method of the ninth aspect or any other aspect, further comprising enabling the second sensor responsive to the predetermined threshold being met.

According to a further aspect, the method of the ninth aspect or any other aspect, further comprising: A) receiving a selection of a make and model of the vehicle; and B) determining at least one profile corresponding to the make and model of the vehicle.

According to a further aspect, the method of the ninth aspect or any other aspect, further comprising: A) downloading the at least one profile; B) setting a first sensor sensitivity for the first sensor based on the profile; and C) setting a second sensor sensitivity for the second sensor based on the profile.

According to a further aspect, the method of the ninth aspect or any other aspect, further comprising: A) determining that a plurality of profiles correspond to the make and model of the vehicle; B) receiving a selection of a specific one of the plurality of profiles; and C) configuring at least one property for detecting the vehicle intrusion based on the selection.

According to a further aspect, the method of the ninth aspect or any other aspect, further comprising generating a user interface comprising a plurality of profiles and a plurality of metadata individually corresponding to a respective one of the plurality of profiles, wherein the selection is received via the user interface.

According to a tenth aspect, a vehicle theft-prevention apparatus, comprising: A) a first sensor configured to sense a first type of measurement in a vehicle; B) a second sensor configured to sense a second type of measurement in the vehicle; C) at least one computing device coupled to the first sensor and second sensor, the at least one computing device configured to: 1) read a plurality of measurements of the first type of measurement from the first sensor at a predetermined frequency; 2) in response to one of the plurality of measurements meeting or exceeding a predetermined threshold, read at least one measurement from the second sensor; and 3) determine that a person has entered the vehicle based on the at least one measurement from the second sensor.

According to a further aspect, the vehicle theft-prevention apparatus of the tenth aspect or any other aspect, wherein the at least one measurement comprises an image, the second sensor comprises a camera, and the at least one computing device is further configured to perform image recognition on the image to detect the person in the vehicle.

According to a further aspect, the vehicle theft-prevention apparatus of the tenth aspect or any other aspect, wherein the at least one computing device is further configured to: A) process a plurality of images from a video stream of the camera; and B) identify a face in at least one of the plurality of images.

According to a further aspect, the vehicle theft-prevention apparatus of the tenth aspect or any other aspect, wherein the at least one computing device is further configured to: A) determine a plurality of characteristics about the face based on at least one facial recognition algorithm; and B) search a data store to determine an identification of the face based on the plurality of characteristics.

According to a further aspect, the vehicle theft-prevention apparatus of the tenth aspect or any other aspect, further comprising: A) a first portion of a body; B) a second portion of the body, the first portion configured to rotate about the second portion; and C) a locking mechanism embedded within the second portion.

According to a further aspect, the vehicle theft-prevention apparatus of the tenth aspect or any other aspect, wherein the locking mechanism is configured to: A) extend at least one leg based on rotation of the first portion relative to the second portion in a first direction, and B) retract the at least one leg based on a rotation of the first portion relative to the second portion in a second direction.

According to a further aspect, the vehicle theft-prevention apparatus of the tenth aspect or any other aspect, the at least one computing device configured to: A) in response to one of the plurality of measurements meeting or exceeding a predetermined threshold, read at least one second measurement from a third sensor; and B) determine that a person has entered the vehicle further based on the at least one second measurement from the third sensor.

According to a further aspect, the vehicle theft-prevention apparatus of the tenth aspect or any other aspect, the at least one computing device configured to: A) in response to one of the plurality of measurements meeting or exceeding a predetermined threshold, read at least one third measurement from a fourth sensor; and B) determine that a person has entered the vehicle further based on the at least one third measurement from the fourth sensor.

According to an eleventh aspect, a vehicle theft-prevention system, comprising: A) at least one service; and B) a sensing device comprising: 1) a first sensor configured to sense a first type of measurement in a vehicle; 2) a second sensor configured to sense a second type of measurement in the vehicle; 3) at least one computing device coupled to the first sensor and second sensor, the at least one computing device configured to: i) read a plurality of measurements of the first type of measurement from the first sensor at a predetermined frequency; ii) read a plurality of second measurements of the second type of measurement from the second sensor at a predetermined frequency; and iii) send an indication that a person has entered the vehicle to the at least one service based on the plurality of measurements and the plurality of second measurements.

According to a further aspect, the vehicle theft-prevention system of the eleventh aspect or any other aspect, wherein the at least one service is configured to: A) receive the indication that a person has entered the vehicle; and B) push a notification of a break-in to at least one user device.

According to a further aspect, the vehicle theft-prevention system of the eleventh aspect or any other aspect, wherein the at least one service is configured to: A) receive the indication that a person has entered the vehicle; B) receive a video stream from the sensing device; and C) stream the video stream to at least one user device.

According to a further aspect, the vehicle theft-prevention system of the eleventh aspect or any other aspect, further comprising: A) a body; and B) a clutch mechanism embedded within the body and configured to prevent a locking mechanism from further extending at least one leg based on a magnitude of force applied.

According to a further aspect, the vehicle theft-prevention system of the eleventh aspect or any other aspect, wherein the at least one computing device configured to determine that a person has entered the vehicle based on the plurality of measurements and the plurality of second measurements.

According to a twelfth aspect, a method for preventing theft in a vehicle, comprising: A) reading, via a first sensor, a plurality of measurements of a first type in a vehicle; B) reading, via a second sensor, a plurality of second measurements of a second type in the vehicle; and C) determining that a person has entered the vehicle based on at least one measurement from each of the plurality of measurements and the plurality second measurements.

According to a further aspect, the method of the twelfth aspect or any other aspect, wherein the second sensor comprises a temperature sensor and a person is determined to have entered the vehicle in response to a rate of change of temperature meeting or exceeding a threshold.

According to a further aspect, the method of the twelfth aspect or any other aspect, wherein the second sensor comprises a thermal imaging sensor and a person is determined to have entered the vehicle in response to identifying a thermal change in the vehicle that meets or exceeds a threshold.

According to a further aspect, the method of the twelfth aspect or any other aspect, wherein the second sensor comprises an air pressure sensor and a person is determined to have entered the vehicle in response to a rate of change in air pressure in the vehicle meeting a threshold.

According to a further aspect, the method of the twelfth aspect or any other aspect, wherein the second sensor comprises a humidity sensor and a person is determined to have entered the vehicle in response to a change in humidity in the vehicle.

According to a further aspect, the method of the twelfth aspect or any other aspect, further comprising reading, via a third sensor, a plurality of third measurements of a third type in the vehicle, wherein determining that the person has entered the vehicle is further based on the plurality of third measurements.

According to a further aspect, the method of the twelfth aspect or any other aspect, further comprising reading, via a fourth sensor, a plurality of fourth measurements of a fourth type in the vehicle, wherein determining that the person has entered the vehicle is further based on the plurality of fourth measurements.

According to a thirteenth aspect, a vehicle theft-prevention apparatus, comprising: A) a plurality of sensors configured to sense measurements proximate to a vehicle; B) a wireless transceiver; and C) at least one computing device coupled to the plurality of sensors and the wireless transceiver, the at least one computing device configured to: 1) read a plurality of measurements of the plurality of sensors; 2) determine that at least one event has occurred based on the plurality of measurements; 3) store data corresponding to the at least one event on a local storage coupled to the at least one computing device; and 4) transmit, via the wireless transceiver, the data corresponding to the at least one event to a remote service.

According to a further aspect, the vehicle theft-prevention apparatus of the thirteenth aspect or any other aspect, wherein the at least one computing device is further configured to capture data from at least on additional sensor in response to determining that the at least one event has occurred.

According to a further aspect, the vehicle theft-prevention apparatus of the thirteenth aspect or any other aspect, wherein the at least one computing device is further configured to: A) enable the wireless transceiver before transmitting the data; and B) disable the wireless transceiver after transmitting the data stored in the local storage to avoid interference with the plurality of sensors.

According to a further aspect, the vehicle theft-prevention apparatus of the thirteenth aspect or any other aspect, wherein the at least one computing device is further configured to: A) continuously capture a threshold duration of video data in a buffer in real time; and B) in response to determining the at least one event has occurred, retrieve a segment of the video data comprising a start of the at least one event, wherein the data stored on the local storage comprises the segment of the video data.

According to a further aspect, the vehicle theft-prevention apparatus of the thirteenth aspect or any other aspect, wherein the segment of the video data comprises a second threshold duration of video data before the start of the at least one event.

According to a further aspect, the vehicle theft-prevention apparatus of the thirteenth aspect or any other aspect, further comprising a slip clutch mechanism configured to prevent a locking mechanism from further engaging when a magnitude of force applied meets or exceeds a threshold.

According to a fourteenth aspect, a method of preventing vehicle theft, comprising: A) reading, via at least one computing device, a plurality of measurements from one of a plurality of sensors, the plurality of sensors being configured to sense measurements proximate to a vehicle; B) determining, via at least one computing device, at least one event has occurred based on the plurality of measurements; C) capturing, via the at least one computing device, data from at least one additional sensor of the plurality of sensors; and D) transmitting, via a wireless transceiver, the data corresponding to the at least one event to a remote service.

According to a further aspect, the method of the fourteenth aspect or any other aspect, further comprising storing, via the at least one computing device, the data from the at least one additional sensor on a local storage coupled to the at least one computing device.

According to a further aspect, the method of the fourteenth aspect or any other aspect, further comprising storing, via the at least one computing device, the data from the at least one additional sensor in a buffer.

According to a further aspect, the method of the fourteenth aspect or any other aspect, further comprising: A) continuously capturing, via at least one computing device, a threshold duration of video data in a buffer in real time; and B) retrieving a segment of the video data comprising a start of the at least one event based on the video data in the buffer.

According to a further aspect, the method of the fourteenth aspect or any other aspect, wherein the segment of the video data comprises video data before the start of the at least one event based on the buffer.

According to a further aspect, the method of the fourteenth aspect or any other aspect, wherein the threshold duration of video data is from the at least one additional sensor and capturing the data from the at least one additional sensor comprises initializing the data with the segment of the video data.

According to a fifteenth aspect, a vehicle theft-prevention apparatus, comprising: A) a plurality of sensors configured to sense measurements proximate to a vehicle; B) a wireless transceiver; C) at least one computing device coupled to the plurality of sensors and the wireless transceiver, the at least one computing device configured to: 1) read a plurality of measurements from at least one of the plurality of sensors; 2) determine at least one event has occurred based on the plurality of measurements; 3) store data corresponding to the at least one event from at least one of the plurality of sensors on a local storage coupled to the at least one computing device; and 4) enable the wireless transceiver and transmit the data corresponding to the at least one event to a remote service.

According to a further aspect, the vehicle theft-prevention apparatus of the fifteenth aspect or any other aspect, wherein the at least one computing device is further configured to store data corresponding to the at least one event from at least one additional sensor of the plurality of sensors.

According to a further aspect, the vehicle theft-prevention apparatus of the fifteenth aspect or any other aspect, wherein the at least one computing device is further configured to disable the wireless transceiver after transmitting the data to avoid interference with at least one of the plurality of sensors.

According to a further aspect, the vehicle theft-prevention apparatus of the fifteenth aspect or any other aspect, wherein the at least one computing device is configured to apply at least one rule to determine the data to be stored that corresponds to the at least one event.

According to a further aspect, the vehicle theft-prevention apparatus of the fifteenth aspect or any other aspect, wherein the at least one computing device is configured to download the at least one rule from a remote service.

According to a further aspect, the vehicle theft-prevention apparatus of the fifteenth aspect or any other aspect, wherein the at least one computing device is further configured to: A) continuously capture a threshold duration of video data in a buffer in real time; and B) retrieve a segment of the video data comprising a start of the at least one event based on the video data in the buffer.

According to a further aspect, the vehicle theft-prevention apparatus of the fifteenth aspect or any other aspect, wherein the segment of the video data comprises video data before the start of the at least one event based on the buffer.

According to a further aspect, the vehicle theft-prevention apparatus of claim the fifteenth aspect or any other aspect, further comprising a locking mechanism configured to: A) engage based on rotation of a first portion relative to a second portion in a first direction; and B) disengage based on a rotation of the first portion relative to the second portion in a second direction.

According to a sixteenth aspect, a vehicle theft-prevention apparatus, comprising: A) a plurality of sensors configured to sense measurements proximate to a vehicle; B) a wireless transceiver; C) at least one computing device coupled to the plurality of sensors and the wireless transceiver, the at least one computing device configured to: 1) receive, via the wireless transceiver, an indication to enter an armed mode from an unarmed mode; 2) in response to entering the armed mode, set a configuration of at least one property of a subset of the plurality of sensors; 3) receive, via the wireless transceiver, a second indication to enter a special mode from the armed mode; and 4) in response to entering the special mode, alter the configuration of the at least one property of the subset of the plurality of sensors.

According to a further aspect, the vehicle theft-prevention apparatus of the sixteenth aspect or any other aspect, wherein the special mode comprises a low power mode, and the configuration is altered to reduce a power usage of the subset of the plurality of sensors.

According to a further aspect, the vehicle theft-prevention apparatus of the sixteenth aspect or any other aspect, wherein the configuration is altered to reduce the power usage by disabling a microwave sensor of the plurality of sensors.

According to a further aspect, the vehicle theft-prevention apparatus of the sixteenth aspect or any other aspect, wherein the special mode comprises a pet-friendly mode and a sensitivity of at least one of the plurality of sensors is reduced to prevent a pet from triggering an alarm.

According to a further aspect, the vehicle theft-prevention apparatus of the sixteenth aspect or any other aspect, wherein the special mode comprises a valet mode and the configuration is altered to collect and store sensor data without triggering an alarm.

According to a further aspect, the vehicle theft-prevention apparatus of the sixteenth aspect or any other aspect, wherein the special mode comprises a valet mode and the at least one computing device is configured to determine if the vehicle exits a geofence and prevent triggering an alarm unless the vehicle exits the geofence.

According to a further aspect, the vehicle theft-prevention apparatus of the sixteenth aspect or any other aspect, wherein the sensor data comprises video data, audio data, GPS data, and speed data while the vehicle is occupied by a valet.

According to a further aspect, the vehicle theft-prevention apparatus of the sixteenth aspect or any other aspect, wherein the special mode comprises a sensitive mode and the configuration is altered by increasing a sensitivity of a microwave sensor of the plurality of sensors to sense movement outside of the vehicle.

According to a further aspect, the vehicle theft-prevention apparatus of the sixteenth aspect or any other aspect, wherein a sensitivity of a PIR sensor of the plurality of sensors is unchanged while in sensitive mode.

According to a seventeenth aspect, a vehicle theft-prevention apparatus, comprising: A) a cylindrical housing; B) a plurality of sensors at least partially contained within the cylindrical housing, the plurality of sensors configured to sense measurements proximate to a vehicle; C) at least one computing device coupled to the plurality of sensors and a wireless transceiver, the at least one computing device configured to: 1) receive an indication to enter an armed mode from an unarmed mode; 2) in response to entering the armed mode, set a configuration of at least one property of a subset of the plurality of sensors; 3) receive a second indication to enter a special mode from the armed mode; and 4) in response to entering the special mode, alter the configuration of the at least one property of the subset of the plurality of sensors.

According to a further aspect, the vehicle theft-prevention apparatus of the seventeenth aspect or any other aspect, further comprising a light ring around a portion of the cylindrical housing, wherein the at least one computing device is further configured to generate a unique light sequence via the light ring based at least in part on the special mode of a plurality of special modes, each of the plurality of special modes comprising a respective unique light sequence.

According to a further aspect, the vehicle theft-prevention apparatus of the seventeenth aspect or any other aspect, wherein the special mode comprises a low power mode, and the at least one computing device is configured to reduce a frequency of reading from the subset of the plurality of sensors to reduce power consumption based on the configuration.

According to a further aspect, the vehicle theft-prevention apparatus of the seventeenth aspect or any other aspect, wherein the at least one computing device is further configured to reduce an output of an active emitting component of one of the plurality of sensors based on the configuration.

According to a further aspect, the vehicle theft-prevention apparatus of the seventeenth aspect or any other aspect, wherein the output of the active emitting component is configured via a general purpose input/output (GPIO) pin of the at least one computing device.

According to a further aspect, the vehicle theft-prevention apparatus of the seventeenth aspect or any other aspect, wherein the special mode comprises a pet-friendly mode and the at least one computing device is further configured to adjust a sensitivity of at least one of the plurality of sensors to prevent a pet from triggering an alarm.

According to a further aspect, the vehicle theft-prevention apparatus of the seventeenth aspect or any other aspect, wherein the special mode comprises a valet mode and the at least one computing device is further configured to collect and store sensor data without triggering an alarm responsive to the sensor data.

According to an eighteenth aspect, a method for preventing vehicle theft, comprising: A) receiving, via at the least one computing device, an indication to enter an armed mode from an unarmed mode; B) setting, via at the least one computing device, a configuration of at least one property of a subset of a plurality of sensors in response to entering the armed mode; C) receiving, via the at least one computing device, a second indication to enter a special mode from the armed mode; and D) in response to entering the special mode, altering, via at least one computing device, the configuration of the at least one property of the subset of the plurality of sensors.

According to a further aspect, the method of the eighteenth aspect or any other aspect, further comprising reducing, via the at least one computing device, a frequency of reading from the subset of the plurality of sensors to reduce power consumption based on the configuration.

According to a further aspect, the method of the eighteenth aspect or any other aspect, further comprising reducing, via the at least one computing device, an output of an active emitting component of one of the plurality of sensors by emitting at least one electrical signal.

According to a further aspect, the method of the eighteenth aspect, further comprising collecting and storing, via the at least one computing device, sensor data without triggering an alarm responsive to the sensor data.

According to a nineteenth aspect, a system, comprising: A) a vehicle theft-prevention apparatus comprising a plurality of sensors and at least one computing device; and B) at least one server in communication with the vehicle theft-prevention apparatus, the at least one server being configured to: 1) receive an authentication request from a particular application executed on a mobile device comprising user credentials; 2) authenticate the authentication request as a particular user account, where the particular user account is associated with the vehicle theft-prevention apparatus; 3) receive instructions from the particular application that the mobile device has moved outside of a geofence associated with the vehicle theft-prevention apparatus; and 4) send a command to the vehicle theft-prevention apparatus to enter an armed mode.

According to a further aspect, the system of the nineteenth aspect or any other aspect, wherein the at least one computing device of the vehicle theft-prevention apparatus is configured to: A) identify a command received via one of the plurality of sensors; B) determine at least one product associated with the command; and C) send a request to the server to initiate an order for the at least one product from at least one ecommerce system.

According to a further aspect, the system of the nineteenth aspect or any other aspect, wherein the at least one computing device is further configured to: A) receive the request to initiate the order for the at least one product from the at least one ecommerce system; B) determine at least one payment credential associated with the particular user account; and C) generate the order for the at least one product with the at least one ecommerce system using the at least one payment credential.

According to a further aspect, the system of the nineteenth aspect or any other aspect, wherein the at least one computing device is configured to identify the command by analyzing at least one of: an audio stream for a voice command from an audio sensor or a video stream for a gesture from a video sensor.

According to a further aspect, the system of the nineteenth aspect or any other aspect, wherein the at least one computing device of the vehicle theft-prevention apparatus is configured to: A) detect a near-field communication device within range of the vehicle theft-prevention apparatus; B) receive a request for payment from the near-field communication device; C) authorize the request for payment; and D) perform payment wirelessly of the requested payment.

According to a further aspect, the system of the nineteenth aspect or any other aspect, wherein the at least one computing device of the vehicle theft-prevention apparatus is configured to generate a user interface on a display associated with the vehicle to authorize the request for payment.

According to a further aspect, the system of the nineteenth aspect or any other aspect, wherein the at least one computing device of the vehicle theft-prevention apparatus is configured to send a request for payment credentials to the at least one server.

According to a further aspect, the system of the nineteenth aspect or any other aspect, wherein the at least one server is further configured to authenticate the authentication request by requesting verification of a second factor associated with the particular user account.

According to a further aspect, the system of the nineteenth aspect or any other aspect, wherein the vehicle theft-prevention apparatus further comprises: A) a first portion of a body; B) a second portion of the body, the first portion configured to rotate about the second portion; and C) a locking mechanism embedded within the second portion.

According to a further aspect, the system of the nineteenth aspect or any other aspect, wherein the vehicle theft-prevention apparatus further comprises a slip clutch mechanism configured to prevent the locking mechanism from further engaging from rotation in a first direction relative to the second portion based on a magnitude of force applied.

According to a twentieth aspect, a system, comprising: A) a data store; and B) at least one computing device in communication with a vehicle theft-prevention apparatus, the at least one computing device being configured to: 1) receive an authentication request from a particular application executed on a mobile device comprising user credentials; 2) authenticate the authentication request as a particular user account, where the particular user account is associated with the vehicle theft-prevention apparatus; 3) receive instructions from the particular application that the mobile device has moved inside of a geofence associated with the vehicle theft-prevention apparatus; and 4) send a command to the vehicle theft-prevention apparatus to enter an unarmed mode.

According to a further aspect, the system of the twentieth aspect or any other aspect, wherein the user credentials comprise a biometric component.

According to a further aspect, the system of the twentieth aspect or any other aspect, wherein the data store comprises a plurality of user accounts associated with a plurality of vehicle theft-prevention apparatuses.

According to a further aspect, the system of the twentieth aspect or any other aspect, wherein the particular application, when executed by the mobile device, causes the mobile device to: A) receive data describing the geofence from the at least one computing device; B) monitor a current position of the mobile device via global positioning circuitry; C) determine that the current position has moved inside of the geofence based on the data; and D) send the instructions that the mobile device has moved inside of the geofence to the at least one computing device.

According to a further aspect, the system of the twentieth aspect or any other aspect, wherein the at least one computing device is further configured to: A) cause a user interface to be rendered on the mobile device, the user interface comprising a portion of a map; and B) receive a selection of an area of interest on the map, wherein the geofence comprises the area of interest.

According to a twenty-first aspect, a method, comprising: A) receiving, via at least one computing device, an authentication request from a particular application executed on a mobile device comprising user credentials; B) authenticating, via the at least one computing device, the authentication request as a particular user account, where the particular user account is associated with a vehicle theft-prevention apparatus; C) receiving, via the at least one computing device, instructions from the particular application that the mobile device has moved inside of a geofence associated with the vehicle theft-prevention apparatus; and D) sending, via the at least one computing device, a command to the vehicle theft-prevention apparatus to enter an unarmed mode.

According to a further aspect, the method of the twenty-first aspect or any other aspect, further comprising: A) generating, via the at least one computing device, a random or pseudo random number; B) identifying, via the at least one computing device, a firmware image associated with a vehicle theft-prevention apparatus; C) generating, via the at least one computing device, a local hash of the firmware image using the random or pseudo random number as a seed; D) sending, via the at least one computing device, a request to hash the firmware image executing on the vehicle theft-prevention apparatus using the random or pseudo random number as a seed; E) receiving, via the at least one computing device, a result of the hash of the firmware image using the seed; and F) comparing, via the at least one computing device, the result from the vehicle theft-prevention apparatus to the local hash.

According to a further aspect, the method of the twenty-first aspect or any other aspect, further comprising performing, via the at least one computing device, at least one remedial action in response to the result from the vehicle theft-prevention apparatus differing from the local hash.

According to a further aspect, the method of the twenty-first aspect or any other aspect, wherein the at least one remedial action comprises at least of: disabling the vehicle theft-prevention apparatus, generating an alert to the mobile device; and initiating a firmware update process.

According to a further aspect, the method of the twenty-first aspect or any other aspect, further comprising: A) receiving, via the at least one computing device, a request from the vehicle theft-prevention apparatus to initiate an order for at least one product from an ecommerce system; B) determining, via the at least one computing device, a payment credential associated with the particular user account; and C) generating, via the at least one computing device, the order for the at least one product with the ecommerce system using the payment credential.

According to a twenty-second aspect, a vehicle theft-prevention apparatus, comprising: A) at least one sensor configured to sense measurements proximate to a vehicle; B) a wireless transceiver; and C) at least one computing device coupled to the at least one sensor and the wireless transceiver, the at least one computing device configured to: 1) read a plurality of first measurements of the at least one sensor at a predetermined frequency, where the at least one sensor is located in a first position of the vehicle; 2) receive a plurality of second measurements from at least one additional theft-prevention apparatus, where the at least one additional theft-prevention apparatus is located at a second position in the vehicle; and 3) determine that a person has entered the vehicle based on at least one of: the plurality of first measurements and the plurality of second measurements.

According to a further aspect, the vehicle theft-prevention apparatus of the twenty-second aspect or any other aspect, wherein the at least one additional theft-prevention apparatus is coupled to a window of the vehicle.

According to a further aspect, the vehicle theft-prevention apparatus of the twenty-second aspect or any other aspect, wherein the plurality of second measurements are received from the at least one additional theft prevention apparatus via near field communication.

According to a further aspect, the vehicle theft-prevention apparatus of the twenty-second aspect or any other aspect, wherein the first position is proximate a first cup holder for a front seat and the second position is proximate a second cup holder for a back seat.

According to a further aspect, the vehicle theft-prevention apparatus of the twenty-second aspect or any other aspect, wherein the at least one computing device is coupled to the additional theft-prevention apparatus via a cable.

According to a twenty-third aspect, a vehicle theft-prevention system, comprising: A) a first vehicle theft-prevention apparatus comprising: 1) a first sensor configured to sense measurements proximate to a vehicle; and 2) a first computing device coupled to the first sensor, the first computing device configured to: i) read a plurality of first measurements of the first sensor at a predetermined frequency, where the first sensor is located in a first position of the vehicle; and ii) send the plurality of first measurements to a second computing device; and B) a second vehicle theft-prevention apparatus comprising: 1) a second sensor configured to sense measurements proximate to the vehicle; and 2) the second computing device coupled to the second sensor, the second computing device configured to: i) receive the plurality of first measurements from the first computing device; ii) read a plurality of second measurements of the second sensor a second predetermined frequency, where the second sensor is located in a second position of the vehicle; and iii) determine that a person has entered the vehicle based on at least one of: the plurality of first measurements and the plurality of second measurements.

According to a further aspect, the system of the twenty-third aspect or any other aspect, wherein the first vehicle theft-prevention apparatus further comprises a battery.

According to a further aspect, the system of the twenty-third aspect or any other aspect, wherein the vehicle comprises the first vehicle theft-prevention apparatus.

According to a further aspect, the system of the twenty-third aspect or any other aspect, wherein the second computing device is further configured to determine a global positioning system (GPS) location of the vehicle from a GPS circuit of the vehicle by communicating with the vehicle via the first computing device.

According to a further aspect, the system of the twenty-third aspect or any other aspect, wherein the first computing device sends the plurality of first measurements via an on-board diagnostic (OBD) port.

According to a further aspect, the system of the twenty-third aspect or any other aspect, wherein the second computing device is further configured to determine a current state of the vehicle via the OBD port.

According to a further aspect, the system of claim the twenty-third aspect or any other aspect, wherein the first computing device sends the plurality of first measurements via at least one of: near field communication or Bluetooth.

According to a further aspect, the system of the twenty-third aspect or any other aspect, wherein the second vehicle theft-prevention apparatus further comprises a body comprising a first portion and a second portion, the first portion configured to rotate about the second portion to affix the body into a cup holder of the vehicle.

According to a twenty-fourth aspect, a method for preventing vehicle theft, comprising: A) reading, via at least one computing device, a plurality of first measurements of a first sensor at a predetermined frequency, where the first sensor is located in a first position of a vehicle; B) receiving, via the at least one computing device, a plurality of second measurements from a second sensor associated with a second theft-prevention apparatus, where the second sensor is located at a second position in the vehicle; and C) determining, via the at least one computing device, whether a person has entered the vehicle based on at least one of: the plurality of first measurements and the plurality of second measurements.

According to a further aspect, the method of the twenty-fourth aspect or any other aspect, wherein the first sensor and the second sensor are configured to sense measurements proximate to the vehicle.

According to a further aspect, the method of the twenty-fourth aspect or any other aspect, wherein proximate to the vehicle is within a respective radius of the first sensor and the second sensor, the respective radius being based on at least one property of a corresponding one of: the first sensor and the second sensor.

According to a further aspect, the method of the twenty-fourth aspect or any other aspect, wherein the vehicle comprises the second theft-prevention apparatus and the plurality of second measurements are measured by the vehicle.

According to a further aspect, the method of the twenty-fourth aspect or any other aspect, wherein the plurality of second measurements comprises at least one of: a tire pressure of at least one tire of the vehicle, a GPS location of the vehicle, a current speed of the vehicle, a current temperature in the vehicle, a current drive of the vehicle, and an outdoor temperature of the vehicle.

According to a further aspect, the method of the twenty-fourth aspect or any other aspect, further comprising receiving, via the at least one computing device, at least one third measurement from a third sensor, where the third sensor is located at a third position in the vehicle, wherein determining whether the person has entered the vehicle is further based on the at least one third measurement.

According to a further aspect, the method of the twenty-fourth aspect or any other aspect, further comprising receiving, via the at least one computing device, at least one fourth measurement from a fourth sensor, where the fourth sensor is located at a fourth position in the vehicle, wherein determining whether the person has entered the vehicle is further based on the at least one fourth measurement.

According to a twenty-fifth aspect, a vehicle theft-prevention apparatus, comprising: A) a plurality of sensors configured to sense measurements proximate to a vehicle; B) a wireless transceiver; and C) at least one computing device coupled to the plurality of sensors and the wireless transceiver, the at least one computing device configured to: 1) read a plurality of first measurements of a first sensor of the plurality of sensors; 2) determine that a key fob moved outside of a range of the first sensor based on the plurality of first measurements from the first sensor; 3) in response to the key fob moving outside of the range of the first sensor, transition to an armed state; 4) read a plurality of second measurements from a subset of the plurality of sensors; and 5) determine that a person has entered the vehicle based on the plurality of second measurements.

According to a further aspect, the vehicle theft-prevention apparatus of the twenty-fifth aspect or any other aspect, wherein the at least one computing device is further configured to: A) determine that a battery level of the key fob has fallen below a threshold; and B) send a notification to change a battery in the key fob based on the battery level falling below the threshold.

According to a further aspect, the vehicle theft-prevention apparatus of the twenty-fifth aspect or any other aspect, wherein the at least one computing device is further configured to: A) determine that a battery level of the key fob; and B) send the battery level to at least one server.

According to a further aspect, the vehicle theft-prevention apparatus of the twenty-fifth aspect or any other aspect, wherein the at least one computing device is further configured to: A) calculate a rolling code for the key fob; and B) determine that the person has entered the vehicle further based on authenticating the rolling code of the key fob.

According to a further aspect, the vehicle theft-prevention apparatus of the twenty-fifth aspect or any other aspect, wherein the plurality of first measurements are read by interrogating the key fob.

According to a twenty-sixth aspect, a vehicle theft-prevention apparatus, comprising: A) a plurality of sensors configured to sense measurements proximate to a vehicle; B) a wireless transceiver; and C) at least one computing device coupled to the plurality of sensors and the wireless transceiver, the at least one computing device configured to: 1) establish communication with an external device to determine a status related to the vehicle; 2) transition to an armed state based on the status related to the vehicle; 3) in response to entering the armed state, read a plurality of measurements of a particular sensor of the plurality of sensors; 4) determine that a person has entered the vehicle based on the plurality of measurements; and 5) send, via the wireless transceiver, an alarm notification to at least one server.

According to a further aspect, the vehicle theft-prevention apparatus of the twenty-sixth aspect or any other aspect, wherein the external device comprises a key fob and the status related to the vehicle comprises whether the key fob is within a range of the vehicle.

According to a further aspect, the vehicle theft-prevention apparatus of the twenty-sixth aspect or any other aspect, wherein the external device comprises the vehicle and the at least one computing device is further configured to communicate with the vehicle via an on-board diagnostics (OBD) port.

According to a further aspect, the vehicle theft-prevention apparatus of the twenty-sixth aspect or any other aspect, wherein the at least one computing device is further configured to receive a GPS location from the vehicle via the OBD port, wherein the alarm notification comprises the GPS location.

According to a further aspect, the vehicle theft-prevention apparatus of the twenty-sixth aspect or any other aspect, wherein the at least one computing device is further configured to: A) determine that a GPS location is outside a predetermined geofence; and B) in response to the GPS location being outside a predetermined geofence, transition to the armed state.

According to a further aspect, the vehicle theft-prevention apparatus of the twenty-sixth aspect or any other aspect, wherein the at least one computing device is further configured to: A) determine that the vehicle is running based on the status related to the vehicle; and B) in response to the vehicle running, transition to an unarmed state.

According to a further aspect, the vehicle theft-prevention apparatus of the twenty-sixth aspect or any other aspect, wherein the at least one computing device is further configured to: A) determine that at least one door lock of the vehicle is engaged; and B) in response to determining that the at least one door lock is engaged, transition to the armed state.

According to a further aspect, the vehicle theft-prevention apparatus of the twenty-sixth aspect or any other aspect, wherein the at least one computing device is further configured to: A) determine that at least one door of the vehicle is closed; and B) in response to the at least one of the vehicle being closed, transition to the armed state.

According to a further aspect, the vehicle theft-prevention apparatus of the twenty-sixth aspect or any other aspect, wherein the at least one computing device is further configured to: A) determine that at least one door lock of the vehicle is disengaged; and B) in response to the at least one door handle being disengaged, transition to an unarmed state.

According to a further aspect, the vehicle theft-prevention apparatus of the twenty-sixth aspect or any other aspect, wherein the at least one computing device is further configured to: A) determine that at least one door of the vehicle is open; and B) in response to the at least one of the vehicle being open, transition to the unarmed state.

According to a further aspect, the vehicle theft-prevention apparatus of the twenty-sixth aspect or any other aspect, wherein the at least one computing device is further configured to establish communication with a third party to determine the status related to the vehicle.

According to a twenty-seventh aspect, a vehicle theft-prevention apparatus, comprising: A) a body comprising a first portion and a second portion, the first portion configured to rotate about the second portion to affix the body into a cup holder of the vehicle; B) at least one computing device configured to at least: 1) establish communication with an external device; 2) transition to an unarmed state based on communicating with the external device; and 3) in response to entering the unarmed state, disable measurements from a plurality of sensors.

According to a further aspect, the vehicle theft-prevention apparatus of the twenty-seventh aspect or any other aspect, wherein the at least one computing device is further configured to: A) determine that a person has left the vehicle based on loss of the communication with the external device; and B) transition to an armed state based on the loss of the communication.

According to a further aspect, the vehicle theft-prevention apparatus of the twenty-seventh aspect or any other aspect, further comprising a locking mechanism embedded within the second portion.

According to a further aspect, the vehicle theft-prevention apparatus of the twenty-seventh aspect or any other aspect, wherein the external device comprises at least one of: a smart phone and a smart watch.

According to a twenty-eighth aspect, a vehicle theft-prevention apparatus, comprising: A) a cylindrical body configured to be positioned within a cup holder of a vehicle, the cylindrical body having a cup holder element on a top side; B) a fish-eye camera sensor on an upper portion of the body; C) a passive infrared (PIR) sensor positioned in the body; D) a plurality of legs mechanically connected to a locking mechanism and configured to extend to provide an outward force on the cup holder of the vehicle to prevent removal of the vehicle theft-prevention apparatus; and E) at least one computing device comprising a processor and a memory, the at least one computing device being configured to: 1) capture a plurality of images from the fish-eye camera sensor; 2) read a plurality of measurements from the PIR sensor; and 3) trigger an alarm based on the plurality of images and the plurality of measurements.

According to a further aspect, the vehicle theft-prevention apparatus of the twenty-eighth aspect or any other aspect, further comprising a microwave sensor and positioned within the cylindrical body, wherein the at least one computing device is further configured to read a plurality of second measurements from the microwave sensor, wherein the alarm is triggered based further on the plurality of second measurements.

According to a further aspect, the vehicle theft-prevention apparatus of the twenty-eighth aspect or any other aspect, further comprising transceiver configured to transmit an indication of the alarm to at least one server.

According to a twenty-ninth aspect, a vehicle theft-prevention apparatus, comprising: A) a body configured to be positioned within a vehicle; B) a first sensor configured to sense a first type of measurement; C) a second sensor configured to sense a second type of measurement; and D) at least one computing device coupled to the first sensor and second sensor, the at least one computing device configured to: 1) read a plurality of first measurements of the first type of measurement from the first sensor and a plurality of second measurements of the second type of measurement from the second sensor from within the vehicle; and 2) triggering an alarm based on the plurality of measurements and plurality of second measurements.

According to a further aspect, the vehicle theft-prevention apparatus of the twenty-ninth aspect or any other aspect, wherein the body is configured to be embedded within a dome light of the vehicle.

According to a further aspect, the vehicle theft-prevention apparatus of the twenty-ninth aspect or any other aspect, wherein the alarm is triggered in response to one of the plurality of measurements meeting a first threshold and one of the plurality of second measurements meeting a second threshold.

According to a further aspect, the vehicle theft-prevention apparatus of the twenty-ninth aspect or any other aspect, wherein the body is configured to be affixed to a rim of a tire.

According to a further aspect, the vehicle theft-prevention apparatus of the twenty-ninth aspect or any other aspect, wherein the alarm is triggered in response to determining that the rim of the vehicle has been removed based on the plurality of measurements and plurality of second measurements.

According to a further aspect, the vehicle theft-prevention apparatus of the twenty-ninth aspect or any other aspect, wherein the first sensor comprises a tilt sensor configured to determine if the rim of the tire is removed from the vehicle.

According to a further, the vehicle theft-prevention apparatus of the twenty-ninth aspect or any other aspect, wherein the first sensor comprises a tire pressure sensor configured to couple to a valve stem of the tire.

According to a further, the vehicle theft-prevention apparatus of the twenty-ninth aspect or any other aspect, wherein the at least one computing device is further configured to detect a reduction in an air pressure of the tire and the alarm is triggered in response the reduction in the air pressure.

According to a further aspect, the vehicle theft-prevention apparatus of claim the twenty-ninth aspect or any other aspect, comprising a remote device configured to mount onto a rim of a tire and provide sensor data to the at least one computing device.

According to a further aspect, the vehicle theft-prevention apparatus of the twenty-ninth aspect or any other aspect, wherein the remote device is configured to provide a global positioning system (GPS) location of the rim of the tire to the at least one computing device.

According to a further aspect, the vehicle theft-prevention apparatus of the twenty-ninth aspect or any other aspect, wherein the remote device is configured to transmit a GPS location of the rim of the tire to at least one server via a wireless internet connection.

According to a further aspect, the vehicle theft-prevention apparatus of the twenty-ninth aspect or any other aspect, wherein the body is configured to be mounted to a portion of a body of the vehicle.

According to a thirtieth aspect, a method for preventing theft, comprising: A) reading, via at least one computing device of a vehicle theft-prevention apparatus, a plurality of first measurements of a first type of measurement from a first sensor within a vehicle; B) reading, via the at least one computing device, a plurality of second measurements of a second type of measurement from the second sensor from within the vehicle; C) triggering, via the at least one computing device, an alarm based on the plurality of measurements and plurality of second measurements.

According to a further aspect, the method of the thirtieth aspect or any other aspect, further comprising triggering the alarm by emitting an audio signal from a speaker positioned within a body of the vehicle theft-prevention apparatus.

According to a further aspect, the method of the thirtieth aspect or any other aspect, further comprising installing at least a portion of the vehicle theft-prevention apparatus in a dome light of the vehicle.

According to a further aspect, the method of the thirtieth aspect or any other aspect, further comprising affixing at least a portion of the vehicle theft-prevention apparatus to a rim of the vehicle. According to a further aspect, the method of the thirtieth aspect or any other aspect, further comprising: A) receiving, via the at least one computing device, a request for a location of the vehicle theft-prevention apparatus; B) determining, via a GPS circuit of the vehicle theft-prevention apparatus, a GPS coordinate of the vehicle theft-prevention apparatus; and C) transmitting, via the at least one computing device, the GPS coordinate responsive to the request. These and other aspects, features, and benefits of the disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE FIGURES

The accompanying drawings illustrate one or more embodiments, and/or aspects of the disclosure and, together with the written description, serve to explain the principles of the disclosure. Whenever possible, the same reference numbers are used throughout the drawings to refer to the same or like elements of an embodiment, and wherein:

FIG. 4 is a top view of a security device, according to one embodiment of the present disclosure.

DETAILED DESCRIPTION

Figure 1A:
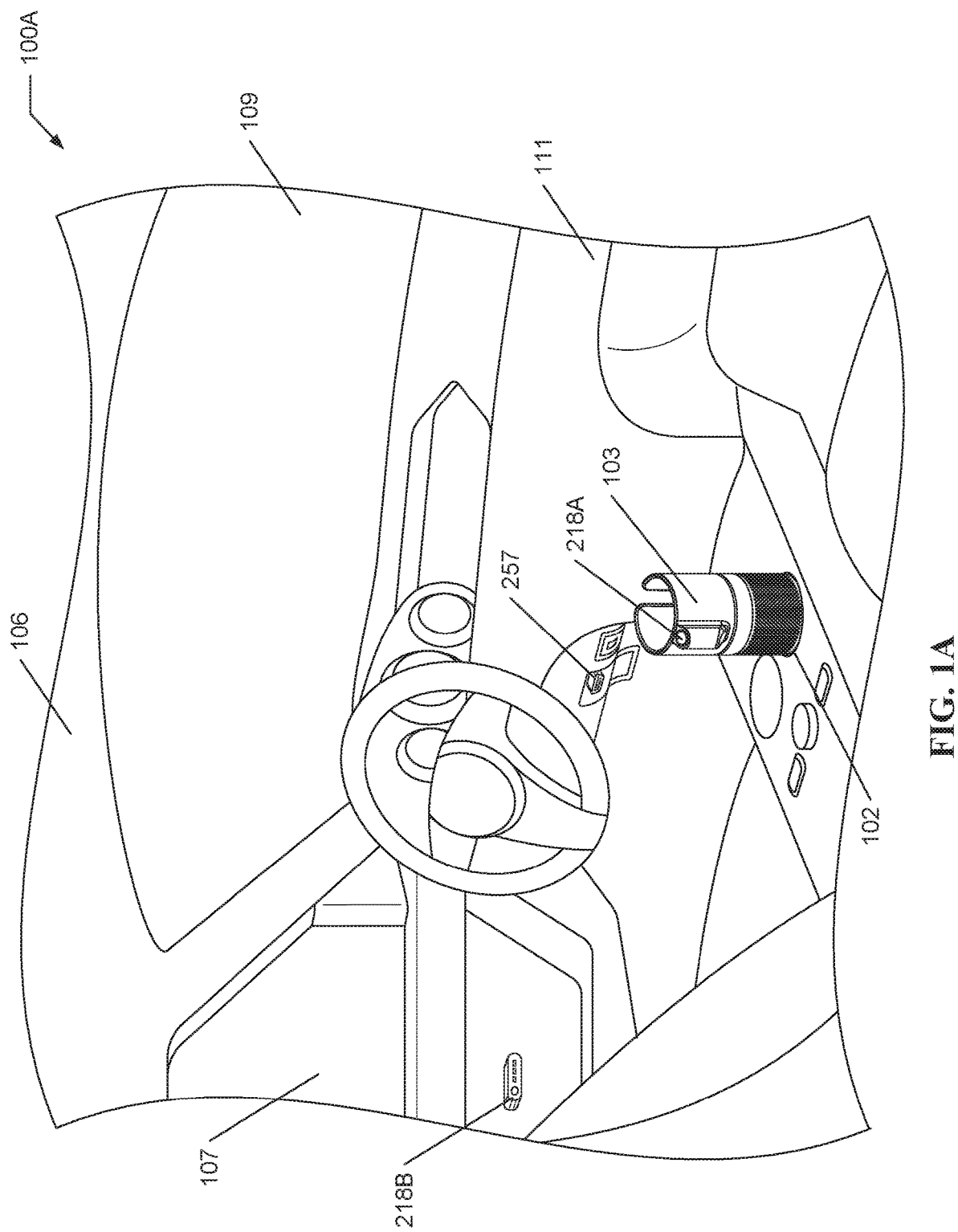
FIG. 1A illustrates an exemplary environment in which an embodiment of the present security device operates.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

As used herein, "vehicle" can generally refer to a manually- or self-propelled transportation system or combinations thereof. Non-limiting examples of vehicles include, but are not limited to, automobiles, watercraft, aircraft, locomotives, and single track vehicles, such as motorcycles, bicycles, and the like.

As used herein, "event" can generally refer to instances in which security of a vehicle is potentially compromised and including instances in which the security is definitively compromised. Events can generally include instances in which a sensor generates a reading and a value of the reading is determined to exceed a predetermined threshold value. Non-limiting examples of events include, but are not limited to, successful or attempted opening or breaching of any vehicle component, such as a door, window, gas cap, etc., movement of an individual within a predetermined range of the vehicle, movement of the vehicle from a predetermined location, and other events corresponding to potentially suspicious behavior occurring in or around the vehicle.

Overview

Aspects of the present disclosure generally relate to systems and processes for detecting intrusions and other activity occurring in and around a vehicle.

In various embodiments, an intrusion detection system includes one or more security devices that are positioned in or around a vehicle. For example, the security device is placed into a cup holder of the vehicle and a locking mechanism of the security device is activated to secure the placement. The shape of the security device can be partially adjustable such that, for example, if the security device is positioned in a cup holder, the shape of the security device can be adjusted to conform to the shape of the cup holder. In one example, the security device includes a plurality of legs that can be extended outward from the security device to apply outward forces to walls of a cup holder, the outward forces generating friction that secures the security device within the cup holder. In this example, the extended plurality of legs are a portion of a locking mechanism for preventing the removal of the security device unless a key or signal is received at the security device or an associated mobile application. Mechanisms such as a clutch mechanism or solenoid can lock the extended position of the plurality of legs.

The security device can communicate with one or more sensors that are integrated into the security device or located throughout the vehicle in which the security device is installed. Non-limiting examples of sensors include PIR sensors, ultrasonic sensors, audio sensors, and cameras (e.g., comprising wide-angle lenses, fisheye lenses, HD functionality, etc.). The security device can process readings from the one or more sensors (and other data sources, such as an on-board diagnostics system) to detect potential intrusions or intruders. The security device can communicate with one or more of a mobile device, computing environment, external systems, and other devices to support intrusion detection and alerting processes, as well as other processes such as ecommerce- and communication-related processes. In response to detecting potential intrusions, the security device can perform various actions including, but not limited to, transmitting alerts, emitting alarms, disabling the vehicle, contacting emergency services, and other actions.

Exemplary Embodiments

Referring now to the figures, for the purposes of example and explanation of the fundamental processes and components of the disclosed systems and processes, reference is made to FIG. 1A, which illustrates an exemplary environment 100A of one embodiment of the present security devices operate. As will be understood and appreciated, the exemplary environment 100A shown in FIG. 1A represents merely one approach or embodiment of the present system, and other aspects are used according to various embodiments of the present system.

Figure 24:
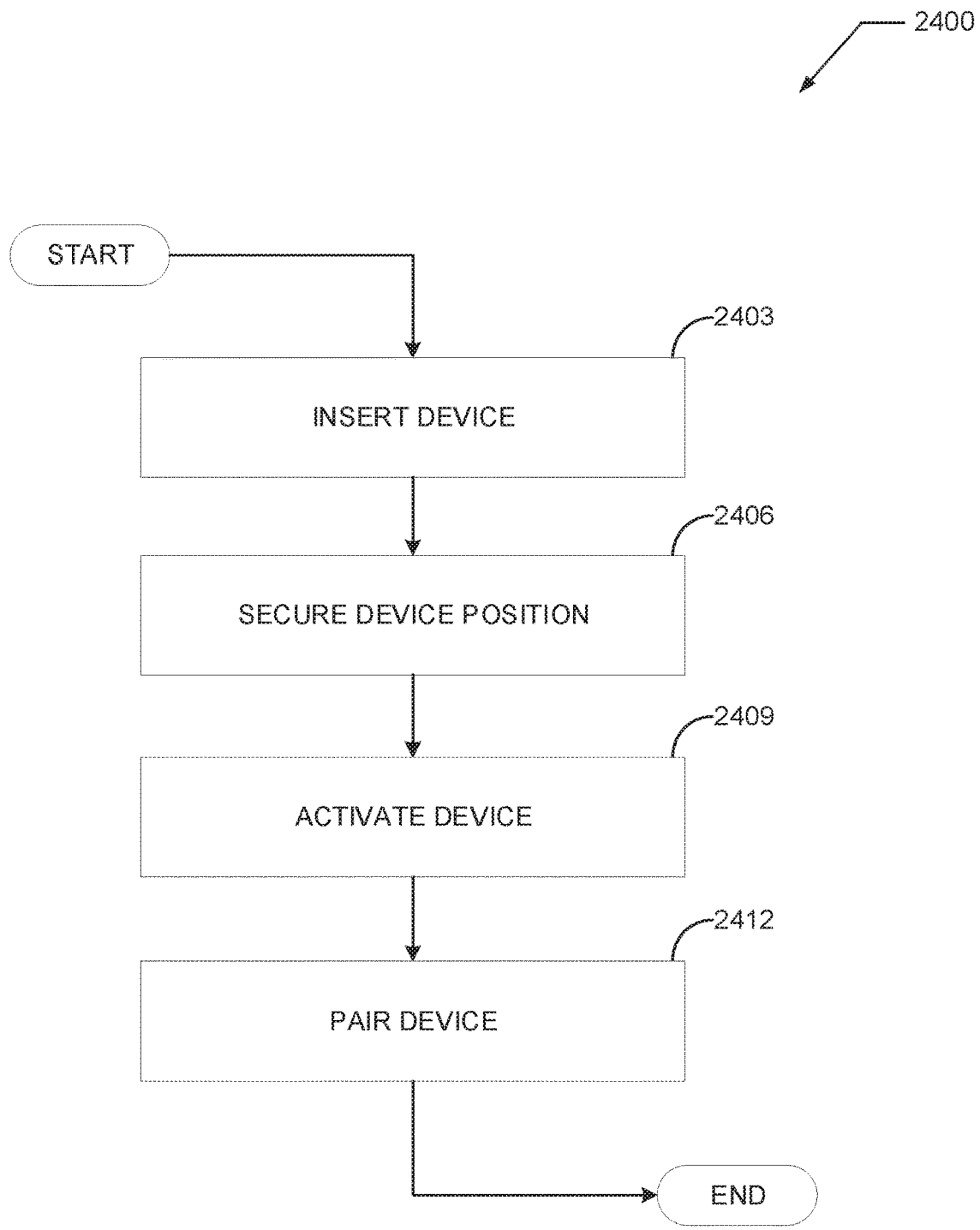
FIG. 24 is a flowchart of an exemplary device setup process according to one embodiment of the present disclosure.

The exemplary environment 100A can include a vehicle 106. A security device 103 can be installed within the vehicle 106, for example, according to a device setup process 2400 (FIG. 24). In some embodiments, the vehicle 106 includes one or more vehicle theft-prevention apparatuses. The vehicle theft-prevention apparatus can include one or more of, but is not limited to, the security device 103, one or more sensors, and one or more remote devices.

The security device 103 can be secured (e.g., locked) within the vehicle 106 such that removal of the security device 103 is prevented. For example, embodiments of the security device 103 include a locking mechanism. In this example, upon the security device 103 being installed in a cup holder, the locking mechanism is engaged and prevents dislodging of the security device 103 from the cup holder. Continuing this example, the locking device includes an engaging component that is disabled and, as such, prevents the locking mechanism from being operated to render the security device 103 removable.

The security device 103 can be installed to a target site 102, such as a cup holder. The target site 102 can include, but is not limited to, cup holders, door panels, gloveboxes, seatbelts, and other receptacles within or on the vehicle 106.

Figure 2:
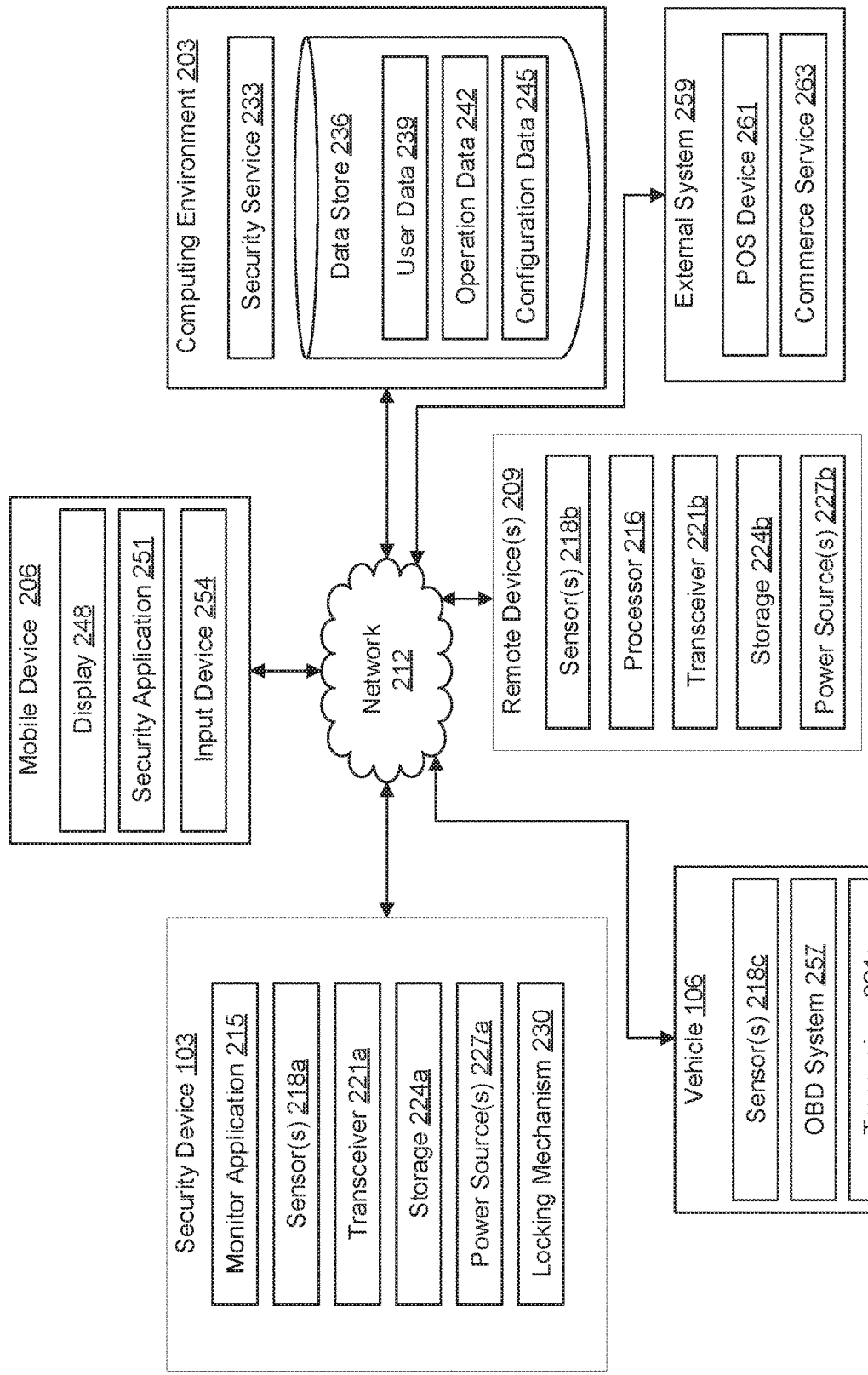
FIG. 2 is a diagram of an exemplary computing architecture of a detection system, according to one embodiment of the present disclosure.

In some embodiments, the security device 103 or another remote device in communication therewith is installed on an exterior of the vehicle 106 (not shown). In some embodiments, two or more security devices 103 are installed to two or more target sites. As an example, a first security device 103 is installed in a cup holder proximate a front passenger seat and a second security device 103 is installed in a second cup holder proximate a rear passenger seat. In this example, the first and second security devices 103 can communicate via wireless means, such as Bluetooth or NFC, or by wired means (e.g., a cable running therebetween). As another example, the first security device 103 can be installed in a first cup holder while the second security device 103 may be affixed to a door or window, clipped to a hook, or positioned in another receptacle. The second security device 103 may be a remote device 209 (FIG. 2). In some embodiments, a security device is sized and configured to be attached to a window 107, windshield 109, glovebox 111, garment hook, dome light, wheel, tire, hub cap, wheel rim, wheel well, body, chassis, or other structure of the vehicle 106. In one example, the security device includes a low profile, rectangular prism shape and is configured to be attached via suction or other adhesive means to a window of the vehicle 106. In another example, the security device includes a clip and/or loop for attachment to a seatbelt, garment hook, seat back, or other structure or receptacle in the vehicle 106. In various embodiments, the security device 103 (or portions thereof) are shaped to cause reverberations of sound within the target site 102 that may enhance a clarity or volume of sounds emitted from the security device 103. For example, the security device 103 can include internal voids or other structures within which sound waves may be reverberated through one or more external voids (e.g., perforations) and into the vehicle 106.

The security device 103 can include one or more sensors 218. One or more sensors 218B can be configured within or on the vehicle 106 and can communicate with the security device 103. In one example, a sensor 218B is installed on an interior portion of a door. In another example, a sensor 218B is installed on a side-view mirror. In another example, a sensor 218C, such as a tilt sensor or light sensor, is attached to a wheel rim and configured to detect removal of the wheel rim. In another example, a sensor 218D, such as a pressure sensor, is coupled to a valve stem of a tire. In another example, an ultrasonic sensor 218E is installed in an interior of a tire and along an axis corresponding to a central tread thereof. In this example, the ultrasonic sensor 218E is configured to monitor a depth of the tire tread based on reflected acoustic signals (e.g., such that alerts can be generated based on the tread degrading in excess of a predetermined level).

The sensors 218 can include, for example, ultrasonic sensors, passive infrared (PIR) sensors, video sensors, audio sensors, vibration sensors, and other sensors. Non-limiting examples of installation sites include cup holders, door panels, gloveboxes, seatbelts, windows, dome lights, tires, wheel rims, wheel wells, hub caps, chassis, body, and trunk spaces. The security device 103 can communicate with an on-board diagnostics (OBD) system 257 to access various data associated with performance and statuses of the vehicle 106. Exemplary descriptions of the OBD system 257 and sensors 218A, 218B are provided further herein with reference to FIG. 2.

In an exemplary scenario, a user installs the security device 103 within the vehicle 106 and registers the security device with a remote computing environment. The user also associates a mobile device (e.g., the user's smartphone) with the security device 103 using an installed security application (e.g., or a web-based application). Using the associated mobile device and security application, the user initiates an arming command to the security device 103. In response to receiving the arming command, the security device 103 enters an armed state. In one embodiment, in the armed state, the engagement component is disabled (e.g., thereby preventing disengagement of the locking mechanism), the sensors 218A, 218B are activated, and a monitor application running on a computing device within the security device 103 analyzes received sensor readings to detect potential intrusion invents. In response to the security device 103 entering the armed state, the security application can receive and cause the rendering of a push alert indicating the armed status of the security device 103.

Figure 1B:
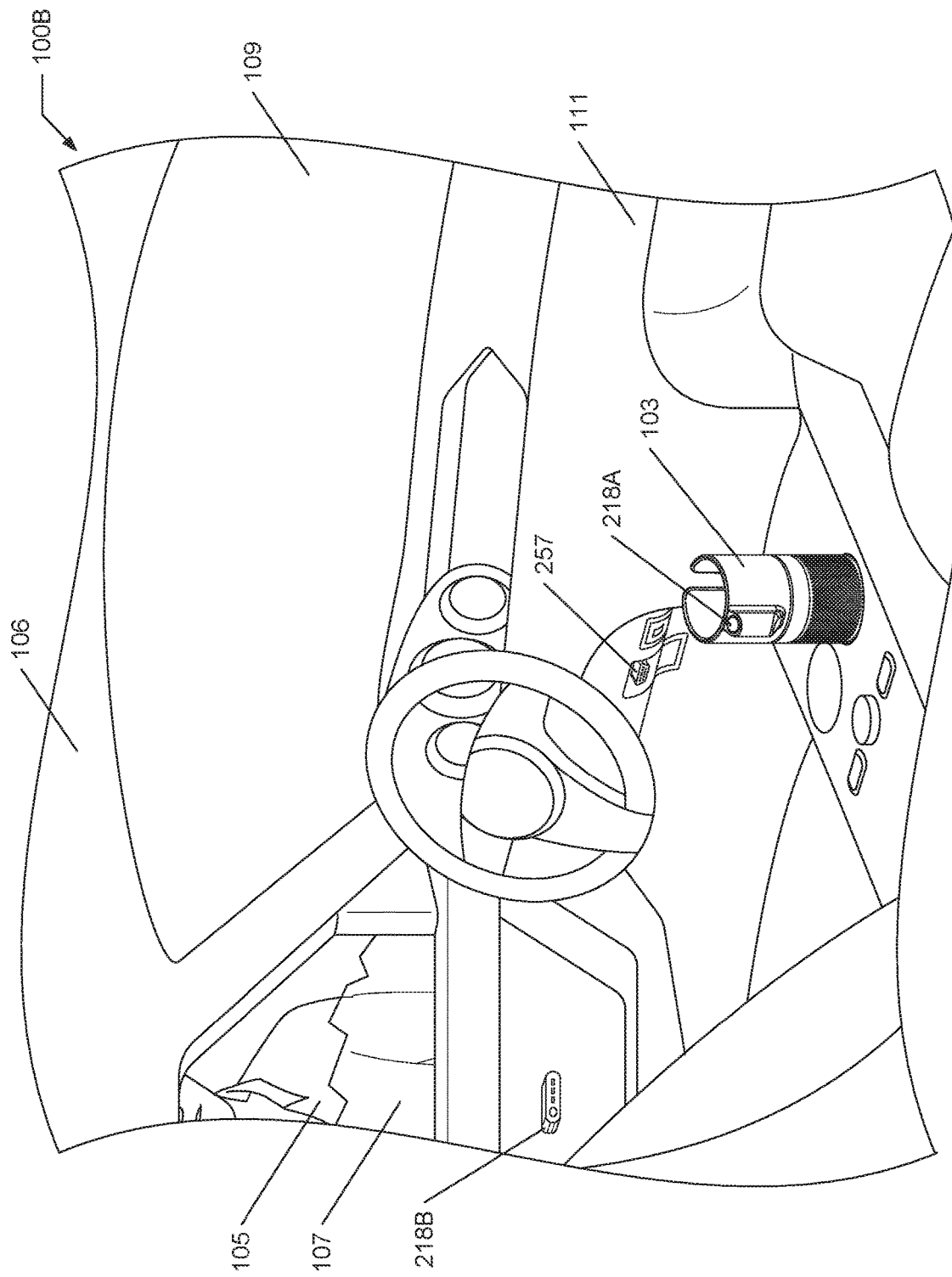
FIG. 1B illustrates an exemplary environment in which an embodiment of the present security device operates.

FIG. 1B illustrates an exemplary environment 100B that includes the vehicle 106 and the security device 103 and sensors 218A, 218B installed therewithin. In the exemplary environment 100B, a potential intruder 105 approaches the vehicle 106 and breaks a window 107. The potential intrusion and potential intruder 105 are detected by the security device 103, which can perform a variety of actions in response to the detection.

The sensor 218A can generate readings in response to an approach of a potential intruder 105. For example, the sensor 218A generates an increased heat signature reading as the potential intruder 105 approaches, the increased value being determined by the monitor application. In another example, the sensor 218A captures video data of an area surrounding the vehicle 106 and the monitor application recognizes the approach of the potential intruder 105. The sensor 218B can generate secondary readings that can be used in addition to (e.g., for verification of) or in place of readings from the sensor 218B. In one example, the sensor 218B records an increased ultrasonic signal in response to the approach of the potential intruder 105. In another example, the sensor 218B records audio data and the monitor application recognizes a frequency and/or decibel level that is associated with a window break. From the OBD system 257, the security device 103 can receive a status of the vehicle 106 indicating an attempted intrusion by the potential intruder 105. For example, the monitor application 215 can read data from the OBD system 257 and determine that the driver's side door handle was manipulated and/or that the window 107 has been broken.

In response to the detection of the potential intrusion and potential intruder 105, the security device 103 can form a variety of actions. In one example, an audible alarm is initiated at the security device 103. In another example, the monitor application transmits a signal to a computing environment that automatically contacts law enforcement and provides a current location of the vehicle 106. In another example, the monitor application transmits a notification to the mobile device of the user.

In an exemplary scenario, the potential intruder 105 approaches the vehicle 106. As the potential intruder 105 approaches, the sensor 218B captures video data (e.g., including a facial image of the potential intruder 105) and the sensor 218A records increased ultrasonic readings. Based on the increased ultrasonic readings, the monitor application determines the presence of the potential intruder 105 and determines that the potential intruder 105 is within a predetermined proximity of the vehicle 106. In response to the determined presence and proximity, a mobile device associated with the user of the vehicle 106 receives a notification. A security application running on the mobile device retrieves the video data (e.g., from the security device 103 or a computing environment at which the video data is stored) and presents the facial image to the user for identification purposes and/or determining additional actions.

Continuing the above scenario, the potential intruder 105 breaks the window 107. The sensor 218A records audio data that is analyzed by the monitor application. In response to the monitor application determining that decibel levels in the audio data exceed a predetermined threshold, the breakage of the window 107 is determined. In response to determining that the window 107 has been broken, an audible alarm is initiated and an alert is transmitted to the user's mobile device. In some embodiments, the security device 103 causes the vehicle 106 to become inoperable. As an example, the security device 103 may communicate with the vehicle 106 to disable the vehicle or may communicate with one or more other providers to render the vehicle inoperable. In one example, the security device 103 can communicate with a service associated with the vehicle (e.g., OnStar®, BMW Assist®, Mbrace®, CUE®, Uconnect®, or other service) and the service associated with the vehicle can send a command to render the vehicle inoperable. During setup, the security device 103 may receive credentials for one or more services to authentication with the services before sending a command.

In various embodiments, due to the locked position of the security device 103, should the potential intruder 105 move the vehicle 106, a GPS sensor 218 (not shown) can be used to track the location of the vehicle 106. Continuing the above scenario, the user receives the alert and the security application provides the user with response options including, but not limited to, disabling the alarm, contacting emergency services, and reviewing additional data associated with the intrusion (e.g., such as the video or audio data). In response to selecting a "Contact Emergency Services" option, the security application transmits the location of the vehicle 106, identity of the user, and summary of the intrusion (e.g., broken window, facial image, etc.) to law enforcement. In this example, the transmission to law enforcement can include data captured during the intrusion event, such as video or audio data recorded during the event. This data can be stored for later use locally on the device 103 or on the user's mobile device, or in cloud storage, etc.

In certain embodiments, the user also associates a mobile device (e.g., the user's smartphone) with the security device 103 using an installed mobile application (e.g., or a web-based application). Using the associated mobile device and mobile application, the user initiates an arming command to the security device 103. In response to receiving the arming command, the security device 103 enters an armed state. In the armed state, the engagement component is disabled (e.g., thereby preventing disengagement of the locking mechanism), the sensors 218A, 218B are activated, and a monitor application running on a computing device within the security device 103 analyzes received sensor readings to detect potential intrusion invents. In response to the security device 103 entering the armed state, the mobile application can receive and cause the rendering of an alert indicating the armed status of the security device 103.

With reference to FIG. 2, shown is a networked environment 200 according to various embodiments of the present disclosure. The networked environment 200 includes one or more security devices 103, a computing environment 203, one or more mobile devices 206, a vehicle 106, and one or more remote devices 209 in communication via a network 212. In some embodiments, the security device 103 may communicate with the vehicle 106 over a first network (e.g., via an OBD port), the remote device 209 via a second network 212, and communicate to the computing environment 203 and the mobile device 206 via third network 212. In at least one embodiment, the security device 103 may not communicate with the vehicle 106 and/or any remote devices 209.

The security device 103 can include a monitor application 215, one or more sensors 218a, one or more transceivers 221a, one or more storage devices 224a, one or more power sources 227a, and one or more locking mechanism 230. The security device 103 can include a circuit board with an embedded computing device or system-on-a-chip (SOC) architecture. The security device 103 can include a computing device with a processor and memory to execute the monitoring application 215. The monitoring application 215 can read measurements from each of the sensors 218a. Based on the measurements, the monitor application 215 can determine whether an unauthorized interaction is in progress or has taken place. Non-limiting examples of unauthorized interactions include, but are not limited to, intrusions, vandalism, material harm, and aggressive or unlawful operation of the vehicle 106.

The monitor application 215 can be executed by a processor of the security device 103 to receive measurements from the sensors 218a, which can be stored in the storage device 224a. The monitor application 215 can send the measurements from the storage device 224a to the security service 233 via the network 212 using the transceiver 221a. The network 212 includes, for example, the Internet, intranets, extranets, wide area networks (WANs), local area networks (LANs), wired networks, wireless networks, or other suitable networks, etc., or any combination of two or more such networks. For example, such networks can include satellite networks, cable networks, Ethernet networks, and other types of networks.

The sensors 218 can sense various aspects of inside or outside of the vehicle 106 and potentially areas proximate the vehicle 106. In some embodiments, the sensor 218 senses various aspects of the security device 103. In one example, the sensor 218 detects that a clutch mechanism has experienced a slip. As another example, the sensor 218 detects that a first portion of the security device is rotated in a first or second direction about a second portion thereof. As another example, the sensor 218 detects that a motor unit or cam thereof is rotated between a first and a second position (e.g., to enable and disable an engagement mechanism).

The sensor 218 can include, but is not limited to, passive infrared (PIR) sensors, microwave sensors, ultrasound sensors, auditory sensors including microphones and glass break sensors, temperature sensors, air quality sensors, ambient light sensors, video and still image cameras, proximity sensors, global positioning system (GPS) sensors, speed sensors, accelerometers, compass, barometer, motion sensors including gyroscopic sensors, pressure sensors, weight sensors, radio frequency sensors including Bluetooth, WiFi, NFC and other RF sensors, tilt sensors, radar sensors, and light detecting and ranging (LiDAR) sensors. The sensors 218 can also include one or more emitting components, such as emitting radar, laser light, visible light, infrared light, ultraviolet light, microwaves, or other emissions for use with various sensors 218. In one example, the sensor 218 is a video recording device comprising an upwardly facing wide-angle camera for detecting a 360 degree view of the interior of the vehicle 106. In certain embodiments, the PIR sensor 218, speaker, GPS sensor 218, and other sensors 218 may be positioned in optimal locations within the apparatus for optimizing performance (e.g., the PIR sensor 218 may be positioned on the driver's side of the apparatus to better detect carjacking intrusions, etc.).

The one or more sensors 218 may operate simultaneously, and each sensor 218 may communicate its readings to the monitor application 215. In various embodiments, the sensor readings may be communicated along a data bus, or each sensor 218 may include its own designated port, or communication session on a circuit board. Examples of readings include, but are not limited to, captured image, video, or audio data and values for pressure, temperature (e.g., discrete temperature or a rate of change of temperature), humidity, distance, orientation (e.g., tilt), weight, reflected signal strength, and other measurements.

The sensor 218 can operate in a variety of modes including, but are not limited to, low power mode, high power mode, low sensitivity mode, high sensitivity mode, low frequency mode, high frequency mode, valet mode, pet-friendly mode, and various combinations of two or more modes. The monitor application 215 can configure the operation in a particular mode automatically, for example, in response to a predetermined schedule, in response to receiving a command or request, or in response to determining that a sensor reading meets particular criteria, such as a threshold or particular value. In low power mode, one or more sensors 218 can be configured to operate at a lower power usage level, for example, by reducing power to an emitting component, by reducing a strength and/or frequency of measurements from the sensor 218, or by reducing power to or deactivating other components. In some embodiments, one or more sensors 218 are disabled during low-power mode, while other sensors 218 stay enabled. In one example, in low power mode, a microwave sensor is disabled while a PIR sensor remains enabled (e.g., and is configured to reduce a power usage of the sensor).

In high power mode or normal power mode, one or more sensor 218 can be configured to operate at a higher power usage level for purposes including, but not limited to, enabling high-frequency and/or high power measurements to be performed, allowing a transceiver to operate at a greater transmission range or strength, and other purposes. In some embodiments, the low power mode includes configuring the sensor 218 in the low sensitivity and/or low frequency modes and the high power mode includes configuring the sensor 218 in the high sensitivity and/or high frequency modes.

In low sensitivity mode, one or more thresholds for controlling configuration or performance of the sensor 218 can be configured at higher values. In one example, the sensor 218 measures reflected sound waves to detect individuals and their proximity to the device and thus to the vehicle, and the sensor 218 can have a reflected power threshold related to the power of reflected signal received at the sensor 218. In the same example, upon the reflected power threshold being exceeded, configuration to high power mode and transmission of an alert can occur. Continuing this example, in the low sensitivity configuration, the reflected power threshold can be increased such that a greater reflected signal power is required to trigger the high power mode and alert transmission. The low sensitivity mode can be configured, for example, to prevent the device taking action in response to potentially false positives.

In high sensitivity mode, one or more thresholds for controlling configuration or performance of the sensor 218 can be configured at lower values. In one example, the sensor 218 measures sound of a particular frequency range and comprises a decibel measurement threshold that, when exceeded, causes the sensor 218 to configure a high power mode and transmit an alert. In the same example, in the high sensitivity configuration, the decibel measurement threshold is decreased such that a lower decibel level within the particular frequency range, when measured, causes the re-configuration to high power mode and transmission of the alert. In another example, a sensitivity of a microwave sensor is increased to detect movement occurring outside of a vehicle 106. The high sensitivity mode can be configured, for example, to potentially increase vehicle security by providing a lower caliber of criteria to be satisfied before a potential intrusion is determined and appropriate actions are taken. In some embodiments, a sensitivity of a first sensor is increased and a second sensitivity of a second sensor is maintained. For example, a sensitivity of a microwave sensor is increased while a sensitivity of a PIR sensor is unchanged.

In the low frequency mode, the sensor 218 can be configured to perform measurements at a lower frequency rate, whereas, in the higher frequency mode, the sensor 218 can be configured to perform measurements at a higher frequency rate than in lower frequency mode. In one example, the sensor 218 is a pressure sensor that, in the low frequency mode, measures the internal pressure of a vehicle at a rate of about 0.5 Hz and, in the high frequency mode, measures the internal pressure at 2.0 Hz. In another example, the sensor 218 is a camera that, in the low frequency mode, captures an image of the vehicle interior every 20 seconds and, in the high frequency mode, captures a video stream at 5 frames per second. In another example, the sensor 218 is an ultrasonic sensor that, in the low frequency mode, emits acoustic signals at a rate of about 1.0 Hz and, in the high frequency mode, emits the acoustic signals at a rate of about 10 Hz. In this example, the emission of the acoustic signals can be configured via a general purpose input/output (GPIO) pin at the sensor 218 or security device 103 in control thereof.

The low and high frequency modes can, alternatively or in addition, include adjusting a frequency at which the security device 103 reads measurements from the sensor 218. For example, in the low frequency mode, the monitor application 215 is configured to read an ultrasonic sensor at a rate of about 0.1 Hz and, in the high frequency mode, is configured to read the ultrasonic sensor at a rate of about 1.0 Hz.

In valet mode, one or more sensors 218 can be activated for monitoring operation of the vehicle 106 by valet personnel without triggering an alarm and/or other actions associated responding to an intrusion event. For example, a GPS sensor 218 can be configured to operate in a high frequency mode to transmit a current location of the vehicle 106 in near real-time. In this example, upon the monitor application 215 determining that the vehicle 106 has ceased movement (e.g., the readings of the GPS sensor 218 are consistently similar for a predetermined time period), the monitor application 215 can transmit a notification to the mobile device 206 that includes the current location of the vehicle 106. As another example, an accelerometer and/or OBD sensor 218 can be configured to operate in a high frequency mode to record motion and performance of the vehicle 106 including acceleration rates, speed, brake application, collisions, airbag deployments, seatbelts, etc. In this example, upon the monitor application 215 determining that the vehicle 106 is operating outside of normal parameters (e.g., speeding, aggressive handling, etc.), the monitor application 215 can transmit an alert to the mobile device 206, cause an alarm to be emitted from the security device 103, or take other appropriate actions. In some embodiments, the security device 103 is configured not to continuously record readings from the sensor 218 and other devices but to not generate alarms.

In another example, a geofence is generated around the user's mobile device 206 or a particular location (e.g., which may be entered into the security application 251 or automatically determined). In this example, GPS readings from an OBD system 257 or sensor 218 are analyzed to determine if the valet has moved the vehicle 106 (or security device 103) beyond the geofence. Continuing this example, an alarm is generated in response to determining that the vehicle 106 is moved beyond the geofence. In a similar example, in response to determining that the vehicle 106 is within a predetermined proximity of a boundary of the geofence, a warning is automatically emitted from the security device 103. In another example, the user can transmit voice messages via the security application 251 that are emitted by security device 103 into the vehicle 106.

In a pet-friendly mode, operating parameters of one or more sensors 218 can be modified such that a pet in or around the vehicle 106 does not result in the security device 103 registering an intrusion event. The pet friendly mode can include setting the sensor 218 to a low sensitivity mode or disabling the sensor 218. For example, a sensitivity of a PIR sensor can be reduced such that reflected IR light from the pet does not trigger the PIR sensor. As another example, a sensitivity of a weight sensor is reduced such that a weight of the pet does not trigger the weight sensor. In another example, parameters for object recognition processes of image-based sensors are adjusted such that the pet is not recognized as a potential intruder. In some embodiments, a mobile device, such as an RFID tag, is affixed to the pet, for example, on the collar thereof. In at least one embodiment, the sensor 218 can detect the mobile device and, in response to the detection, the monitor application 215 can automatically configure one or more sensors 218 to a pet-friendly mode.

The monitor application 215 can manage the configurations of each of the sensors 218 individually or in the aggregate. In some embodiments, a reading from a first sensor 218 can cause the monitor application 215 to make a configuration change to a second sensor 218. The monitor application 215 can configure the various sensors according to one or more rules in the configuration data 245. In some embodiments, the configuration settings for each sensor are determined by the security service 233 and sent to the monitor application 215 to apply to the sensors 218. In other embodiments, the monitor application 215 can receive the rules from the security service 233 and apply the rules to configure the security device 103 (e.g., the sensors 218a and other components) and potentially other devices, such as the vehicle 106 and the remote devices 209. Measurements from a first sensor 218 can be processed and analyzed in a local computing environment and determinations generated therefrom can be used to initiate a configuration change of a second sensor 218 from a low power mode to a high power mode (or vice versa).

In some examples, configuring the sensor corresponds to adjusting the way the monitor application 215 interacts with the sensor. The monitor application 215 may receive a stream of a video from a camera sensor 218 and only store at the predetermined frequency according to the configuration. In one example, the monitor application 215 can configure a camera sensor to continuously operate in a low frequency mode and a sound sensor to continuously operate in a high frequency mode. In this same example, upon the sound sensor detecting a sound of a frequency and decibel level that satisfies a predetermined threshold (e.g., such as a window breaking or door handle being operated), the camera sensor is re-configured to a high-frequency mode and captures a continuous video of the vehicle interior for a predetermined time period.

The sensor 218 can be configured to continuously record a predetermined period of activity at a predetermined refresh rate. In one example, a camera sensor continuously captures a threshold duration of video data in a buffer in real time, the buffer being overwritten by each subsequent capture. In the same example, in response to determining that an event has occurred, the most-recent buffer of video data can be retrieved to provide analyzable data for activity occurring in or around the vehicle 106 during the time period immediately preceding the event.

In some embodiments, one or more sensors 218 may correspond to one or more electrical components in communication with the monitor application 215 via one or more general purpose input and output pins. The monitor application 215 may generate a signal, such as an RS232 signal, an RS485 signal, an I2C signal, or other signal, to communicate with, read from, or configure the sensor 218. The sensor 218 may include an onboard memory with configuration options to store the configuration from the monitor application 215. In other embodiments, the sensor 218 may be configured based on an input voltage at one or more pins, and the monitoring application 215 can control the output voltage (e.g., via a digital to analog converter, through pulse width modulation, or similar control) on the one or more pins to configure the sensor 218. In another embodiment, the sensor 218 may be configured based on a resistance between two or more pins, and the monitoring application 215 can adjust a variable resistance to configure the sensor 218.

The monitor application 215 can be configured to perform various processes for supporting functions of the security device 103 including, but not limited to, processing sensor readings, analyzing sensor readings, and, based on the analyses, determining if an event has occurred. In some embodiments, the monitor application 215 can cause the security device 103 to undergo a change in operating mode. For example, the monitor application 215 can determine that readings from a sensor 218 exceed a predetermined threshold and, in response to the determination, the security device 103 can transition from a low power mode associated with passive sensor processing to a high power mode associated with transmitting sensor readings and generating alerts.

The monitor application 215 can enable or disable the transceiver 221a. The transceiver 221 can communicate with the network 212 via an internet connection. The internet connection can correspond to a cellular data connection, a satellite data connection, a WiFi connection, or some other connection. In one embodiment, the security device 103 can connect to a WiFi network provided by the vehicle 106. In another embodiment, the security device 103 can use a first transceiver 221 to access or provide a cellular or satellite data connection, and the security device 103 can use a second transceiver 221 to provide a WiFi hotspot in the vehicle 106. The vehicle 106 or a mobile device 206 may utilize the WiFi hotspot to access the internet via the first transceiver and the second transceiver.

The transceiver 221 can be configured for sending and receiving data via the network 212. The monitor application 215, via the transceiver 221a, can transmit and receive various commands from the computing environment 203, the mobile device 206, and/or the remote device 209. In response to commands received at the transceiver 221, various behaviors and parameters of the security device 103

(or components connected thereto) can be changed. For example, the monitor application 215 can receive a command instructing the security device 103 to enter a normal or high power mode. In response to receiving the command, the monitor application 215 can automatically re-configure the security device 103 from a low power mode to the normal or high power mode. As another example, the monitor application 215 can receive a request for sensor readings including a video of the interior of the vehicle 106. In this example, in response to receiving the request, the monitor application 215 can retrieve and transmit buffer data comprising the video to the computing environment 203, to the mobile device 206, or to a particular destination provided in the request.

The storage 224 can provide data storage for interim data being used by the monitor application 215, such as historical sensor measurements including video and audio data among other data. The monitor application 215 may store and maintain one or more sensor data buffers on the storage 224 with a configured amount of sensor history. As an example, the storage 224 may include a video buffer with the most recent thirty seconds of video being stored. When an unauthorized event is detected, the monitor application 215 may capture and store sensor data (e.g., video, audio, or other sensor data) during the unauthorized event. The monitor application 215 may copy or otherwise initialize the sensor data for the unauthorized event with a portion or all of the sensor data buffers. The monitor application 215 may transmit the stored sensor data to the computing environment 203, either in real-time or in segments according to predetermined criteria. In some embodiments, the storage 224 includes information associated with one or more user accounts registered with the security device 103. For example, the storage 224 can include lists of contacts, payment processing information, addresses, and other data.

As an illustrative example, an unauthorized person may walk around the vehicle 106 from 1:00:01 PM to 1:00:27 PM, then proceed to break a window and enter the vehicle 106 from 1:00:28 PM to 1:00:45 PM. The monitor application 215 may sense an unauthorized person breaking the window or entering the vehicle 106, via one or more sensors 218 at 1:00:29 PM. At 1:00:29 PM, the sensor data buffer may include historical data measurements from 12:59:59 PM (e.g., if configured for a 30 second buffer), and the monitor application 215 can capture and store sensor data including the sensor data buffer from 12:59:59 PM (or a subset thereof). In this example, by using the sensor data buffer, even though the security device 103 doesn't trigger an alarm of the unauthorized person entering the vehicle 106 until 1:00:29 PM, the security device 103 can still provide sensor data from before the alarm was triggered.

The power source 227 can include a battery, a capacitor, a DC power source, an AC power source, another power source, or a combination thereof. As an example, the security device 103 may have a battery mounted inside of a case to provide power to circuitry and sensors 218 included therein. As another example, the security device 103 may receive power from the vehicle 106, such as from a cigarette lighter, a power outlet, a USB port, an OBD port, a wireless charging connection, or through another connection. In one example, the vehicle 106 may include a wireless power source 227 (e.g., a QI or other inductive charger) in a cup holder or another location, and the security device 103 can receive electrical energy from the wireless charger. The security device 103 may store the electrical energy in an onboard battery or other onboard power source 227.

The security device 103 can be mounted into the vehicle 106 to provide a user of the vehicle 106 with monitoring and notification when a malicious party interacts with the vehicle 106. The security device 103 can be secured into the vehicle 106 via the locking mechanism 230 to prevent the malicious party from being able to remove or disable the security device 103 during an unauthorized interaction with the vehicle 106, e.g., a break-in event. In one embodiment, the security device 103 has a form factor that fits within a cup holder of the vehicle 106. A body of the security device 103 can include a first portion and a second portion that can be rotated relative to one another. The locking mechanism 230 may engage when the first portion rotates relative to the second portion in a first direction and disengage when the first portion rotates relative to the second portion in a second direction. The first direction may be opposite the second direction.

The locking mechanism 230 can include an engaging component that can be enabled or disabled electronically, for example, in response to a command or in response to a particular sensor reading or determination generated therefrom. In some embodiments, the engaging and disengaging of the locking mechanism can be enabled or disabled by the monitor application 215. In one example, the security device 103 may include a solenoid that may extend or retract to enable or disable the locking mechanism 230. As another example, the locking mechanism 230 can include a cam that may rotate to engage or disengage a clutch mechanism. When the engagement component is disabled, rotating the first portion relative to the second portion does not engage or disengage the locking mechanism 230. In contrast, when the engagement component is enabled, rotating the first portion relative to the second portion does engage and/or disengage the locking mechanism 230. In one example, the security device 103 receives a command from the mobile device 206 to disable the locking mechanism 230 and, in response, the locking mechanism 230 receives a signal causing the engaging component to be disabled. In another example, a sensor 218 measures an RFID key fob and the monitor application 215 determines that the RFID key fob is within a predetermined distance and is associated with an identifier. In this example, in response to the determination, the locking mechanism 230 automatically disables the engaging component.

When engaging, the locking mechanism 230 may include extending one or more legs or protrusions outward from the body. The protrusions may contact and apply a pressure to an interior surface of the cup holder such that the protrusions create static friction to prevent removal when an upward or extracting force is applied to the security device. The locking mechanism 230 may include a clutch mechanism or other force limiting mechanism to prevent damage to the cup holder of the vehicle 106. As an example, once the outward force of the protrusions meets or exceeds a threshold, the clutch mechanism can disengage or slip to allow rotation of the first portion relative to the second portion in the first direction without further engaging the locking mechanism 230. In some embodiments, the monitor application 215 may sense the activation of the clutch mechanism or that the locking mechanism 230 is fully engaged. The monitor application 215 may provide feedback to a user of the security device 103. The feedback can include providing visual feedback via a light (e.g., a light ring), providing audible feedback (e.g., a chirp or ding), send a message (e.g., a text message, a notification, or an email), or through some other feedback.

In one embodiment, the locking mechanism 230 can include two or more discs or plates configured to rotate about a vertical axis. The locking mechanism 230 can include a clutch mechanism, which can be formed from two or more of the discs. In one embodiment, a spring-loaded retention mechanism (e.g., a ball bearing, protrusion, substantially spherical object, inclined plane, or other object, which are collectively referred to as a "ball" herein) is positioned between the two discs. The ball may be coupled to a driving pin that passes through an aperture in a first disc. Meanwhile, the second disk can include a track for the ball to travel along when the first disk is rotated relative to the second disc. The track may be circular with a distance to the center of the track from the center of the disk being equal at all points. The track can include one or more protrusions blocking the track. The protrusions can each include two inclined planes, with a first inclined plane facing a first direction and a second inclined plane facing a second direction opposite the first direction. The first inclined plane can contact the ball when a first disk rotates relative to the second disk in one direction. Similarly, the second inclined plane can contact the ball when the first disk rotates relative to the second disk in another direction.

When the ball contacts the inclined plane (either the first inclined plane or the second incline plane), the turning force (also referred to as a rotational force or torque) can be translated into both a vertical and a horizontal component according to an angle of the incline plane. Stated differently, the force to rotate the first portion (including the ball) during a rotation becomes obstructed by the inclined plane, and on contact with the incline plane, cause rotation of the second portion while simultaneously providing a vertical component of force on the ball. The vertical component of force can be opposed by or push against the spring force that holds the ball in place. When the vertical component meets or exceeds the force of the spring, the ball can travel up and over the inclined plane. The vertical component can exceed the force of the spring when the rotational force meets or exceeds a predetermined set threshold (e.g., about 15-100 N*m) to prevent over tightening (or loosening) of the locking mechanism 230. By traveling over the inclined plane (referred to herein as the clutch mechanism slipping), the ball stops providing the rotational force to the second portion, and as such, can act as a clutch mechanism. The angle of the incline plane can change the amount of rotational force necessary to cause the clutch mechanism to slip. In some embodiments, the angle of the incline plane can be greater, and thereby allow a greater force before the clutch slips, in a loosening direction of travel than in a tightening direction of travel. The difference in angle allows a user greater capability to loosen the security device 103 than to tighten the security device 103.

In alternate embodiments, the locking mechanism 230 is a motorized locking system, a screw lock system (e.g., without a clutch mechanism), or another non-clutch-based mechanism for extending the plurality of legs 307. In at least one embodiment, the locking mechanism 230 engages based on non-friction-based mechanisms, such as, for examples, suction elements, magnets, and adhesives, among others.

In one example, a security device 103 is inserted to a target site and a downward pressure is applied to the security device 103. In this example, the downward force depresses a first portion toward a second portion and the depression causes an internal suction mechanism to be drawn upwards, thereby generating a vacuum force between a bottom surface of the security device 103 and the target site. Continuing this example, the suction mechanism is locked in the depressed position, thereby securing the security device 103 to the target site based on the vacuum force.

In another example, a bottom surface of the security device 103 includes one or more adhesive strips that can be pressed against a target site to secure the security 103 thereto. In another example, the security device 103 includes an electromagnet that is engaged upon the connection of the security device 103 to a power source. In this example, the electromagnet secures the security device 103 to a target site within the vehicle 106 that includes ferromagnetic materials, such as, for example, a seat chassis.

The computing environment 203 can include one or more mobile devices 206, a security service 233, and a data store 236. The elements of the computing environment 203 can be provided via a plurality of computing devices that may be arranged, for example, in one or more server banks or computer banks or other arrangements. Such computing devices can be located in a single installation or may be distributed among many different geographical locations. For example, the computing environment 203 can include a plurality of computing devices that together may include a hosted computing resource, a grid computing resource, and/or any other distributed computing arrangement. In some cases, the computing environment 203 can correspond to an elastic computing resource where the allotted capacity of processing, network, storage, or other computing-related resources may vary over time.

The data store 236 can store various data that is accessible to the security device 103 and/or the mobile device 206, and is used by the networked environment to execute various processes and functions discussed herein. The data store 236 can be representative of a plurality of data stores 112 as can be appreciated. The data store 236 can include, but is not limited to, user data 239, operation data 242, and configuration data 245. In some embodiments, the user data 239, operation data 242, and/or configuration data 245 (or subsets thereof) are stored in storage 224, such as on the security device 103.

The user data 239 can include information associated with one or more user accounts. For example, for a particular user account, the user data 239 can include, but is not limited to, an identifier, user credentials (e.g., a username and password, biometric information, such as a facial or fingerprint image, cryptographic keys such as public/private keys, etc.), a name of an owner of the vehicle 106 in which the security device 103 is installed, contact information (e.g., phone number, email, etc.) for a user associated with the user account, user preferences for controlling processes in the networked environment 200, payment processing information (e.g., credit card number, expiration date, etc.), and information related to the vehicle 106 (e.g., a make, model, license plate number, etc.). In some embodiments, the user data 239, or a subset thereof, is stored in an encrypted format. For example, personally identifiable information (PII) associated with the user or the vehicle 106 can be encrypted such that access thereto requires a dual-authentication process, authentication of a public-private key pair, and/or other security measures.

The operation data 242 can include readings or measurements from the sensors 218 or other information related to the operation of the security device 103. The operation data 242 can include other historical information such as a history of mode transitions, a history of problems (e.g., data transmission errors, storage errors on storage 224 including file system corruptions, interruptions or disruptions to the power source 227, failure of the locking mechanism 230, identification of an attempt to remove the security device 103 from vehicle 106, etc.). The readings and historical information can include timestamps such that the operation data 242 provides a time-series of data describing activities occurring in or around the vehicle 106.

The configuration data 245 can include parameters for controlling operation of each sensor 218. Non-limiting examples of parameters include, but are not limited to, sensor modes, schedules for controlling sensor behavior, sensitivity levels, power levels, thresholds, and other suitable parameters. The configuration data 245 can include an identifier corresponding to each sensor 218. In some embodiments, portions of the configuration data 245 that are co-temporal can be stored as a multi-dimensional storage object in which each dimension corresponds to a particular sensor 218 and/or sensing mode (e.g., video, audio, environmental, etc.).

The configuration data 245 can include various threshold values, benchmark values, or ranges of values for controlling processes described herein. In some embodiments, the storage 224 includes configuration data 245 associated with each sensor 218 in communication with the security device 103. The configuration data 245 can include one or more rules and configuration options for each security device 103. The rules can be configured by a user via the mobile device 206. As an example, a first rule for a first security device 103 may relate to privacy and specify that the GPS location of the vehicle is not to be transmitted or stored in the data store 236. A second rule for a second security device 103 may specify that the GPS location should be determined and sent continuously or at a predetermined frequency whenever an alarm is triggered. Other rules may include power usage restrictions (e.g. converting to low-power mode automatically at a preset battery level, disabling a particular sensor 218 until a measurement from another sensor 218 meets a configured threshold, etc.), authentication requirements (e.g., multi-factor authentication, etc.), and other rules.

The configuration data 245 can be retrieved by, for example, upon setup of the security device 103 and upon changes thereafter. When the security device 103 is offline, any changes to configuration data 245 may be held until the next communication with the security device 103 or upon a scheduled event, such as while parked in a garage with high speed internet. Other non-limiting examples of configuration data 245 include, but are not limited to, audio level thresholds, temperature thresholds, humidity thresholds, pressure change thresholds, emitted or reflected signal thresholds (e.g., heat signals, ultrasonic signals, etc.), tilt thresholds, weight thresholds, vehicle specific profiles, and combinations of thresholds. In one example, a first threshold for an audio sensor 218 comprises a value that, upon being exceeded by a reading of the audio sensor 218, causes the audio sensor 218 to transition from a lower power mode to a high power mode.

The security service 233 is configured to be executed in the computing environment 203 to receive contextual data including sensor readings and other data from the security device 103. The security service 233 can receive, process, and respond to requests from the mobile device 206. The security service 233 can provide real-time data analyses, which can be used to determine a current status of the vehicle 106. The security service 233 can process the readings, compare the readings to user data 239, historical operation data 242 or configuration data 245, and generate various determinations based on the comparisons and other analyses. In one example, the security service 233 can receive and process a video stream from the security device 103. In this example, the security service 233 can execute object detection algorithms, machine learning algorithms, etc., on the video data for identifying features therein and determining if an event occurred, such as a person (e.g., a potential intruder) approaching or entering the vehicle 106.

The mobile device 206 can include one or more displays 248, a security application 251, and one or more input devices 254. The security application 251 can be executed to monitor and control the security device 103. In some embodiments, the security application 251 can communicate with the monitor application 215 directly or via the security service 233. The security application 251 can communicate with the security service 233 to determine various information about the security device 103 including determining a current mode, a current location, a history of events, sensor measurement information, a lock stage of the locking mechanism 230, and various other details. The security application 251 can generate user interfaces to display the various information and receive edits from a user. The security application 251 can communicate those edits to the security service 233 or monitor application 215 to adjust configuration properties of the security device 103.

The mobile device 206 can be any network-capable device including, but not limited to, smartphones, computers, tablets, smart accessories, such as a smart watch, key fobs, and other external devices. The mobile device 206 can include a computing device with a processor and memory. The mobile device 206 can include a display 248 on which various user interfaces can be rendered by the security application 251 to configure, monitor, and control the security device 103. The security application 251 can correspond to a web browser and a web page, a mobile app, a native application, a service, or other software that can be executed on the mobile device 206. The security application 251 can display information associated with processes of the security device 103. The mobile device 206 can include an input device 254 for providing inputs, such as requests and commands, to the mobile device 206. The input devices 254 can include a keyboard, mouse, pointer, touch screen, speaker for voice commands, camera or light sensing device to reach motions or gestures, or other input device. The security application 251 can process the inputs and transmit commands, requests, or responses to the security device 103 or the computing environment 203 based thereon. According to some embodiments, the mobile device 206 is maintained by a system user and is often physically separate and remote from the security device 103.

The security application 251 can implement an application programming interface (API) for facilitating communication with the security device 103 and/or computing environment 203. The security application 251 can transmit, modify, and store various data on the mobile device 206, such as, for example, an identifier corresponding to the security device 103 (or a user thereof) and other user data 239, operation data 242, or configuration data 245. In one example, the security application 251 can transmit arming and disarming commands to the security device 103 or computing environment 203 that cause arming or disarming processes to be initiated (see FIGS. 13, 14). In another example, the security application 251 transmits location data comprising a location of the mobile device 206 to the computing environment 203 that processes the location data to determine if the user is within a predetermined range of the vehicle 106.

When proximate to the security device 103, the security application 251 can communicate with the monitor application 215 via a local wireless communication, such as near field communication (NFC), Bluetooth, WiFi, or other wireless communications. The mobile device 206 may be considered proximate to the security device 103 when the mobile device 206 is within a wireless range of the security device 103 for the local wireless communication technology. In some embodiments, the monitor application 215 can transition to a different mode based on one or more mobile devices 206 entering or leaving the range of the wireless communication technology.

The remote device 209 can include one or more sensors 218b, one or more processors 216, one or more transceivers 221b, one or more storage devices 224b, and one or more power sources 227b. The remote device 209 can include a computing device with a processor and memory to execute an application to perform various functionality discussed herein. The remote device 209 may comprise a secondary device to receive sensor measurements remote from the security device 103. As an example, the remote device 209 may be positioned further toward a rear of the vehicle 106 than the security device 103 such that measurements from sensors 218b (e.g., a PIR sensor 218b or microwave sensor 218b, etc.) can collect measurements from a different perspective or position within the vehicle. In one example, the remote device 209 can be positioned in a rear cup holder, a door cup holder, a door storage area, affixed to a window, positioned in the truck, or located in another position. In another example, the remote device 209 is mounted to a rim of a wheel and includes GPS sensors (e.g., allowing for tracking of the location of tire if removed from the vehicle 106). The remote device 209 can include a battery power source 227b, a solar power source 227b, and/or may be coupled to a power source 227b of the vehicle 106. In some embodiments, the remote device 227b has a battery power source 227b and the security device 103 has a power source 227a that receives electrical energy from the vehicle 106.

The remote device 209 can communicate with the security device 103 via a transceiver 221b. The communication may utilize a close proximity and low power technology that may be wireless or wired, such as Bluetooth, NFC, Zigbee, Z-Wave, WiFi, or similar localized wireless RF communication. The remote device 209 may transmit measurements from sensors 218b to the monitor application 215 for further processing and transmission to the computing environment 203. In one embodiment, the remote device 209 reads measurements from sensors 218b at a frequency that is below the frequency of measurements read from sensors 218a to conserve power from power source 227b. In some embodiments, the remote device 209 only communicates with the security device 103. In at least one embodiment, the remote device 209 reads measurements at a lower sensitivity than the security device 103 to conserve power. As an example, the sensitivity of a first microwave sensor 218a is configured to be higher and use more power than the sensitivity of a second microwave sensor 218b. Similar to the security device 103, the remote device 209 can store sensor data locally on a storage 224b and transmit the sensor data from the storage 224b or can transmit the sensor data directly as read.

In some embodiments, the remote devices 209 are distributed around the interior and/or exterior of the vehicle 106, and each of the remote devices 209 can communicate with the security device 103 from its respective location. Accordingly, each of the remote devices 209 can be located in a position for optimally detecting intrusions.

The vehicle 106 can include one or more sensors 218c, an on-board diagnostics (OBD) port 257, and one or more transceivers 221c. The vehicle 106 can communicate with the network 212 via a wireless transceiver 221c or wired connection. It can be appreciated that vehicles 106 include various technologies for collecting data such as GPS systems, diagnostic systems, vehicle status systems, and other systems. The vehicle 106 may obtain vehicle information natively such as tire pressure, a current location, an engine temperature, vehicle interior temperature, exterior temperature, a status of whether the vehicle 106 is running, a position of each window of the vehicle 106, any outstanding service or maintenance issues of the vehicle 106, a speed of the vehicle 106, a direction of travel of the vehicle 106, a count of miles traveled since starting the vehicle 106, a status of whether each door is opened or closed, a status of whether or not each door is locked or unlocked, a status of whether the hood or trunk is open or closed, a status as to whether the gas cap is secured, engine ignition attempts, a change in fuel levels, changes in pedal positions, a status of whether the vehicle 106 is in drive, reverse, park, neutral or other drive configuration, a status of which gear the vehicle is in, and other information related to the current or historical state of the vehicle 106.

The security device 103 can communicate with the vehicle 106 to obtain the vehicle information via a wireless connection or a wired connection. As an example, the security device 103 may have a cable plugged into a USB port, the OBD system 257, or some other wired standard to request and receive the vehicle information. In some embodiments, the security device 103 includes an external component that is inserted into an OBD port or USB port, and transmits data therefrom to the security device 103. In some embodiments, the security device 103 can also receive a power supply from a wired connection with the vehicle 106. As another example, the vehicle information can be obtained by the security device 103 via a wireless connection, such as WiFi or Bluetooth. In some embodiments, the vehicle information is gathered from the mobile device 206, such as, for example, via CarPlay or Android Auto and sent to the security service 233 or monitor application 215 for further processing (or processed on the mobile device 206). In one embodiment, the monitor application 215, security service 233, or security application 251 can communicate with an API of a service provided by the vehicle manufacturer or a third party to obtain the vehicle information, such as, for example, Mercedes®'s MBUX®, General Motor®'s OnStar® service, Chrysler®'s UConnect®, Amazon®'s Alexa®, SiriusXM®, or some other service. The vehicle 106 may natively transmit some or all of the vehicle information to the third party service natively.

The networked environment 200 can include one or more external systems 259 with which the security device 103, vehicle 106, computing environment 203, mobile device 206, and remote device 209 communicate. The external system 259 can include, for example, a manufacturer or other third party system associated with the vehicle 106 (e.g., OnStar®, UConnect®, etc.). The external system 259 can include an ecommerce system, such as, for example, systems provided by Amazon® or Uber®, as well as various payment processing services, and systems associated with particular businesses such as a restaurant or retailer. The external system 259 can include one or more POS devices 261 that are configured to facilitate transactions. In one example, a POS device 261 includes a near-field communication-based (NFC) payment device configured to detect and communicate with the security device 103 to obtain payment processing information. The payment processing information (e.g., credit card information, etc.) can be stored on the security device 103 and/or in a profile stored at the computing environment 203 or mobile device 206.

The external system 259 can include a commerce service 263 configured to process requests and commands. In one example, the commerce service authenticates commands or requests associated with a POS device 161. In another example, the commerce service 263 receives requests to generate orders for products and/or services, such as food items at a restaurant or a car wash service. In response to receiving requests or commands, the commerce service 263 can authenticate the command or request based on user data 239 and/or other user data stored at the external system 259. In one example, the commerce service 263 requests user credentials from the computing environment 203 to verify an identity of a user account with which a command is associated. The commerce service 263 can receive readings, such as sensor readings from the sensor 218. In one example, the commerce service 263 receives location data from the sensor 218, and determines that the vehicle 106 is within a predetermined geofence associated with a business. In this example, in response to the determination, the commerce service 263 transmits one or more offers or other notifications (such as operating hours, navigation instructions, etc.) to the security device 103 or the mobile device 206. The monitor application 215 or security application 251 can process the offers or other notifications and cause the security device 103 to announce the offer as an audible alert.

Exemplary Device Structure

Figure 3A:
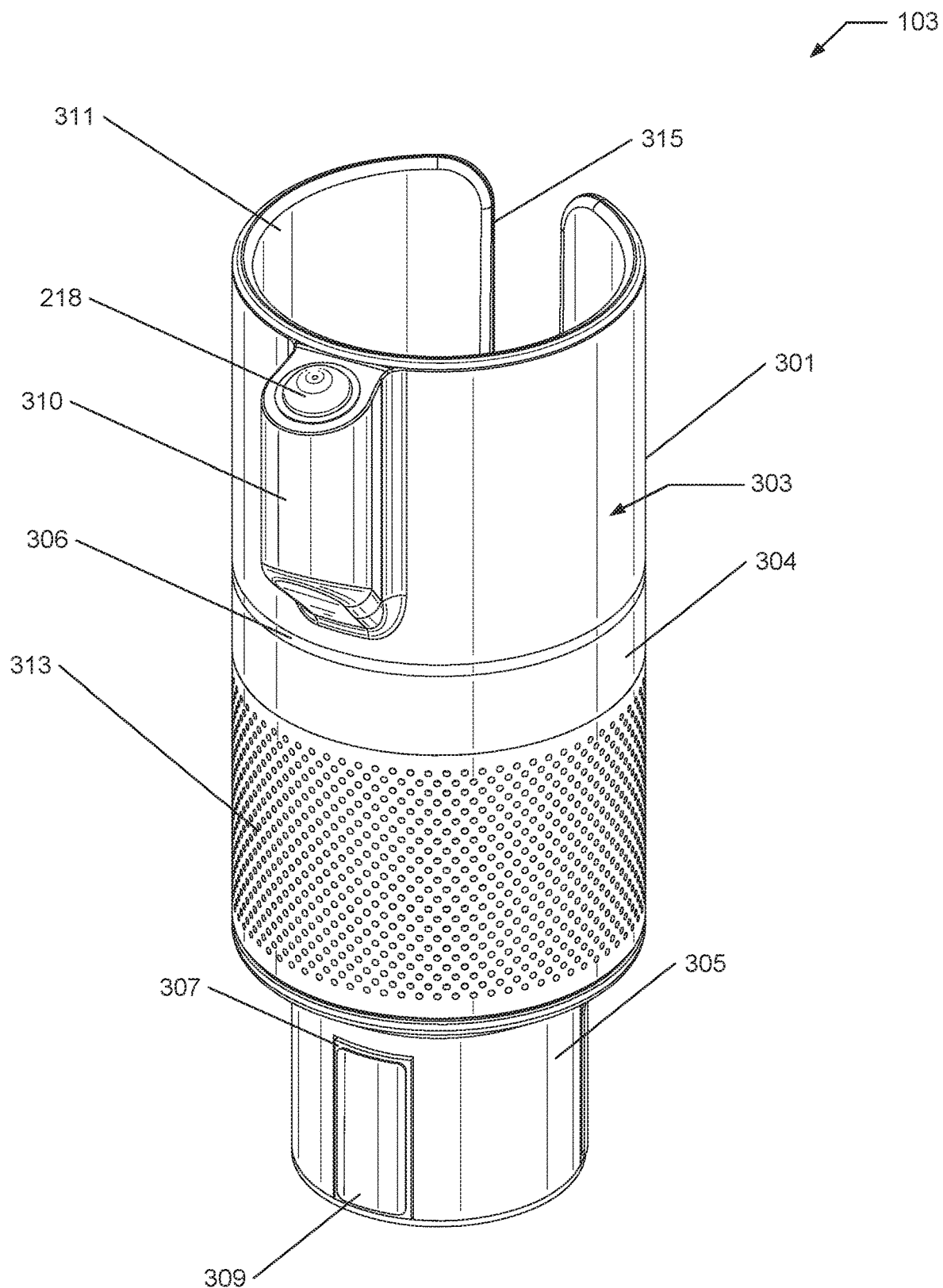
FIGS. 3A-B are perspective views of a security device, according to one embodiment of the present disclosure.

FIG. 3A is a perspective view of a security device 103 according to one embodiment of the present disclosure.

The security device 103 can include a body 301 with a generally cylindrical shape. The shape of the body can correspond to a shape of a target site within a vehicle 106. For example, the body 301 can be shaped to conform to a cup-holder, side door receptacle, or other structure within the vehicle 106. In some embodiments, multiple devices 101 of varying shapes are included. For example, a vehicle (not shown) can include a first security device of a generally cylindrical shape for conforming to a cup-holder and a second security device of a generally rectangular and low profile shape for conforming to a side door receptacle. The body 301 can include one or more materials including, but not limited to, high-strength plastics, polymers, resins, metals, such as stainless steel, and other resilient or semi-resilient materials.

The body 301 can include a first portion 303 and a second portion 305, and the first portion 303 can be configured to rotate about the second portion 305. The first portion 303 can be configured to freely rotate about the second portion 305. Alternatively, the first portion 305 can be configured to rotate freely only between a first and a second position that correspond to particular functions of the security device 103. In one example, the rotation of the first portion 303 about the second portion 305 can engage a locking mechanism (not shown in FIG. 3A). In some embodiments, in place of the first portion 303, the security device 103 includes a first portion 3000A, 3000B, 3000C, or 3000D (as shown in FIGS. 30A-D).

The security device 103 can include one or more lenses 304. The lens 304 can comprise a concentric structure that is configured over and attached to the body 301. In one example, the lens 304 is a Fresnel lens (e.g., or an assembly of multiple Fresnel lenses) that is attached to and encircles the first portion 303. In this example, the lens 304 is configured over a plurality of PIR sensors (not shown) that are arranged radially about the first portion 303 (e.g., at equal or varying heights). Continuing this example, the lens 304 condenses and/or collimates light onto the PIR sensors, thereby increasing a viewing range thereof. In some embodiments, the lens 304 comprises a generally dome-shaped structure that partially or fully encapsulates a sensor.

The second portion 305 can include one or more legs 307 that are configured to extend or protrude outward from the body 301 in response to the engaging of the locking mechanism. In one example, rotation of the first portion 303 about the second portion 305 causes the plurality of legs 307 to extend outward and contact and apply pressure to the walls of a target site, such as a cup holder. As shown in FIG. 3A, the leg 307 is in an unextended position. The leg 307 can include one or more materials, such as stainless steel or high-strength plastics. A distal end 309 of the leg 307 can include one or more friction materials configured to contact and generate frictional forces with the walls of a target site. The friction materials can demonstrate a greater coefficient of friction than other materials from which the leg 307 is formed. Such frictional materials may include rubber, foam, or other materials with high coefficients of friction.

One or more sensors 218 can be disposed on or within the first portion 303 and/or the second portion 305. In one example, the first portion 303 includes a first sensor 218 attached to a sensor mount 310, and a plurality of secondary sensors 218 configured externally on the body 301. In another example, in one embodiment, the first portion 303 includes a first sensor for detecting motion of a person and the second portion 305 includes a second sensor for detecting tilt of the vehicle 106. In another example, the first portion 303 includes a first sensor for detecting pressure and the second portion 305 includes a second sensor for detecting sound. The body 301 can include one or more sensor mounts 310 to which one or more sensors 218 are mounted. The sensor 218 can detect activity occurring within the security device 103 and/or within and around a vehicle within which the security device 103 is installed.

The first portion 303 can include a cup holder 311 for receiving a beverage or other item. In some embodiments, the first portion 303 includes a slot (not shown, see FIG. 10) sized to receive a mobile device, such as a smartphone. The first portion 303 can include a magnetic or rubberized phone mount for securely holding a smartphone. The security device 103 can include a device for generating an alarm (not shown). The body 301 can include perforations 313 or other voids for improved transmission of alarms and other sounds originating within the body 301. The first portion 303 can include one or more grooves 315 formed into the body 301 that provide means for easier extraction of items, such as a smartphone or beverage, placed within the cup holder 311.

According to one embodiment, the security device 103 includes one or more speakers (not shown) for transmitting audible alarms and other notifications. The cup holder 311 and/or other portions of the body 301 can be configured to amplify sounds from the speaker. For example, the second portion 305 can be shaped to cause a reverberation of sounds within the cup holder 311. In an exemplary scenario, sound from the speaker is projected downward into the cup holder 311 and is reverberated by the second portion 305 such that a clarity and/or volume of the sound is enhanced. In a similar example, the second portion 305 is shaped to reverberate sound through one or more perforations 313 throughout the body 301.

The security device 103 can include one or more light rings 306 that are configured to emit one or more colors of light at various frequencies and for various durations. In one example, the light ring 306 emits a red light at about 0.5 Hz in response to the security device 103 being configured to an armed state. In another example, the light ring 306 emits a green light at about 0.333 Hz in response to the security device 103 being configured to a disarmed state.

Figure 3B:
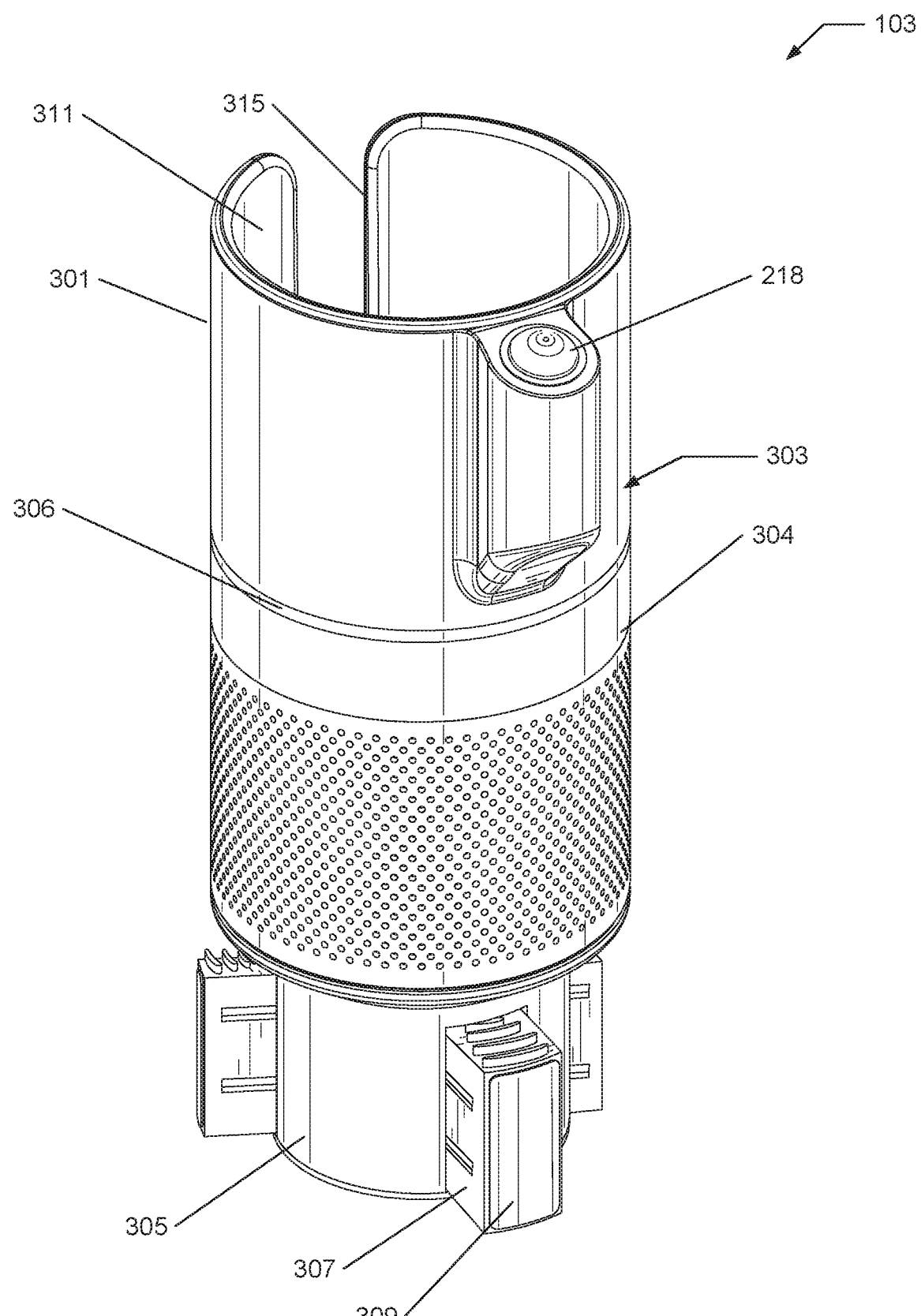

FIG. 3B is a perspective view of the security device 103. In the embodiment shown in FIG. 3B, the first portion 303 has been rotated from a first position (e.g., as shown in FIG. 3A) to a second position and, in response to the rotation, a plurality of legs 307 extend outward from the second portion 305. In one example, the first portion 303 is rotated about 45 degrees counterclockwise, thereby engaging a locking mechanism (not shown) that extends the plurality of legs 307 outward.

FIG. 4 is a top view of a security device 103, according to one embodiment of the present disclosure. The first portion 303 can include an outer diameter 401 that measures about 60-120 mm, about 60-70 mm, about 70-80 mm, about 80-90 mm, about 90-100 mm, about 91.2 mm, about 100-110 mm, or about 110-120 mm, or any other appropriate or relevant measure. The first portion 303 can include an inner diameter 403 that measures about 50-100 mm, about 50-60 mm, about 60-70 mm, about 70-80 mm, about 78.9 mm, about 80-90 mm, or about 90-100 mm, or any other appropriate or relevant measure.

Figure 5:
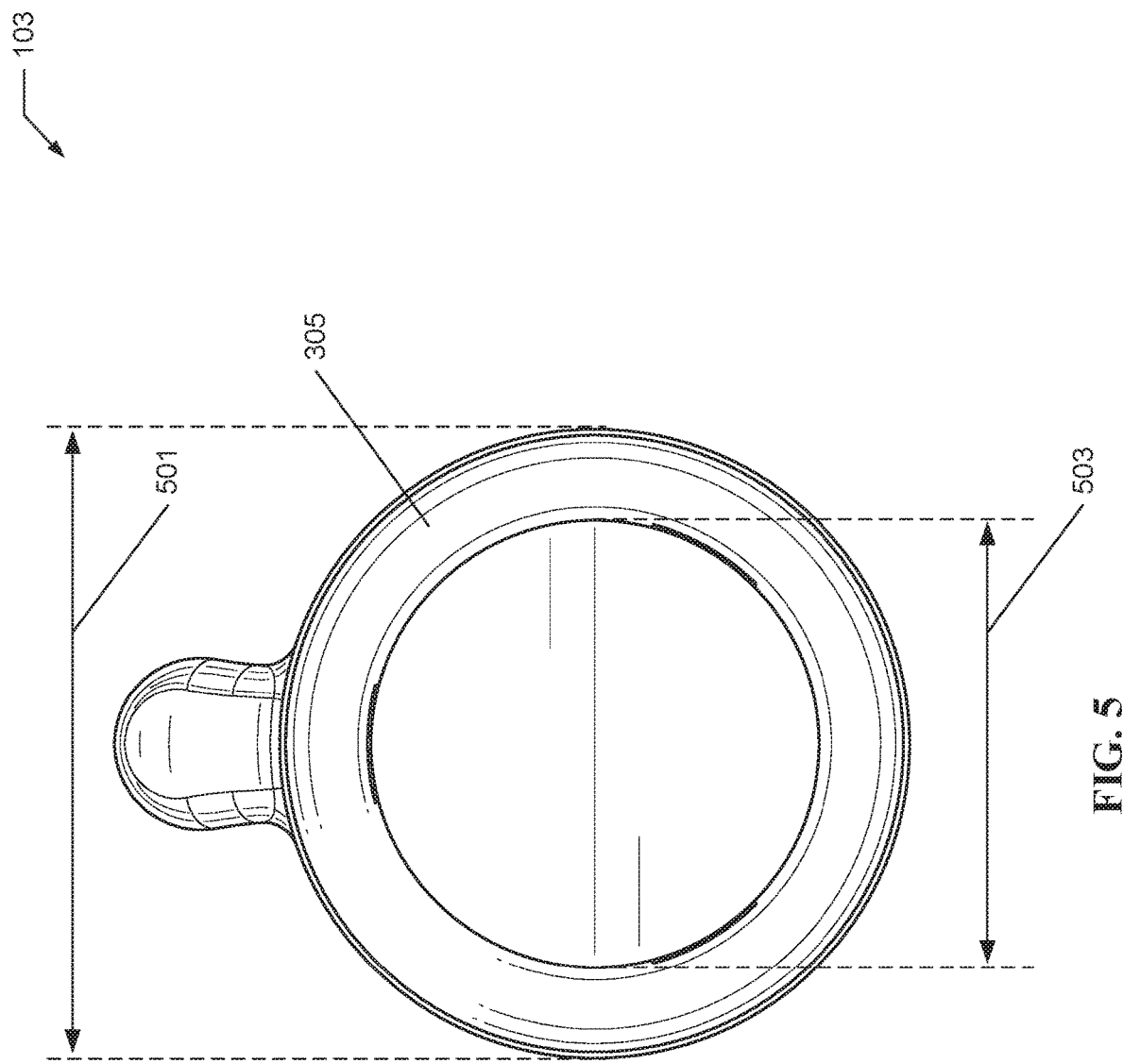
FIG. 5 is a bottom view of a security device, according to one embodiment of the present disclosure.

FIG. 5 is a bottom view of a security device 103, according to one embodiment. The second portion 305 can include an outer diameter 501 that measures about 50-100 mm, about 50-60 mm, about 60-70 mm, about 64.5 mm, about 70-80 mm, about 80-90 mm, or about 90-100 mm.

Figure 6:
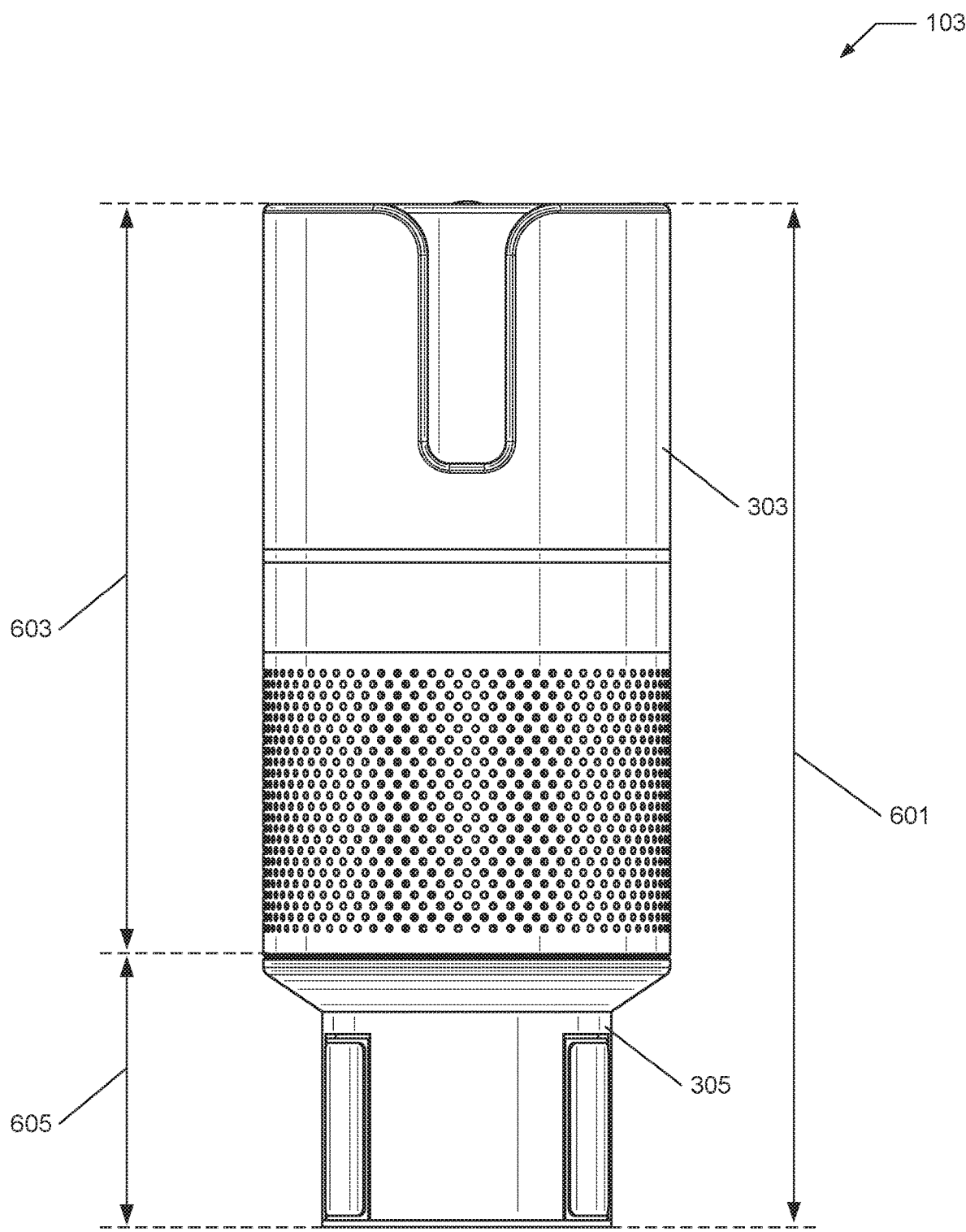
FIG. 6 is a front view of a security device, according to one embodiment of the present disclosure.

FIG. 6 is a front view of a security device 103, according to one embodiment of the present disclosure. The security device 103 can include a height 601 that measures about 150-250 mm, about 150-160 mm, about 160-170 mm, about 170-180 mm, about 180-190 mm, about 190-200 mm, about 200-210 mm, about 210-220 mm, about 220-230 mm, about 230-240 mm, or about 240-250 mm, or any other appropriate or relevant measure. The first portion 303 can include a height 603 that measures about 120-200 mm, about 120-130 mm, about 130-140 mm, about 140-150 mm, about 150-160 mm, about 160-170 mm, about 168.9 mm, about 170-180 mm, about 180-190 mm, or about 190-200 mm, or any other appropriate or relevant measure. The second portion 305 can include a height 605 that measures about 30-100 mm, about 30-40 mm, about 40-50 mm, about 50-60 mm, about 58.6 mm, about 60-70 mm, about 70-80 mm, about 80-90 mm, or about 90-100 mm, or any other appropriate or relevant measure.

Figure 7:
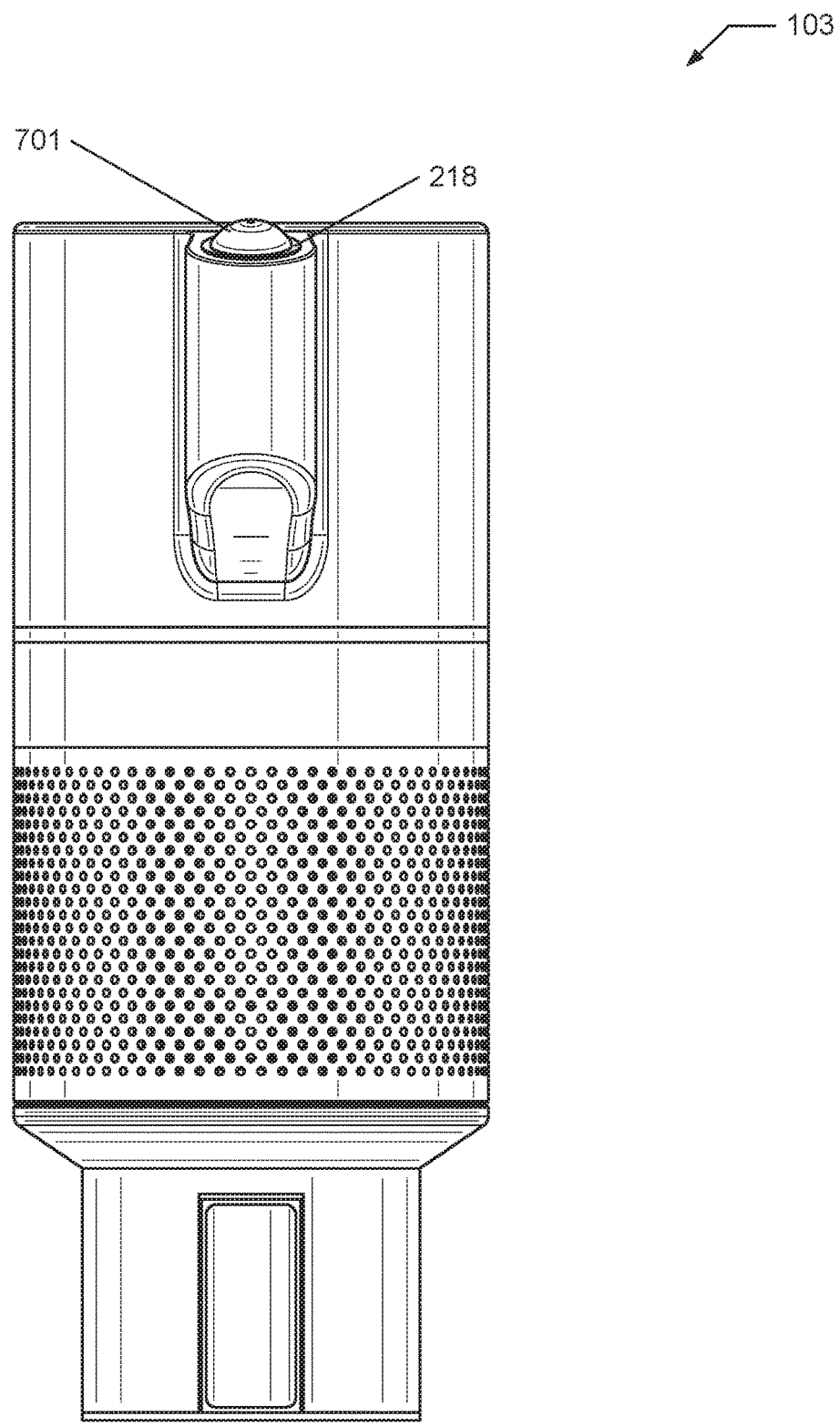
FIG. 7 is a back view of a security device, according to one embodiment of the present disclosure.

FIG. 7 is a back view of a security device 103, according to one embodiment. According to one embodiment, one or more sensors 218 can each include one or more lenses 701. The lens 701 can be configured to improve or augment sensing capabilities of the sensor 218. In one example, the sensor 218 is a camera sensor and the lens 701 is a fisheye lens that encloses the camera sensor. In this example, the lens 701 provides a wider field of view to the PIR sensor. In at least one embodiment, the lens 701 is selected to provide a particular field of view to the camera sensor. In one example, a particular lens is configured over a camera sensor, where the particular lens can provide a viewing angle of about 180 degrees (or, in alternate examples, about 45, 90, 135, 225, 270, 335, or 360 degrees). In another example, the sensor 218 is a PIR sensor and the lens 701 is a Fresnel lens that condenses and/or collimates light to increase a viewing range of the PIR sensor.

Figure 8:
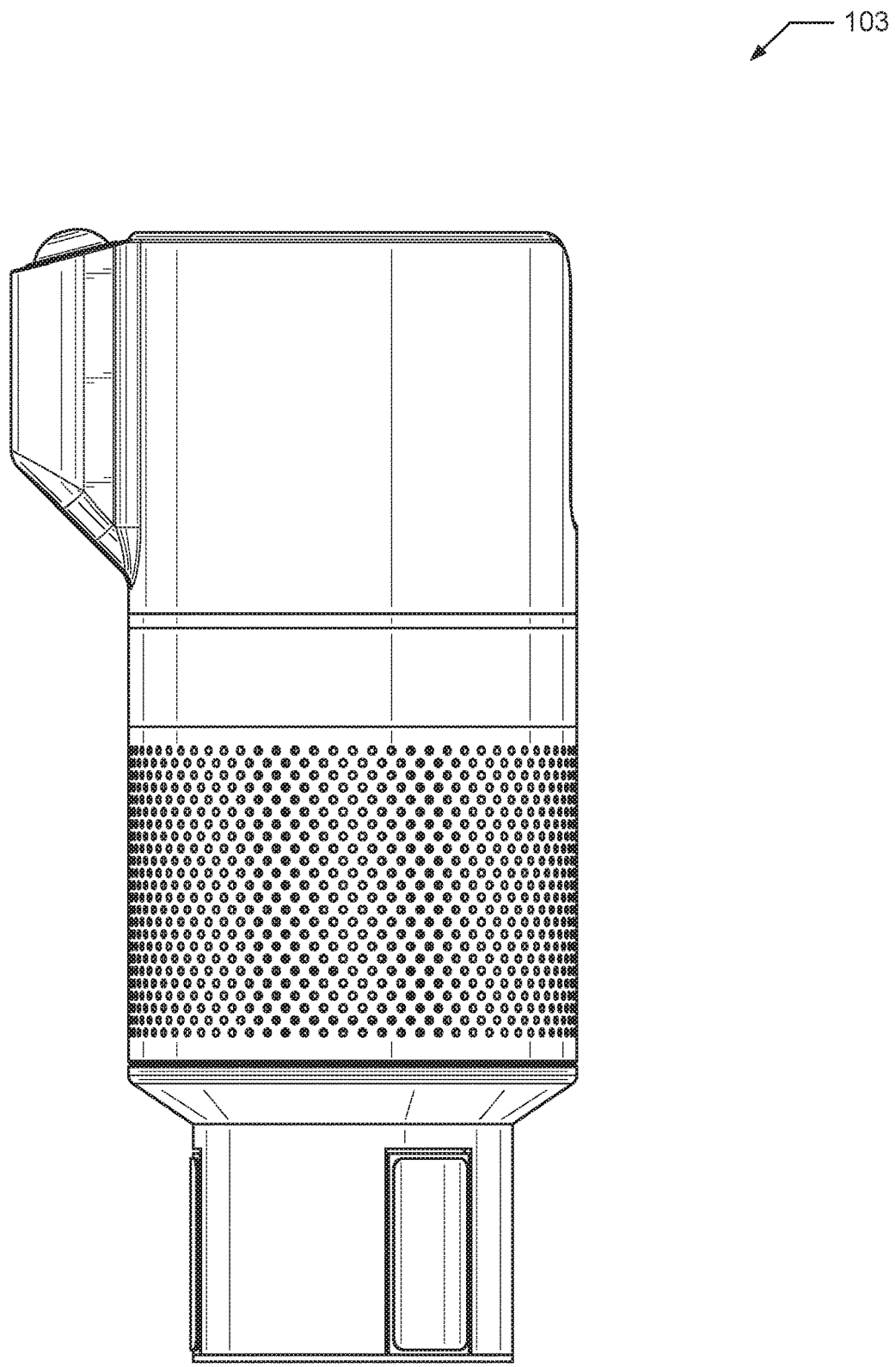
FIG. 8 is a left-side view of a security device, according to one embodiment of the present disclosure.

FIG. 8 is a left-side view of a security device 103, according to one embodiment.

Figure 9:
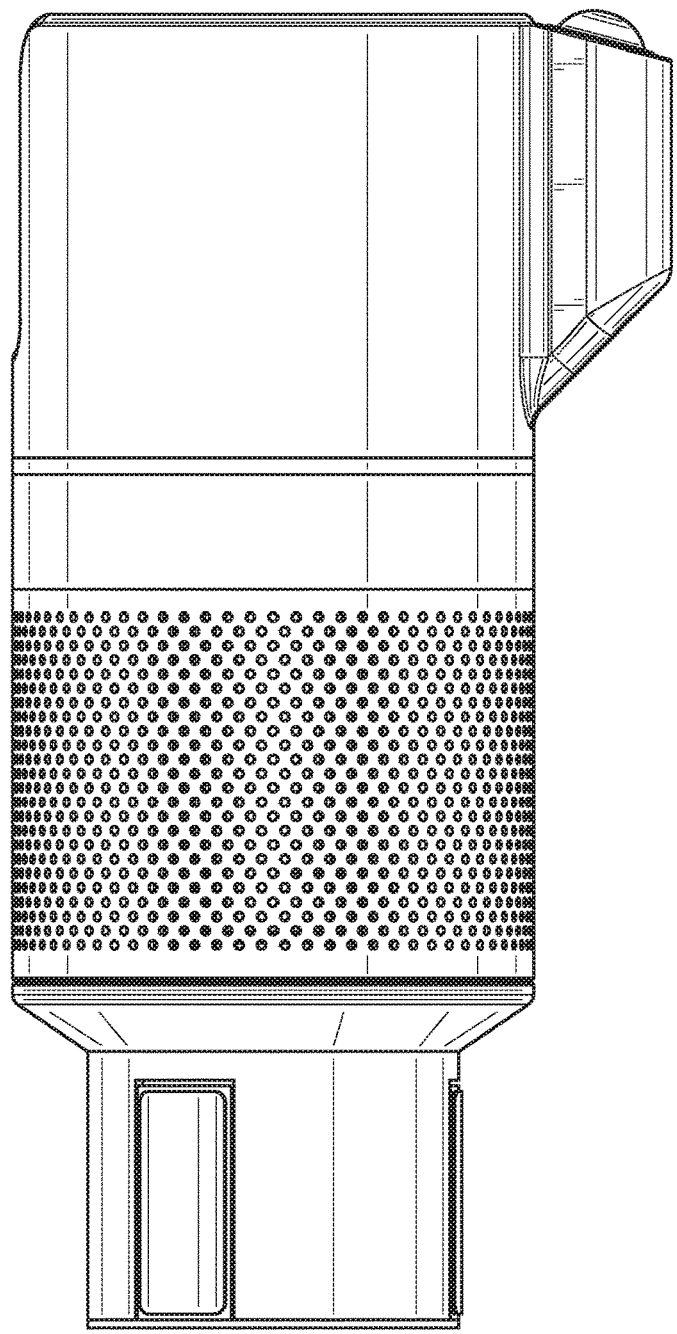
FIG. 9 is a right-side view of a security device, according to one embodiment of the present disclosure.

FIG. 9 is a right-side view of a security device 103, according to one embodiment.

Figure 10:
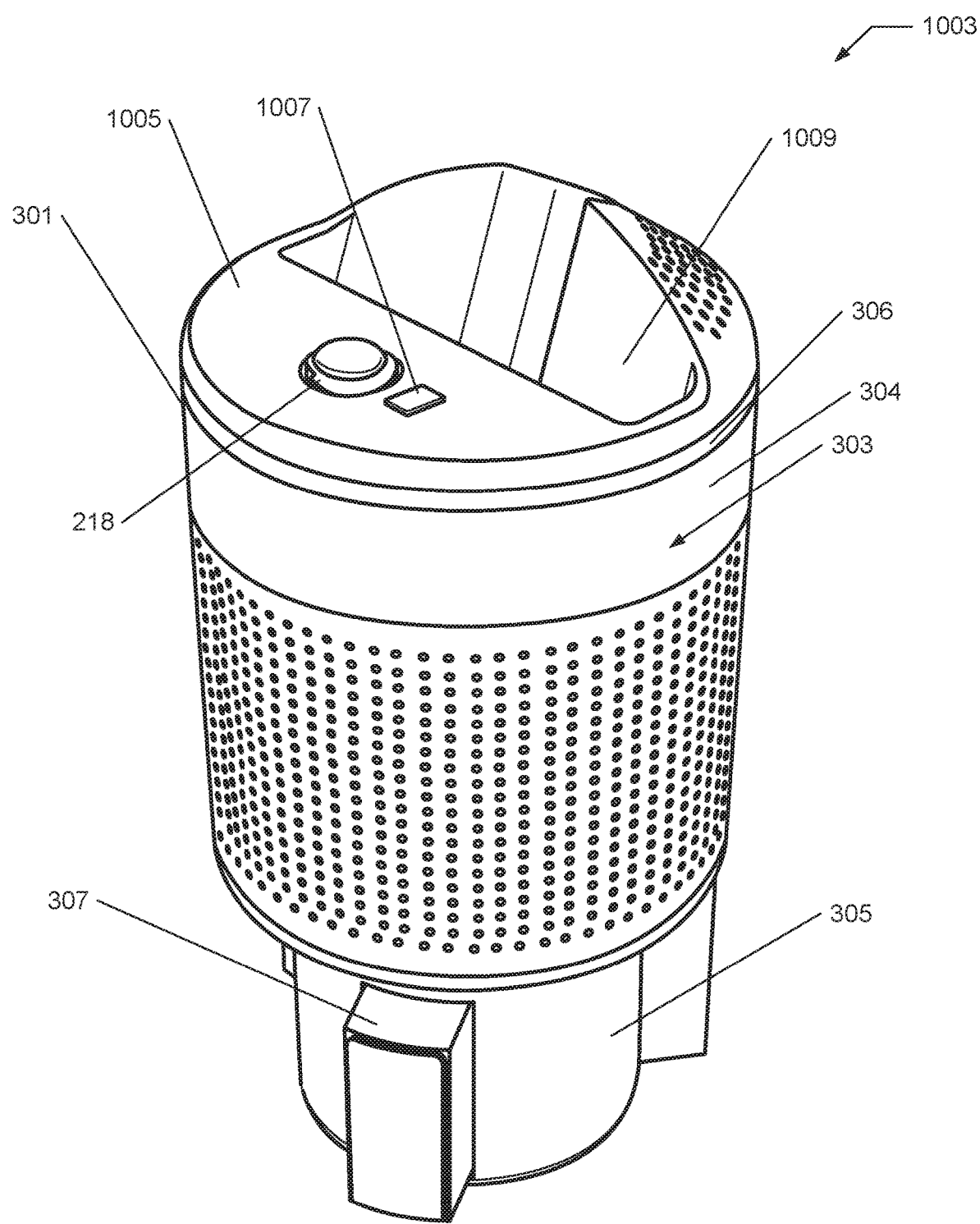
FIG. 10 is a perspective view of a security device, according to one embodiment of the present disclosure.

FIG. 10 is a perspective view of a security device 1003, according to one embodiment. The security device 1003 can be substantially similar to the security device 103. For brevity, numbers previously used are used again in these figures to describe/show similar features and/or components.

The security device 1003 can include a first portion 303 and a second portion 305. One or more sensors 218 can be mounted to a top surface 1005 of the first portion 303. The top surface 1005 can include an indicator 1007 for providing various visible indications of statuses of the security device 1003. The indicator 1007 can emit various colors of light with varying frequency (e.g., 0.1667, 0.5, 1 Hz, etc.) and duration (e.g., 3, 10, 60 seconds, etc.). In one example, the indicator 1007 is a light-emitting diode (LED) configured to activate and flash a red light at 1-second intervals in response to the security device 1003 entering an armed state. As another example, the indicator 1007 emits a green light in response to the security device 1003 entering a disarmed state.

The security device 1003 can include one or more lenses 304. The lens 304 can be configured over one or more sensors (not shown) and can improve various aspects of sensor performance. In one example, the lens 304 is a Fresnel lens configured over a plurality of PIR sensors to increase a viewing range thereof each. In another example, the lens 304 filters a spectrum of incoming light to isolate particular wavelengths of light, such as those corresponding to infrared light, thereby potentially reducing a likelihood of other light spectra interfering with a particular sensor. In another example, the lens 304 increase a viewing angle of a camera sensor.

The security device 1003 can include one or more light rings 306 that include one or more light-emitting elements (not shown) and function similarly to the indicator 1007. The light ring 306 can generate unique light sequences, for example, to indicate a current mode of the security device 103 or the sensor 218. In one example, in response to the security device 103 being configured to a low power mode, the light ring 306 flashes a red-colored lighting pattern at a frequency of about 0.333 Hz. In another example, in response to the security device 103 being configured to a pet-friendly mode, the light ring 306 emits a sustained yellow-colored lighting pattern. Any other light sequences or colors are possible according to embodiments of the present disclosure.

The security device 1003 can include a slot 1009 for receiving a mobile device, such as a smartphone. In some embodiments, the slot 1009 includes elements (not shown) for charging a mobile device and/or for connecting the mobile device to a computing device within the security device 1003.

The security device 1003 can include a plurality of legs 307. As shown in FIG. 10, the leg 307 is in an extended position (e.g., in response to the first portion 303 having been rotated about the second portion 305).

Figure 11:
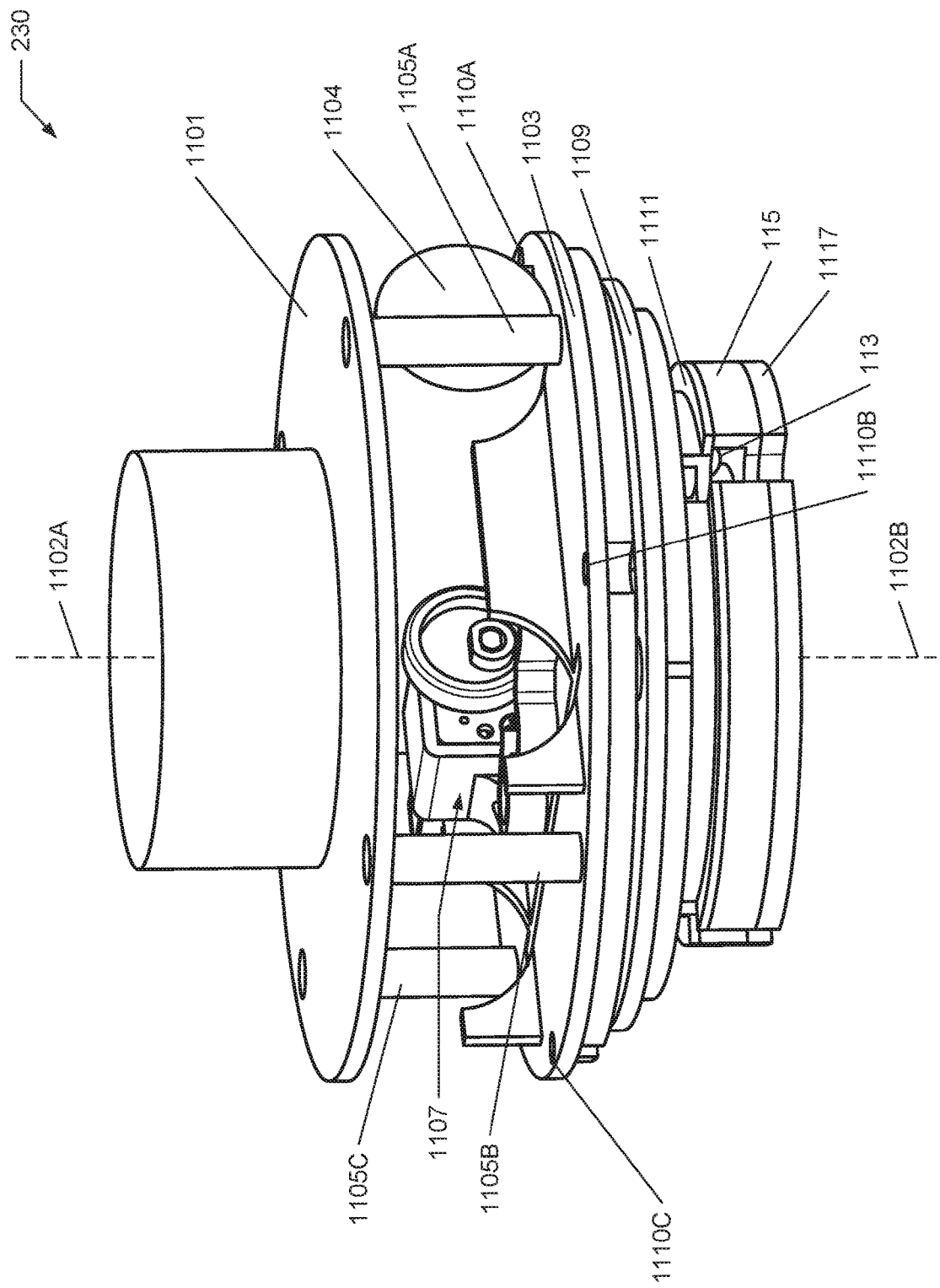
FIG. 11 is a perspective view of a locking mechanism, according to one embodiment of the present disclosure.

FIG. 11 is a perspective view of a locking mechanism 230. The locking mechanism 230 can be configured within a security device (e.g., a security device 103 or security device 1003 as shown in FIGS. 1 and 10, respectively). For example, the locking mechanism 230 can be centrally located within and attached to the body 301. The locking mechanism 230 can be connected to a first portion and a second portion of a security device. The locking mechanism 230 can include a plurality of discs aligned along a central axis 1102A, 1102B. The central axis 1102A, 1102B can be an axis of rotation about which one or more of the discs may rotate and along which one or more of the discs (or components connected thereto) may travel.

The plurality of discs can include, but are not limited to, a top disk 1101, bottom disk 1103, first disk 1111, second disk 1115, and extension plate 1117. The top disk 1101 and bottom disk 1103 can be arranged opposite and at a distance from each other. In some embodiments, the bottom disk 1101 can be referred to as a third disk.

A plurality of connecting columns 1105A, 1105B, 1105C can connect the top disk 1101 and the bottom disk 1103. For example, each of the plurality of columns 1105A, 1105B, 1105C receive fasteners, such as screws, that connect the top disk 1101 to the bottom disk 1103. A motor unit 1107 can be arranged between the top disk 1101 and bottom disk 1103. In one example, the motor unit 1107 is attached to the bottom disk 1103. One or more cylinders 1104 can be arranged within the bottom disk 1103, for example, on either side of the motor unit 1107. The cylinder 1104 can provide a potential barrier to tampering or destruction of the motor unit 1107. For example, the cylinder 1104 can include one or more resilient materials, such as steel, that prevent a tool or other instrument from accessing the motor unit 1107.

An attachment ring 1109 can be arranged beneath the bottom disk 1103. The attachment ring 1109 can include a plurality of voids 1110A, 1110B, 1110C for attaching the locking mechanism 230 to a body 301 (FIG. 3). The attachment ring 1109 can include a central void (not shown) through which one or more connection pins or plates may pass. The first disk 1111 can be arranged beneath the attachment ring 1109. The first disk 1111 can be configured to receive one or more connection pins or plates that allow for rotations of a first portion of a security device to be transferred to the first disk 1111 (e.g., and other plates connected thereto). One or more driving pins 1113 can be inserted through the first disk 1111. In response to rotation of the first disk 1111, the driving pin 1113 can interface with and cause a corresponding rotation of the second disk 1115.

The second disk 1115 can be arranged beneath the first disk 1111. The extension plate 117 can be attached to and arranged beneath the second disk 1115. The extension plate 1117 can be configured to interface with a plurality of legs 307. For example, the rotation of the second disk 1115 causes a corresponding rotation of the extension plate 1117. Continuing this example, the rotation of the extension plate 1117 causes the plurality of legs 307 to extend outward from the second portion of the security device and contact walls of a target site.

In at least one embodiment, the first disk 1111, second disk 1115, and one or more driving pins are referred to collectively as a slip clutch mechanism or clutch mechanism, various embodiments of which is described with reference to FIG. 2 and, further, with reference to FIGS. 15A-17.

Figure 12:
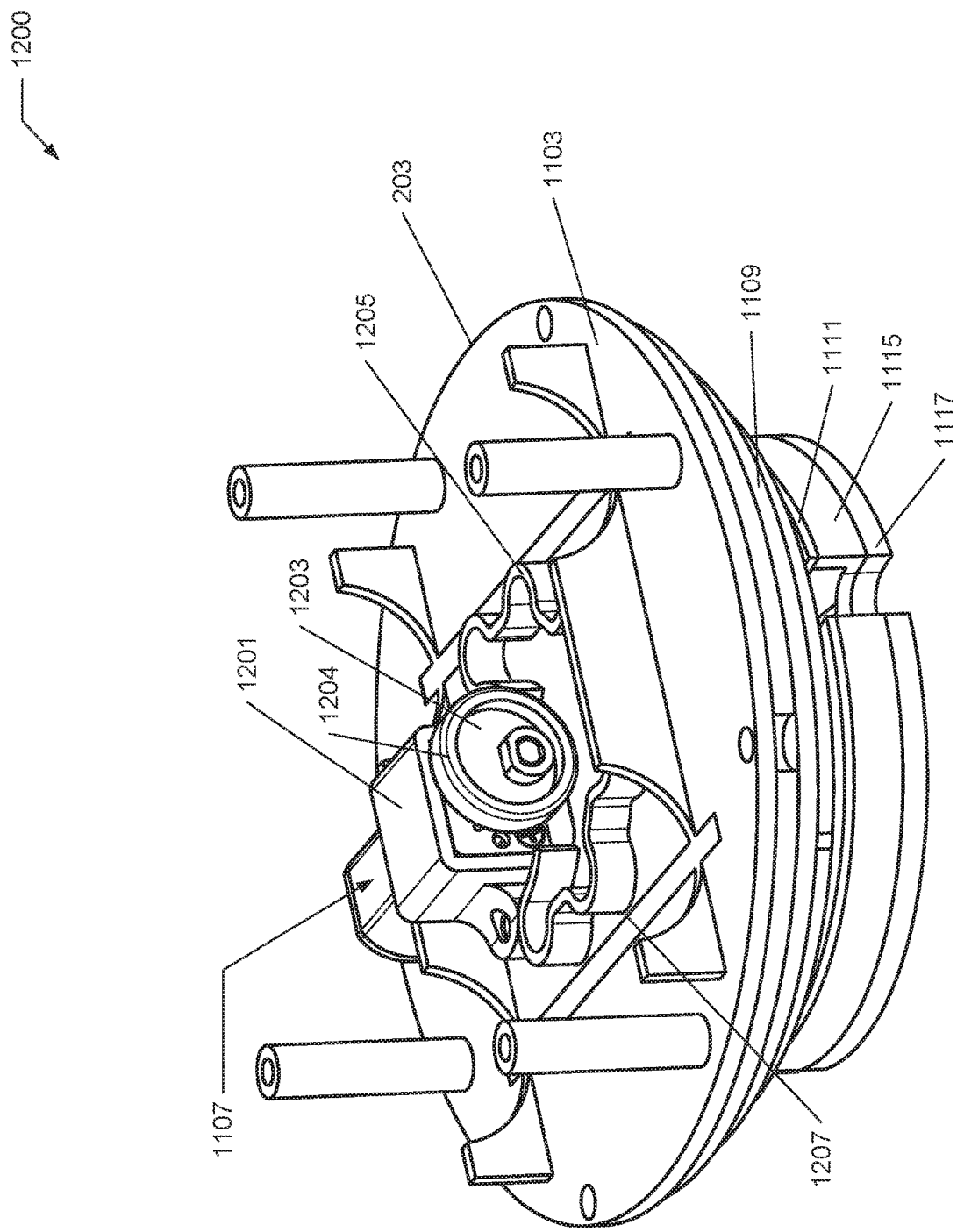
FIG. 12 is a partial perspective view of a locking mechanism, according to one embodiment of the present disclosure.

FIG. 12 is a perspective view of a lower portion 1200 of the locking mechanism 230. For the purposes of illustrating and describing the locking mechanism 230, the top disk 1101 has been removed from the locking mechanism for the image shown in FIG. 12.

The motor unit 1107 can be attached to the bottom disk 1103 via a bracket 1201. The motor unit 1107 can include one or more cams 1203 configured to rotate in response to activation of the motor unit 1107. The cam 1203 can be configured to engage a connection plate 1205 that is operative to move through the second disk 1103 via an aperture 1207. For example, the cam 1203 is attached to the motor unit 1107 at a point off-center of a midpoint of the cam 1203. In this example, as the cam 1203 rotates, a top portion 1204 of the cam 1203 contacts the connection plate 1205 and pushes the connection plate 1205 downwards through the aperture 1207 and the attachment ring 1109 (e.g., such that one or more connection pins engage with the first disk 1111). In some embodiments, the motor unit 1107, connection plate 1205, and one or more connecting pins are referred to collectively as an "engagement component."

For example, in an armed state, the engaging component can be disabled. In this example, the cam 1203 can be rotated upward such that the connection plate 1205 is translated upwards (e.g., in response to one or more springs 1307 shown in FIG. 13) and, thus, a rotation of the first portion of the security device is not translated to the second portion. Continuing this example, because the rotation is not transferred, the top disk 1101 (not shown), and bottom disk 1103 rotate freely and the first disk 1111, second disk 1115, and extension plate 1117 do not rotate.

In another example, in a disarmed state, the engaging component can be enabled. In this example, the cam 1203 can be rotated downward such that the connection plate 1205 is translated downwards and engages the first disk 1111, and thus a rotation of the first portion of the security device is translated to the second portion. Continuing this example, because the rotation is transferred, the top disk 1101 (not shown), and bottom disk 1103, first disk 1111, second disk 1115, and extension plate 1117 rotate. In this example, the rotation of the second disk 1115 and extension plate 1117 may proceed to a predetermined applied force, at which point the second disk 1115 causes the first disk 1111 to rotationally slip.

Figure 13:
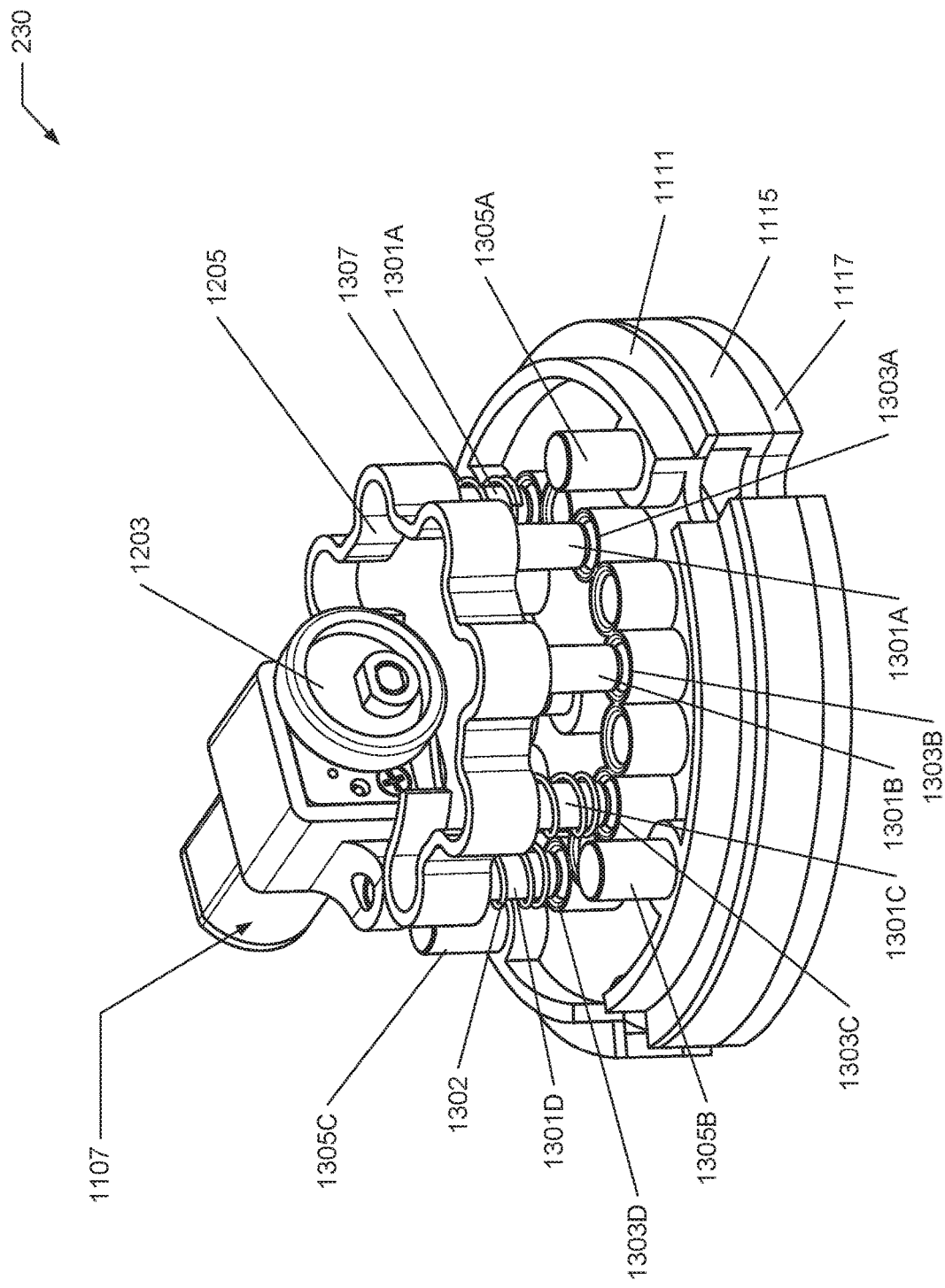
FIG. 13 is a partial perspective view of a locking mechanism, according to one embodiment of the present disclosure.

FIG. 13 is a partial perspective view of a portion of the locking mechanism 230. For the purposes of illustrating and describing the locking mechanism 230, the top disk 1101, bottom disk 1103, and attachment ring 1109 are removed in FIG. 13.

The connection plate 1205 can include one or more connection pins. For example, the connection plate 1205 includes a plurality of connecting pins 1301A, 1301B, 1301C, 1301D. The first disk 1111 can include one or more apertures 1303 for receiving the connecting pin 1301. For example, the connection plate 1205 can include a plurality of apertures 1303A, 1303B, 1303C, 1303D. A number of apertures 1303 can be greater than a number of connecting pins 1301 (e.g., to improve an ease by which a connecting pin 1301 can be received into an aperture 1303). The connection plate 1205 can move downward (e.g., in response to rotation of the cam 1203) and a portion of the connecting pin 1301 can be received into the aperture 1303, thereby forming a connection by which rotation of the top portion 303 (not shown, see FIG. 3) is translated to and causes a corresponding rotation of the first disk 1111.

The first disk 1111 can include one or more driving pins. For example, the first disk 1111 includes a plurality of driving pins 1305A, 1305B, 1305C, 1305D. The driving pin 1305 can be configured to engage the second disk 115, for example, upon rotation of the first disk 1111. The driving pin 1305 can cause the second disk 115 and the attached extension plate 117 to rotate. The rotation of the extension plate 117 can cause a plurality of legs (not shown) to extend outward and secure the security device within a target site.

The connection plate 1205 can be spring-loaded such that the connection plate 1205 is biased to retract upward from the apertures 1303A, 1303B, 1303C, 1303D. The connection plate can include one or more springs 1307 that extend over the connecting pins 1301A, 1301B, 1301C, 1301D and are sized to contact an outer portion 1309 of each aperture. The spring-loaded bias of the connection plate 1205 against the apertures 1303A, 1303B, 1303C, 1303D may maintain a disengagement of the connection plate 1205 and the first disk 1111 when the cam 1203 is disengaged from the connection plate 1205. For example, in response to the cam 1203 being disengaged, the connection plate 1205 can automatically retract from the apertures 1303A, 1303B, 1303C, 1303D.

In some embodiments, the cam 1203 is attached to the connection plate 1205 such that rotations of the cam 1203 raise or lower the connection plate 1205, thereby raising and lowering the one or more connection pins 1301 out of or into the apertures one or more 1303.

Figure 14:
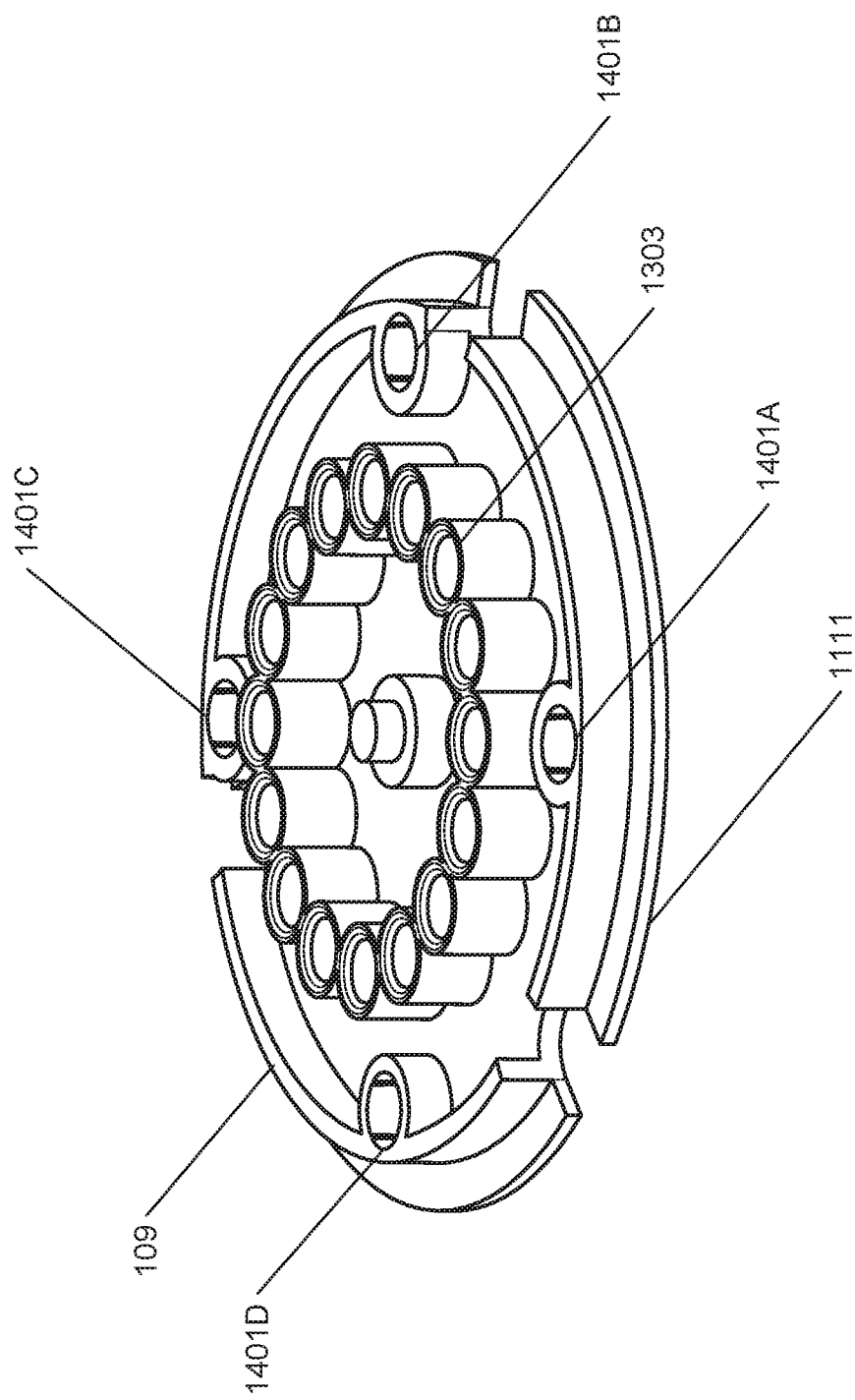
FIG. 14 is a perspective view of a first disk, according to one embodiment of the present disclosure.

FIG. 14 is a perspective view of a first disk 1111, according to one embodiment. The first disk 1111 can include a plurality of openings 1401A, 1401B, 1401C, 1401D that are each configured to receive a driving pin.

Figure 15B:
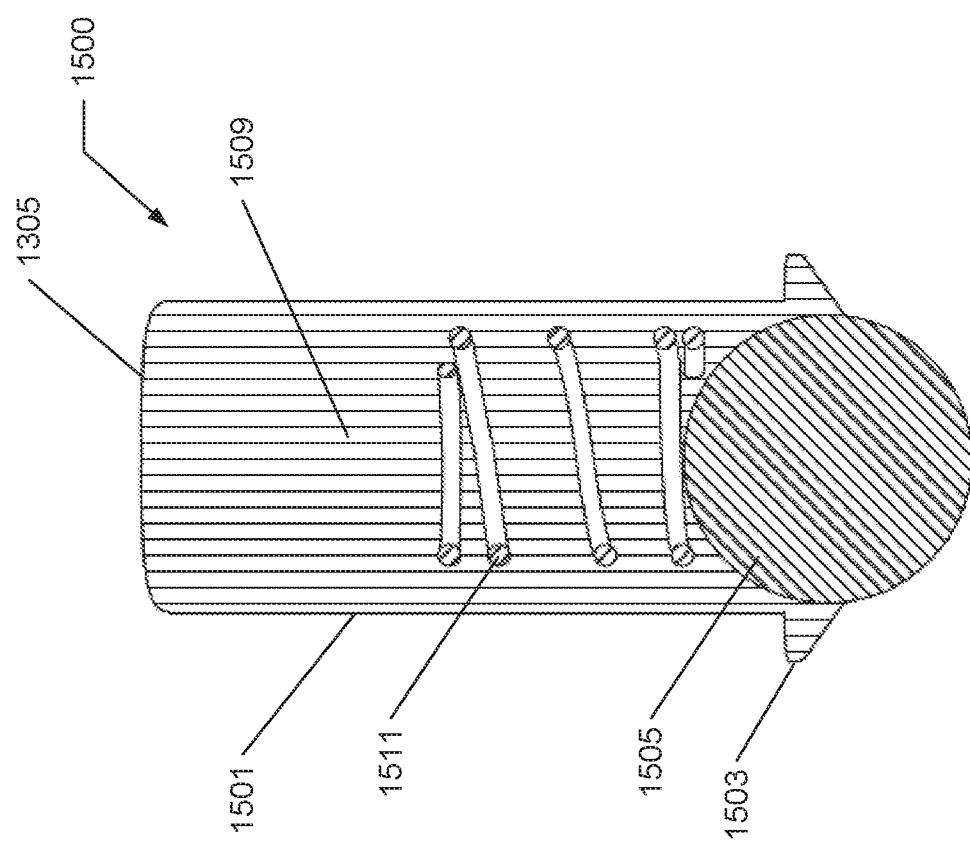
FIG. 15B is a cross-sectional view of a driving pin, according to one embodiment of the present disclosure.
Figure 15A:
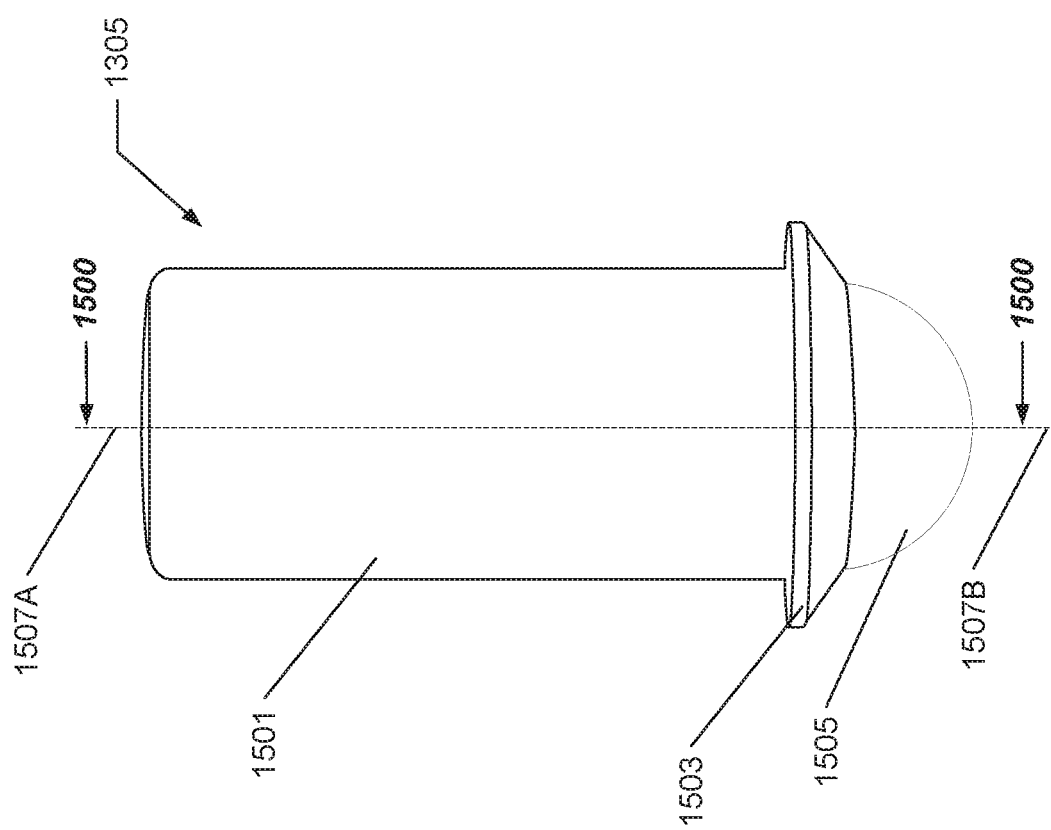
FIG. 15A is a front view of a driving pin, according to one embodiment of the present disclosure.

FIG. 15A is a front view of a driving pin 1305, according to one embodiment. The driving pin 1305 can include a shaft 1501 connected to a tip 1503. The shaft 1501 and tip 1503 can be integrally formed or attached (e.g., via one or more attachment means, such as welding). The shaft 1501 can be sized to fit within the aperture 1303 (not shown) and the tip 1503 can be sized such that it may not pass through the aperture 1303. In one example, the driving pin 1305 is inserted upwards (e.g., shaft-first) into the aperture 1303 until a top surface 1507 of the tip 1503 contacts a bottom of the aperture 1303 (e.g., which may be a bottom surface of the first disk 1111) and prevents further insertion.

The driving pin 1305 can include a retention mechanism 1505. The retention mechanism 1505 can include a ball configured to travel along a track of the second disk 1115. As the first disk 1111 is rotated, the retention mechanism 1505 can engage with and cause the rotation of the second disk 1115. The axis 1507A, 1507B defines a cross-section 1500 shown in FIG. 15B.

FIG. 15B is a cross-section 1500 of a driving pin 1305, according to one embodiment. The shaft 1501 and tip 1503 can include a void 1509 through which the retention mechanism 1505 can travel. One or more springs 1511 can be arranged within the void 1509 such that the spring 1511 opposes the movement of the retention mechanism 1505 into the void 1509. Thus, in some embodiments, the driving pin 1305 can be spring-loaded such that the retention mechanism 1505 can engage with and apply a horizontal force to the second disk 1115, and also translate upwards into the void 1509 in response to the retention mechanism 1505 traveling upwards along a track of the second disk 1115. In at least one embodiment, a spring constant of the spring 1511 is selected to result in greater or lesser resistance to the retention mechanism 1505 translating upwards and into the void 1509. According to one embodiment, the greater the spring constant, the greater the maximum magnitude of torque that can be applied to the second disk 1115 by the driving pin 1305 (e.g., and vice versa). Upon the maximum torque being reached, the retention mechanism 1505 can be fully received into the void 1509 such that the driving pin 1305 "slips" across the track of the second disk 1115 and may not cause further rotations thereof.

Figure 16:
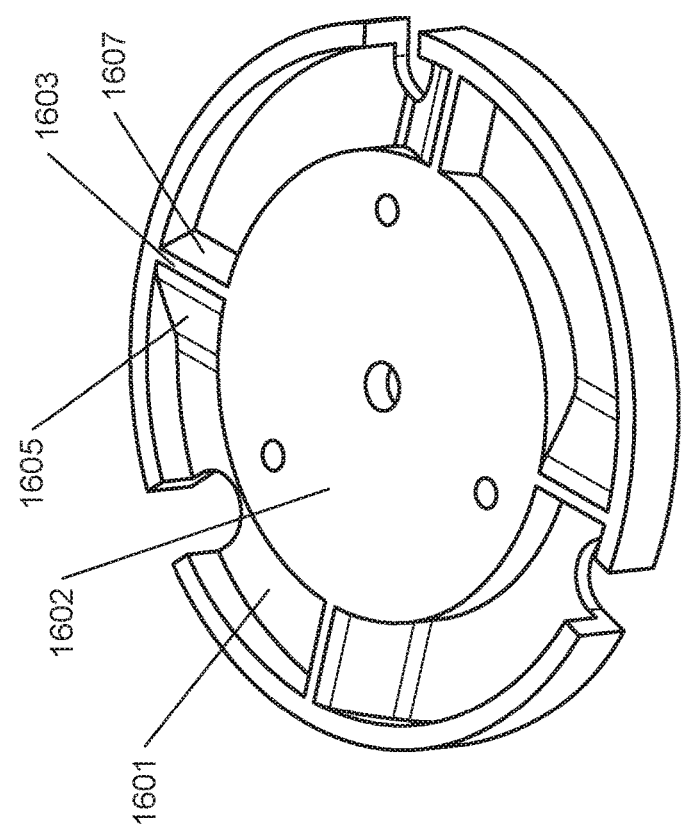
FIG. 16 is a perspective view of a second disk, according to one embodiment of the present disclosure.

FIG. 16 is a perspective view of a second disk 1115, according to one embodiment. The second disk 1115 can include one or more tracks 1601. The track 1601 can surround a central portion 1602. The track 1601 can be configured to receive one or more retention mechanisms (e.g., a retention mechanism 1505 as shown in FIG. 15). In one example, the track 1601 receives four retention mechanisms. The track 1601 can include one or more protrusions 1603. The protrusion 1603 can include a first inclined plane 1605 oriented in a first direction and a second inclined plane 1607 oriented in a second direction opposite from the first direction. The first inclined plane 1605 and second inclined plane 1607 can each be configured to engage with a retention mechanism of a driving pin (e.g., a retention mechanism 1505 of a driving pin 1305).

As an example, upon the first disk 1111 being rotated in a first direction (e.g., clockwise) by a first force, the retention mechanism 1505 contacts and applies a second force (e.g., proportional to the first force) to the first inclined plane 1605. In this example, a horizontal component of the second force pushes the second disk 1115 and causes the rotation thereof in the first direction. Continuing this example, the rotation of the second disk 1115 can cause rotation of an extension plate, thereby resulting in an extension of a plurality of legs that contact and apply a force to walls of a target site (e.g., the force being proportional to the torque applied by the retention mechanism 1505). An engagement mechanism (e.g., a connection plate and one or more connecting pins) can be disabled (e.g., the one or more connecting pins are withdrawn from apertures in the first disk 1111), thereby preventing the translation of rotation from the first portion to the first disk 1111 and second disk 1115. The plurality of legs can remain extended and, due to the retraction of the connection plate, further rotation of the first portion neither extends nor retracts the plurality of legs. In at least one embodiment, the above example occurs in a process for locking a security device within a target site to prevent removal.

As another example, upon the first disk 1111 being rotated in a second direction (e.g., counter-clockwise) by a first force, the retention mechanism 1505 contacts and applies a second force to the second inclined plane 1607. In this example, a horizontal component of the second force pushes the second disk 1115 and causes the rotation thereof in the second direction. In this example, as the retention mechanism 1505 rotates the second disk 1115, an extension plate is correspondingly rotated and causes a retraction of a plurality of legs away from walls of a target site. According to one embodiment, the above example occurs in a process for unlocking a security device within a target site to allow for removal.

An angle of friction of the first inclined plane 1605 can be less than an angle of friction of the second inclined plane 1607. A slope of the first inclined plane 1605 can be less than a slope of the second inclined plane 1607. The angle of friction can generally refer to an angle at which a retention mechanism 1505 contacts an inclined plane or, in other words, a measurement of the slope of an inclined plane. In one example, the first inclined plane 1605 includes an angle of friction of about 45 degrees and the second inclined plane 1607 includes an angle of friction of about 75 degrees. In at least one embodiment, the greater angle of friction of the second inclined plane 1607 results in a lower level of rotation and, thus, a lower level of force being sufficient to rotate the second disk 1115 in a direction causing retraction of a plurality of legs. In other words, in one or more embodiments, the lesser angle of friction of the first portion 1605 results in a greater level of rotation and force being sufficient to rotate the second disk 1115 in a first direction (e.g., that results in locking the position of the security device) as compared to a level of rotation and force being required to rotate the second disk 1115 in a second direction (e.g., that results in an unlocking of the position of the security device).

According to one embodiment, the angles of friction of the first inclined plane 1605 and second inclined plane 1607 are selected to configure a threshold magnitude of force that, upon being exceeded by the retention mechanism 1505, causes the retention mechanism 1505 to slip past the protrusion 1603. The slippage of the retention mechanism 1505 can allow further rotation of the first portion of the security device 103 about the second portion without further engaging the locking mechanism 230 (e.g., preventing the plurality of legs from being further extended).

In one example, as the retention mechanism 1505 contacts the first inclined plane 1605 and the plurality of legs contact the walls of the target site, further rotation of the first disk 1111 requires an increasingly greater magnitude of force. The retention mechanism 1505 is held in contact with the first inclined plane 1605 by a spring (e.g., spring 1511 shown in FIG. 15B) that opposes a vertical component from the applied rotational force, however the spring simultaneously allows the retention mechanism 1505 to slide upwards along the first inclined plane 1605. The retention mechanism 1505 slips upward along the first inclined plane 1605 until a predetermined magnitude of force is reached, at which point the retention mechanism 1505 slips over the top of the first inclined plane 1605, past the protrusion 1603, and onto the track 1601. In this example, further rotation of the retention mechanism 1505 results in similar slippages and, thus, the walls of the target site and the locking mechanism 230 may be prevented from experiencing damage or failure due to excessive forces.

Figure 17:
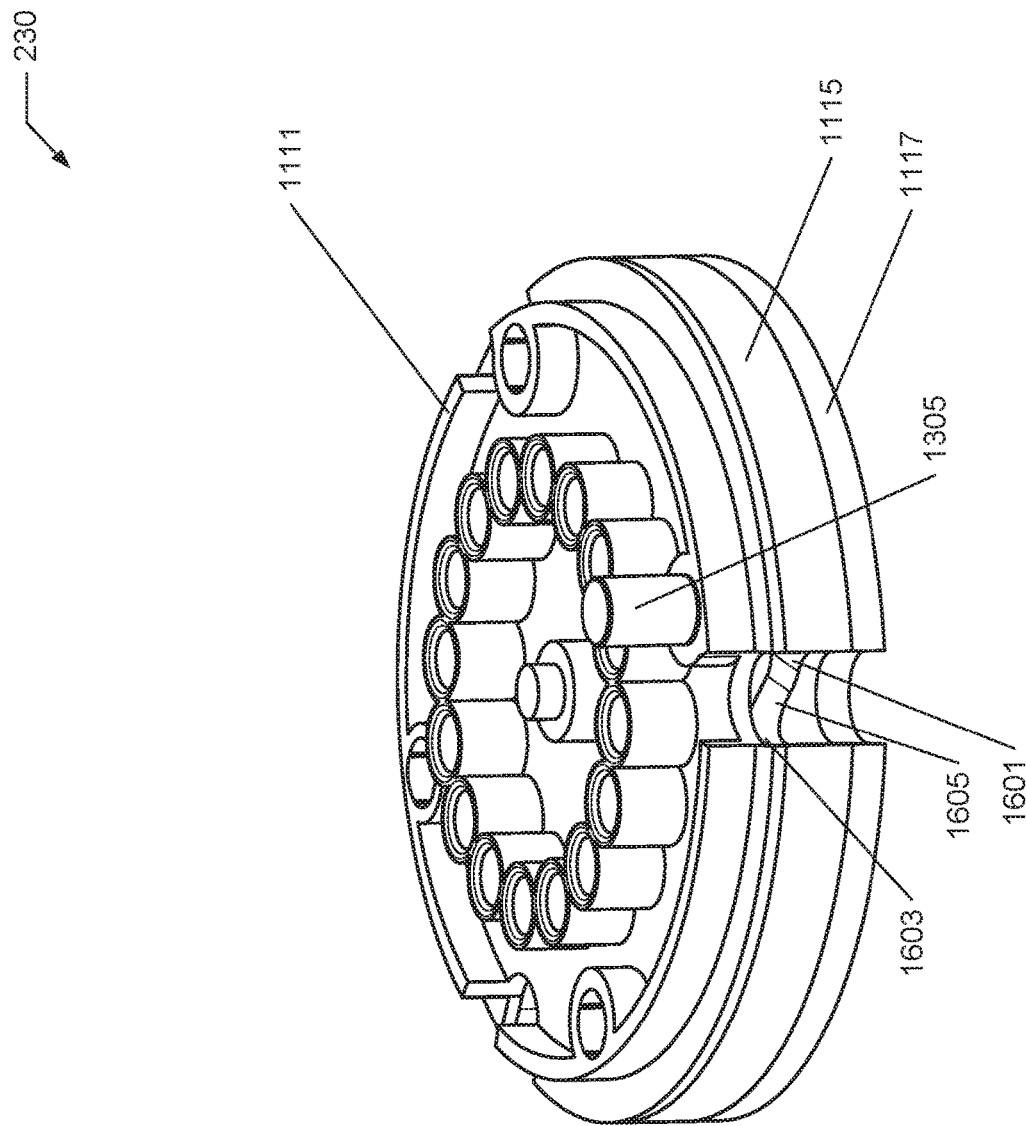
FIG. 17 is a partial perspective view of a locking mechanism, according to one embodiment of the present disclosure.

FIG. 17 is a partial perspective view of the locking mechanism 230, according to one embodiment. For the purposes of illustrating and describing the locking mechanism 230, the top disk 1101, bottom disk 1103, attachment ring 1109, motor unit 1107, and connection plate 1205 are removed in FIG. 17.

As shown in FIG. 17, the first disk 1111 can be rotated clockwise, thereby causing the driving pin 1305 to travel along the track 1601. As the first disk 1111 is further rotated in the clockwise direction, the driving pin 1305 can contact the first inclined plane 1605 and impart a turning force. A horizontal component of the turning force can cause the second disk 1115 and extension plate 1117 to rotate in the first direction, thereby extending the plurality of legs. As the plurality of legs extend and contact walls of a target site, a resistance to further rotation is generated that results in an increasing magnitude of turning force being required to rotate the second disk 1115. As the resistance to rotation increases, a vertical force is exerted on the driving pin 1305 and a retention mechanism 1505 (not shown) is driven upwards along the first inclined plane 1605. Upon the resistance, and thus the turning force, reaching a predetermined magnitude, the driving pin 1305 slips over the protrusion 1603 and further rotation results in additional slippage, preventing further extension of the plurality of legs.

Figure 18:
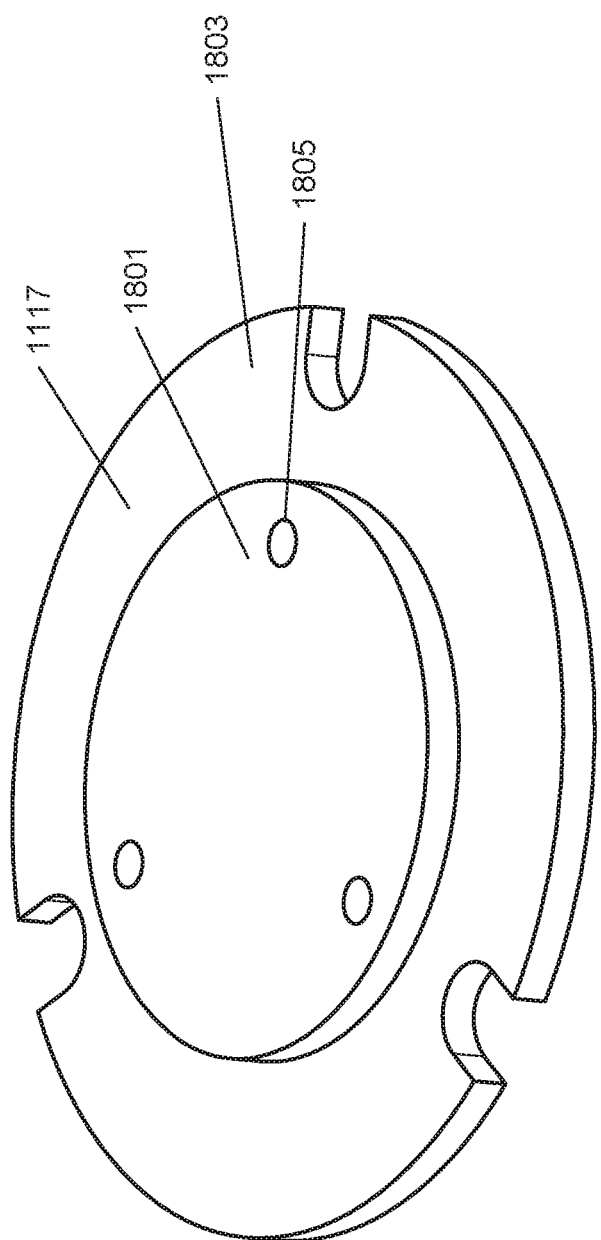
FIG. 18 is a perspective view of an extension plate, according to one embodiment of the present disclosure.

FIG. 18 is a perspective view of an extension plate 1117, according to one embodiment. The extension plate 1117 can include a top portion 1801 and a bottom portion 1803. The top portion 1801 can be sized to be received into a second disk 1115 (FIG. 11), at which point the bottom portion 1803 may be centrally aligned and flush against the second disk 1115. The extension plate 1117 can include one or more voids 1805 that pass through the top portion 1801 and bottom portion 1803. The void 1805 can receive a fastener, such as a bolt or screw, for securing the extension plate 1117 to the second disk 1115.

Figure 19:
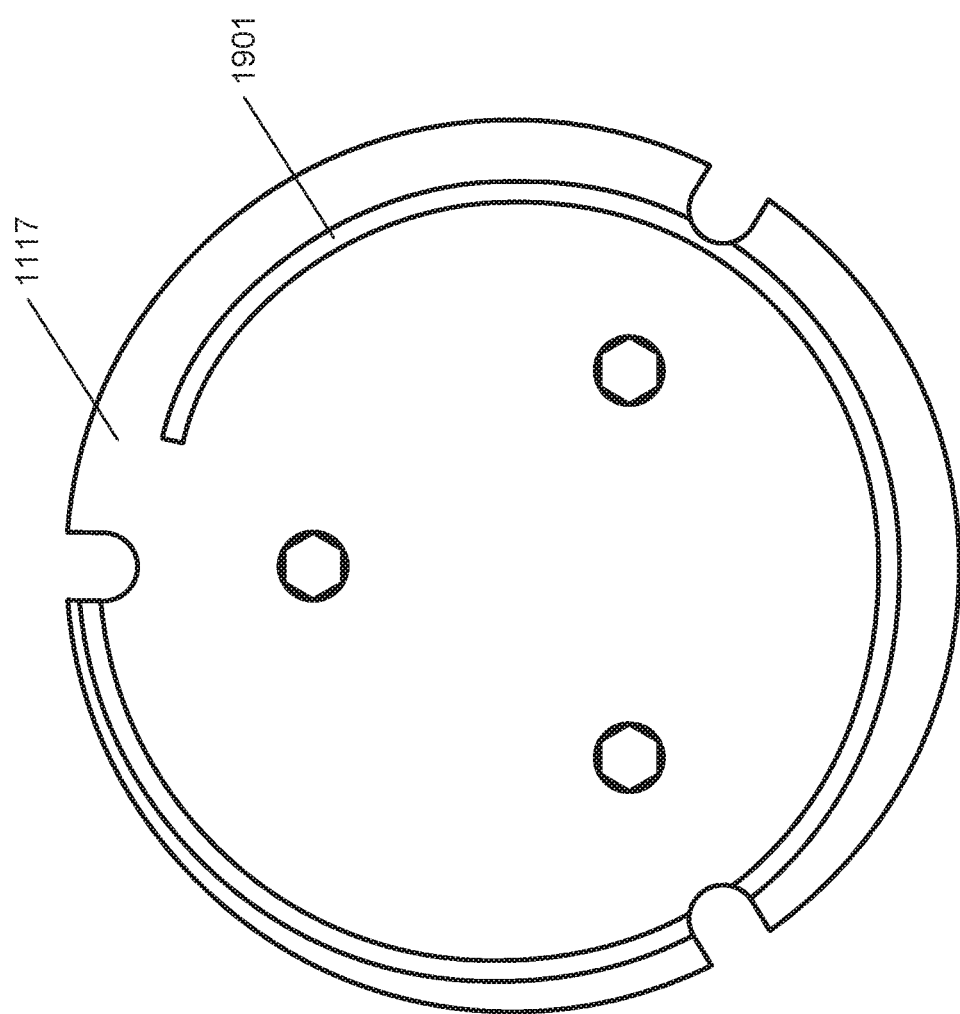
FIG. 19 is a bottom view of an extension plate, according to one embodiment of the present disclosure.

FIG. 19 is a bottom view of an extension plate 1117, according to one embodiment. The extension plate 1117 can include a bottom surface 1901 that includes an edge 1903 and an interior region 1905. The bottom surface 1901 can include a ridge 1907 that initiates at the edge 1903 and terminates within the interior region 1905. The ridge 1907 can form a circular shape of tapering diameter (e.g., similar to a thread). The ridge 1907 can be configured as a thread-like mechanism for interfacing with corresponding ridges of one or more legs 307 (FIG. 3). In one example, the ridge 1907 is received between ridges of one or more legs 307 and, as the extension plate 1117 is rotated in a first direction, the ridge 1907 exerts an outward radial force on the one or more legs 307, which, in response, extend outward. In another example, as the extension plate 1117 is rotated in a second direction, the ridge 1907 exerts an inward radial force on the one or more legs 307, which, in response, translate inwards.

Figure 20:
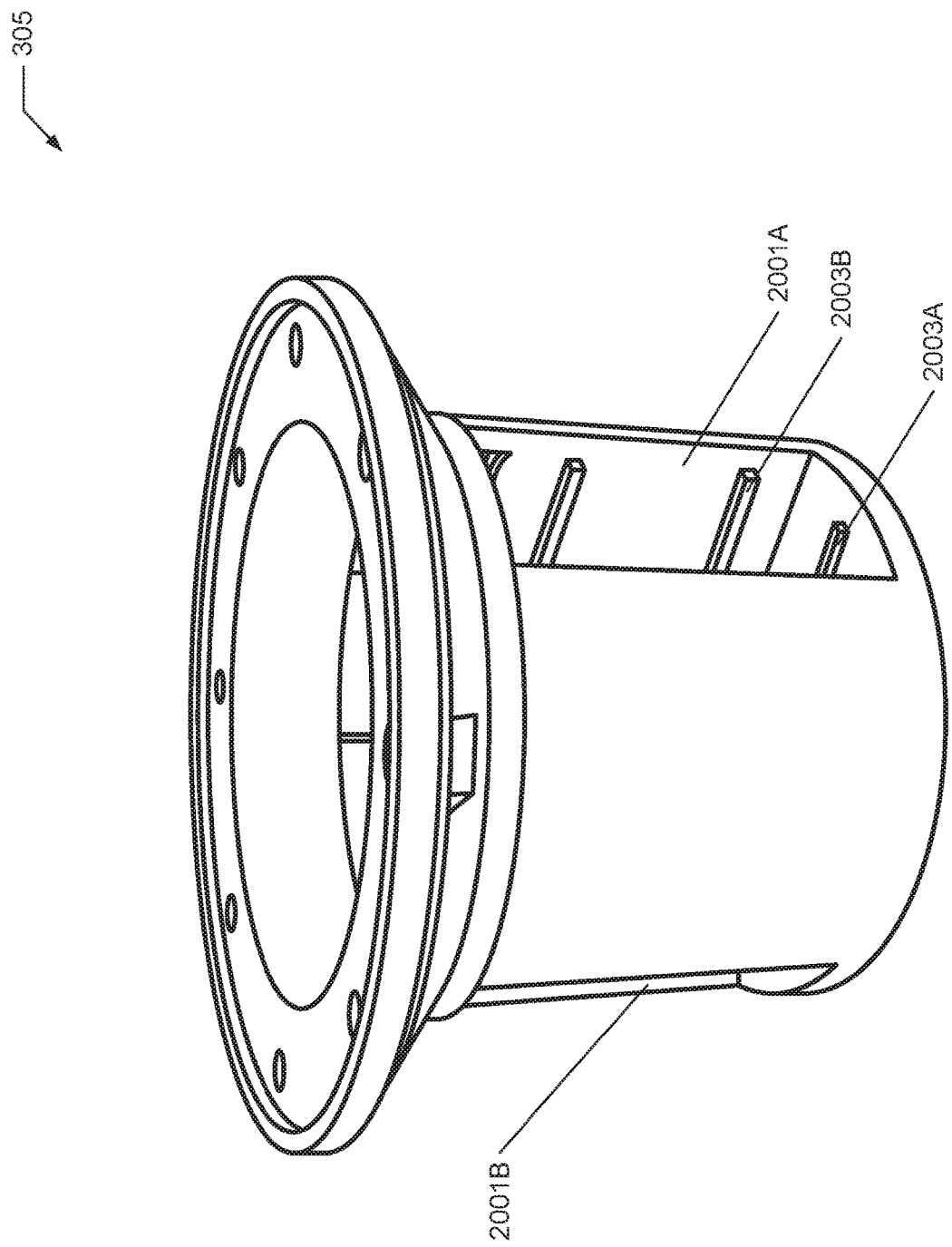
FIG. 20 is a partial perspective view of a second portion of a security device, according to one embodiment of the present disclosure.

FIG. 20 is a perspective view of a second portion 305, according to one embodiment. The second portion 305 can include one or more slots 2001A, 2001B that are each sized to receive a leg (e.g., a leg 307, not shown). The slot 2001A can include one or more guide rails that are sized to be received into corresponding grooves of a leg and that are configured to restrain the motion of the leg. For example, a slot 2001A includes one or more bottom rails 2003A that are received into a corresponding bottom groove of a leg. Continuing this example, the slot 2001A includes one or more side rails 2003B that are received into corresponding side grooves of the leg. In this example, the bottom rail 2003A and side rail 2003B maintain a central alignment of the leg within the slot 2001A and confine the extension and retraction of the leg to a predetermined direction.

Figure 21:
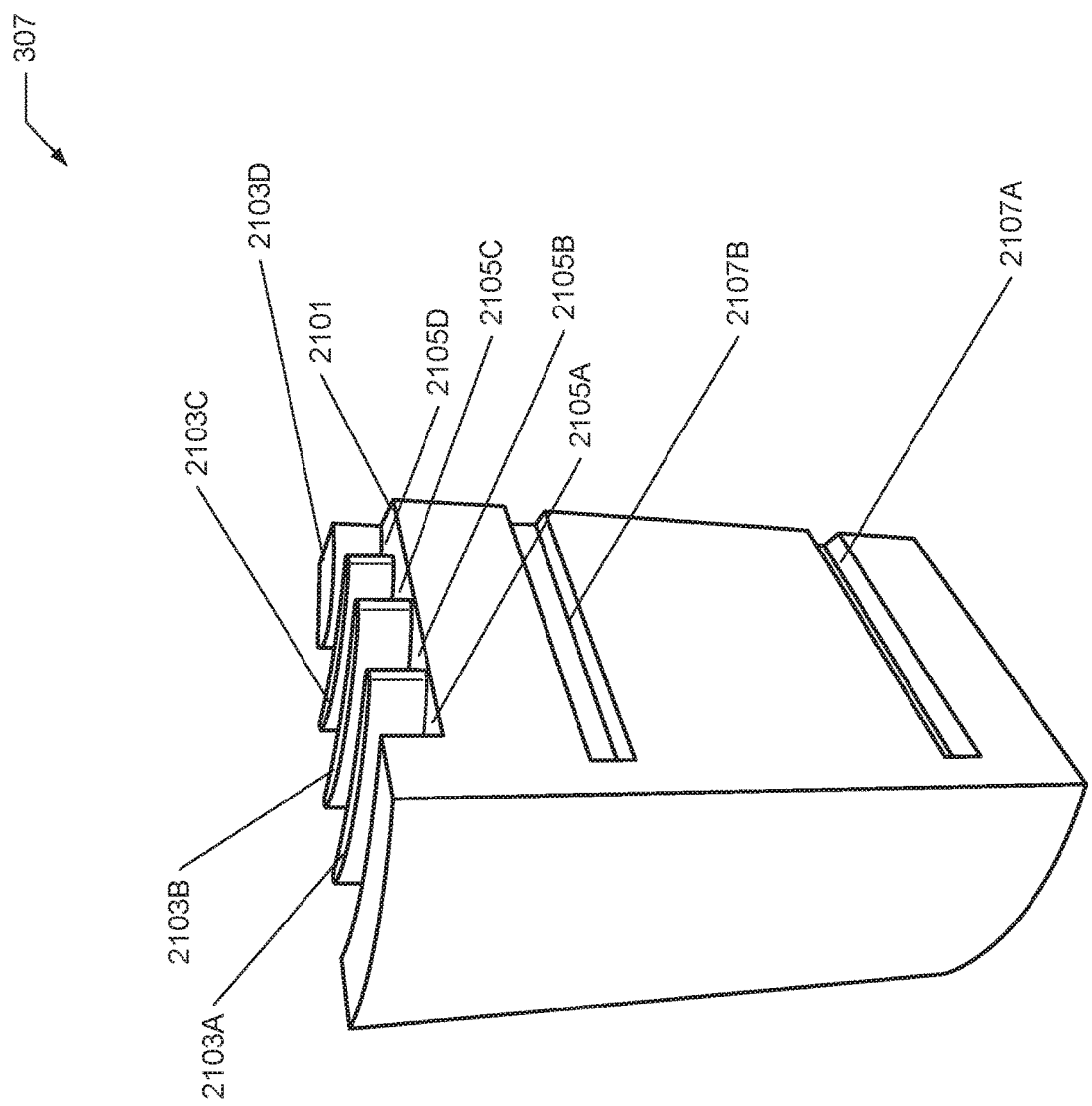
FIG. 21 is a perspective view of a leg, according to one embodiment of the present disclosure.

FIG. 21 is a perspective view of a leg 307, according to one embodiment. The leg 307 can include a top surface 2101. The leg 307 can include one or more ridges 2103A, 2103B, 2103C, 2103D that extend from the top surface 2101. The plurality of ridges 2103A, 2103B, 2103C, 2103D can be spaced along the top surface 2101 such that a ridge of an extension plate (e.g., ridge 1907 of the extension plate 1117 shown in FIG. 19) can be received into gaps 2105A, 2105B, 2105C, 2105D. The leg 307 can include one or more grooves 2107A, 2107B configured to receive rails of a bottom portion (e.g., rails 2003A, 2003B as shown in FIG. 20). In another example, the leg 307 includes a side groove 2107A configured to receive a side rail 2003B (FIG. 20). The leg 307 can include a bottom groove (not shown) configured to receive a bottom rail 2003A (not shown, see FIG. 20). The interface of the rails and grooves confines the extension and retraction of the leg 307 to a single direction (e.g., into and out of a slot 2001 shown in FIG. 20).

Figure 22A:
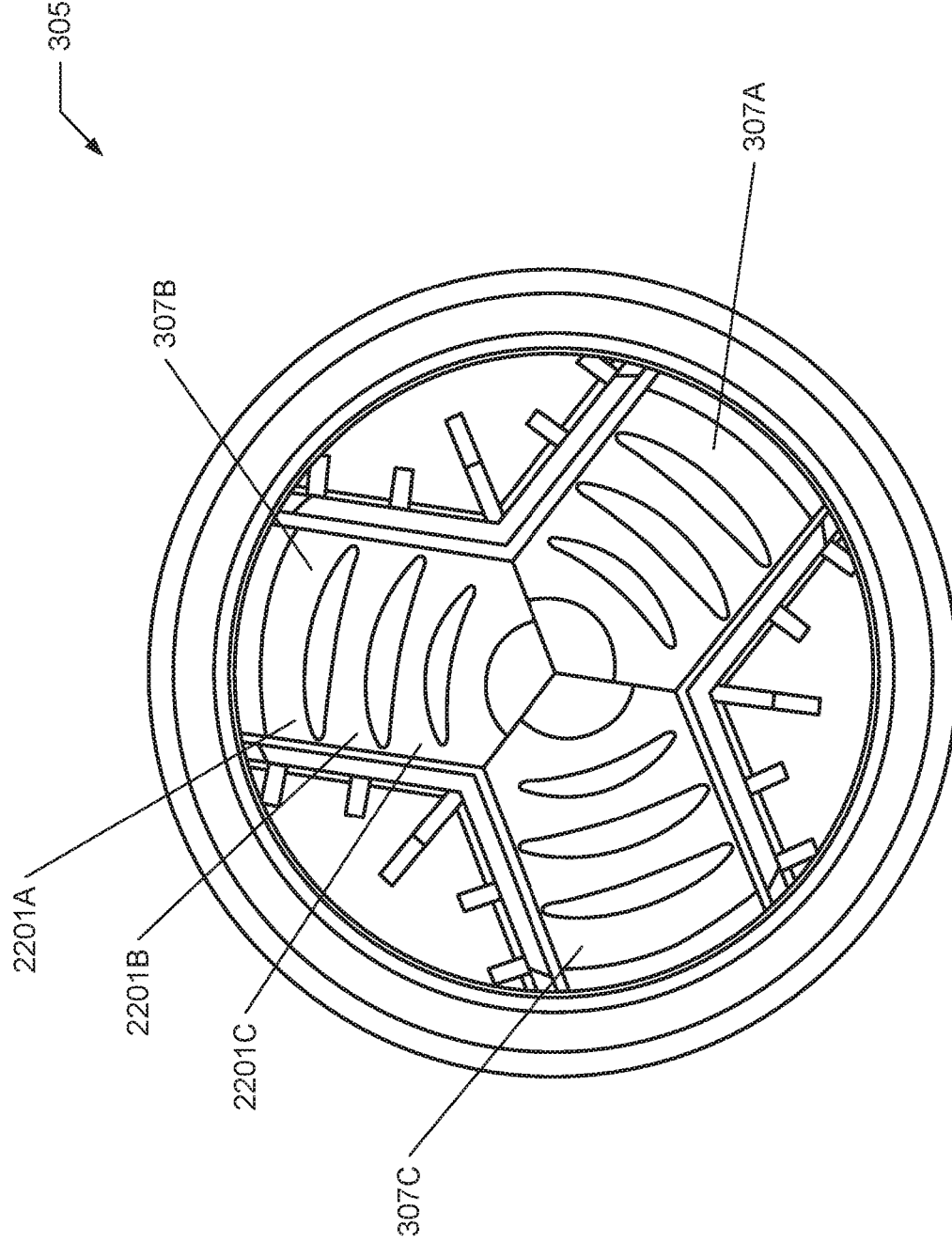
FIGS. 22A-B are top views of a second portion of a security device and a plurality of legs, according to one embodiment of the present disclosure.

FIG. 22A is a top view of a second portion 305 including a plurality of legs 307A, 307B, 307C, according to one embodiment.

The legs 307A, 307B, 307C can be arranged radially within the second portion 305. The ridges and gaps (not shown) of each leg 307 can be aligned into concentric regions 2201A, 2201B, 2201C. The gaps 2105 can receive a ridge 1907 of an extension plate 1117 (see FIG. 19). As an extension plate 1117 (not shown) is rotated in a first direction, a ridge 1907 can apply an outward radial force to the legs 307A, 307B, 307C that causes extension outward (e.g., along rails 2003, not shown) from the second portion 305. As the extension plate 1117 is rotated in a second direction, the ridge 1907 can apply an inward radial force to the legs 307A, 307B, 307C that causes retraction into the second portion 305.

Figure 22B:
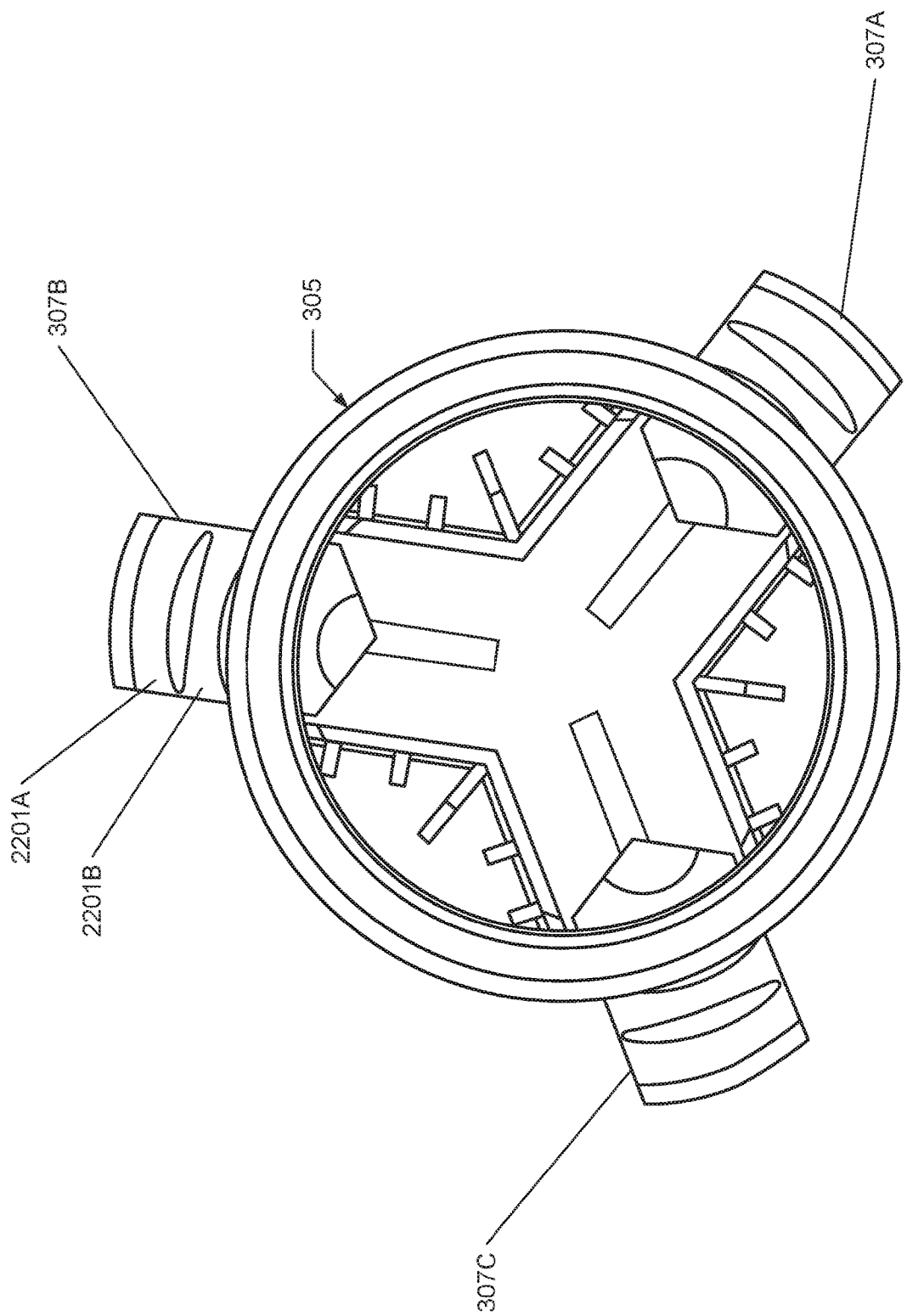

FIG. 22B is a top view of a second portion 305. In the embodiment shown in FIG. 22B, the plurality of legs 307A, 307B, 307C protrude, for example, in response to rotation of a first portion 303 (not shown).

Exemplary Processes

Before turning to the process flow diagrams of FIGS. 23-28, it is noted that embodiments described herein may be practiced using an alternative order of the steps illustrated in any of the FIGS. 23-27. That is, the process flows illustrated in FIGS. 23-27 are provided as examples only, and the embodiments may be practiced using process flows that differ from those illustrated. Additionally, it is noted that not all steps are required in every embodiment. In other words, one or more of the steps may be omitted or replaced, without departing from the spirit and scope of the embodiments. Further, steps may be performed in different orders, in parallel with one another, or omitted entirely, and/or certain additional steps may be performed without departing from the scope of the embodiments.

Figure 23:
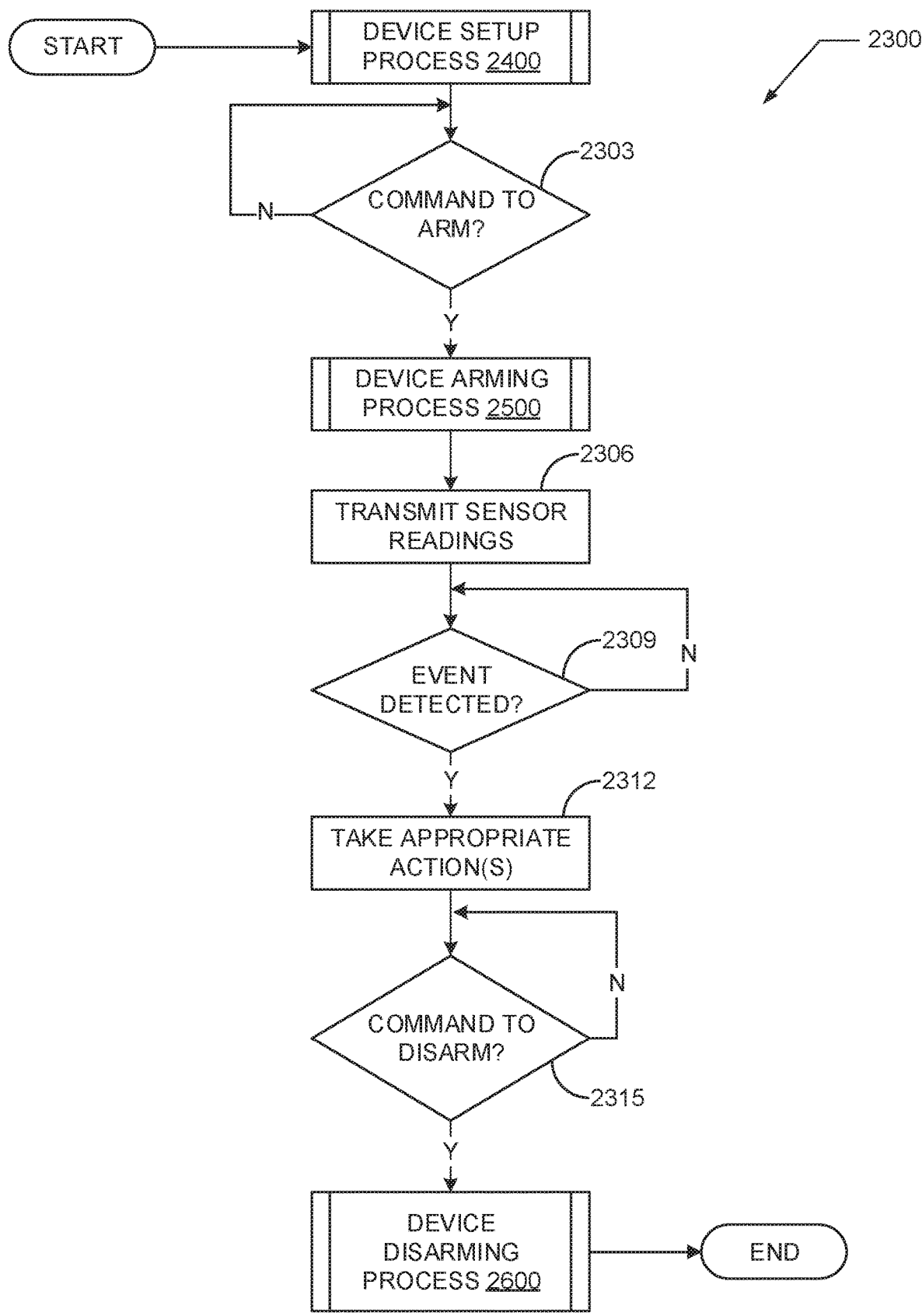
FIG. 23 is a flowchart of an exemplary detection process according to various embodiments of the present disclosure.

With reference to FIG. 23, shown is a flowchart of an exemplary detection system process 2300, according to one aspect of the present disclosure. In some embodiments, the process 2300 includes performing a device setup process 2400 (shown in FIG. 24) in which the system undergoes an initial setup. By the process 2400, the security device 103 can be installed within a target site (e.g., a cup-holder) of a vehicle 106 and a mobile device 206 of an owner of the vehicle can be associated with the security device 103.

In at least one embodiment, the initial setup may include connecting to a network (e.g., 3G, 4G, 5G, LTE, Bluetooth, internet, etc.), registering the security application 251 with the security device 103, powering-up the security device 103, initializing one or more of the sensors 218, etc. In some embodiments, registering includes providing the security application 251 with an identification number associated with the security device 103 (and/or the sensors 218). In various embodiments, the default state of the security device 103 in response to the initial setup may be a disarmed state. In the discerned state, the security device 103 may or may not detect intrusions within the respective monitored automobile; however, if an intrusion is detected, there may be no alarm raised.

Step 2303 includes determining if a command to initiate an armed state is initiated and/or received at the security device 103. If the arming command is determined to be received or initiated, an arming process 2500 can be performed. The process 2300 can repeat step 2303 to continuously await receipt of an arming command or other command (e.g., in which case the process 2300 may be suspended and appropriate actions taken based on the command). The command can be received from the mobile device 206 or the computing environment 203. For example, a user can provide a selection to the security application 251 that causes the arming command to be transmitted to the security device 103. In another example, the computing environment 203 can determine that a location of the mobile device 206 is outside of a predetermined geofence extending from the security device 103. In this example, in response to the determination, the computing environment 203 can automatically transmit the arming command.

In some embodiments, the arming command is transmitted from a mobile device 206 such as a key fob or other RFID-enabled device. In one example, the security device 103 recognizes particular RFID-enabled mobile devices 206 as registered, authenticated, and/or secured devices by comparing an identifier or credential thereof to authentication data in the storage 224a or from the data store 112. The security device 103 can take various actions based on successful or failed recognition of mobile devices 206. For example, if the monitor application 215 does not detect a registered RFID-enabled mobile device 206 for a predetermined amount of time (e.g., 10 seconds, 20 seconds, 30 seconds, etc.), the monitor application 215 may determine that owner of the vehicle 106 is no longer nearby. In this example, in response to the determination, the monitor application 215 automatically takes one or more actions, such as initiating an armed state or transmitting an alert to the computing environment 203 that transmits, in response, a command to enter an armed state.

In some embodiments, the monitor application 215 or security application 251 receives and processes voice arming commands from a recognized user announcing to arm the security device 103. For example, the mobile device 206 can be integrated with third-party voice recognition platforms (e.g., Alexa™, Siri™, etc.) for arming the automobile or executing other tasks. In this example, a user can announce a directive to arm the security device 103 and, in response, the security application 251 can transmit an arming command to the security device 103.

In at least one embodiment, the arming command is initiated in response to the rotation of a first portion of the security device 103 in a first direction. For example, in response to a sensor 218 detecting the rotation of the first portion in a first direction, the monitor application 215 can determine that the security device 103 is in a locked state and initiate the arming command.

In various embodiments, by the arming process 2500, the security device 103 is configured to an armed state. The armed state can include activating one or more sensors 218 and receiving readings therefrom. In some embodiments, a notification can be transmitted to the mobile device 206 to indicate the transition to the armed state. In at least one embodiment, one or more lighting elements on the security device 103 are activated to indicate the armed state.

At step 2306, the process 2300 includes transmitting readings from the sensor 218 and/or other sources. Readings from multiple sensors 218 and other sources, such as an OBD system 257, can be transmitted. For example, readings from a first, second, third, and fourth sensor 218 can be transmitted, as well as readings from an OBD system 257 and a remote device 209. No limitation is placed on the number of sensors 218 (or other sources) from which readings can be received and from which analyses and determinations can be performed.

The sensor readings can be transmitted from the sensor 218 to the monitor application 215. In some embodiments, the sensor readings are transmitted to the security application 251 and/or computing environment 203. The transmission can occur continuously and in virtually real time as the sensor 218 performs measurements. Each sensor 218 can compare its readings to a predetermined threshold. In response to determining that a reading satisfies a predetermined threshold, the reading can be transmitted to the monitor application 215 (e.g., and further transmitted to the security application 251 or computing environment 203). The received sensor readings can be stored locally in storage 224a or storage 224b, or can be stored in operation data 242. According to one embodiment, sensor readings included in buffer data are also transmitted.

In some embodiments, a transceiver for transmitting the readings can be activated to transmit the readings and deactivated thereafter, for example, to prevent potential interference with collection of additional sensor readings. In one example, the monitor application 215 depowers a transceiver 221A until sensor readings in excess of a predetermined threshold are detected. In this example, in response to the sensor readings meeting or exceeding the predetermined threshold, the monitor application 215 directs power to the transceiver 221A, which transmits the sensor readings. Continuing this example, following the transceiver 221A transmitting the sensor readings, the monitor application 215 depowers the transceiver 221A.

In at least one embodiment, sensor readings are transmitted based on an application of one or more rules. The one or more rules can include, for example, sensing time periods, sensor types, and other rules. Application of a particular rule can result in transmission of only a subset of sensor readings that corresponds to a particular time window in which a particular sensor reading exceeded a threshold. The particular time window can be a predetermined amount of time (e.g., 10 seconds, 1 minute, etc.) preceding and following a time point at which a particular sensor recorded the threshold-violating sensor reading. Application of a second particular rule can result in transmission of only a subset of readings corresponding to a subset of sensor types. In at least one embodiment, rules for sensor reading transmission can be retrieved from one or more profiles. The one or more profiles can be downloaded to the security device 103, for example, from the security service 233.

In one example, in response to a PIR sensor recording a threshold-violating reading, sensor readings from the PIR sensor and a microwave sensor can be transmitted, while cotemporal sensor readings from an audio sensor and an accelerometer are not transmitted. As another example, a video sensor records a first segment of video corresponding to a time period of 12:30-12:35 PM and the monitor application 215 determines that the first segment violates a threshold (e.g., motion is detected in the video). Continuing this example, a second segment of video from the video sensor (or another video sensor) corresponding to a time period of 12:25-12:30 PM is retrieved and used to initialize data, including the first and second segments, that is transmitted to the security service 233. Thus, in the above example, video data corresponding to both a detected event and a time period immediately preceding the event can be initialized and transmitted for analysis.

The readings can include readings associated with one or more mobile devices 206 or remote devices 209. In one example, a battery level for a key fob is transmitted to the security device 103 in response to the security device 103 or a separate sensor interrogating the key fob. An indication of firmware version or other configuration state associated with the mobile device 206 or remote device 209 can be transmitted to the security device 103 or computing environment 203. For example, a signal can be transmitted that indicates a particular version of software is installed on a user's smartphone, the software configured for executing a security application 251.

At step 2309, the process 2300 includes determining if an event occurred. The determination can be generated based on or more analyses of the sensor readings and/or other information. If an event is determined to have occurred, the process 2300 can proceed to step 2312. If an event is not determined to have occurred, the process 2300 can continuously perform steps 2306-2309 to continue receiving and analyzing readings until an event is determined to have occurred or until a command is received. In one example, the process 1100 repeats the steps 2306-2309 until receipt of a command to transition the security device 103 to a disarmed state. In another example, the steps 2306-2309 are repeated until a predetermined activation schedule reaches a predetermined time period at which point the security device 103 is automatically disarmed. In some embodiments, the analysis is performed based on a profile. The profile can include one or more thresholds for analyzing sensor readings. For example, the profile can include a threshold intensity for a PIR sensor 218, the threshold intensity being associated with the particular vehicle 106 in which the security device 103 is installed.

Analyzing the sensor readings generally can include one or more of, but is not limited to, comparing the sensor readings to predetermined thresholds, executing various algorithms with the sensor readings as input parameters, comparing patterns in the sensors readings to historical or reference patterns, and detecting disturbances in the sensor readings that contradict (or align with) historical data, etc. In some embodiments, the monitor application 215 determines that sensor readings satisfy an initial threshold and, in response, the sensor readings are transmitted to the security application 251 and/or the computing environment 203 for further analysis and/or review by an owner of the vehicle 106. In at least one embodiment, multiple security devices 103 and/or remote devices 209 perform the analyses. For example, a first security device 103 can transmit sensor readings from a first sensor 218 to a second security device 103 that analyzes the transmitted readings. The second security device 103 can also analyze a secondary set of sensor readings from a second sensor 218.

In one example, in response to determining that a temperature reading associated with PIR sensor data is above a particular threshold, the monitor application 215 determines that the temperature reading indicates a human intrusion. In another example, in response to determining a change in pressure readings within the vehicle 106, the security application 251 determines that a vehicle door was opened and, thus, a potential intrusion has occurred. In another example, a tire pressure sensor 218 records a reduction in air pressure and, in response to the reduction meeting or exceeding a predetermined threshold, the monitor application 215 determines that the tire has been damaged. In another example, a tilt sensor 218 installed on a vehicle records a change in tilt readings beyond predetermined thresholds and a light sensor 218 installed on a typically unexposed portion of a wheel records an increase in light intensity beyond a predetermined threshold. In this example, based on the detected tilt of the vehicle and the increase in light intensity, the monitor application 215 determines that a rim of the wheel has been removed.

In another example, the sensor readings include video data that is analyzed using computer vision algorithms (e.g., openCV, background subtraction, or the like) for identifying characteristics in the video data indicative of a human intrusion. In this example, in response to detecting predetermined or algorithmically-identified motions within the vehicle 106 (e.g., the opening of the automobile door, a person entering the automobile, etc.), the computing environment 203 can trigger an alarm. In some embodiments, the video data is processed to determine (e.g., via facial recognition) that the detected motion is the owner (or known operator) of the vehicle 106 and, thus, the detected motion does not correspond to an intrusion event. In one example, a video stream of a camera sensor 218 is processed and a face is identified in one or more images of the video stream (e.g., a face of a potential intruder within the vehicle 106). Continuing this example, using one or more facial recognition algorithms, one or more characteristics can be determined from the identified face. In the same example, the one or more characteristics can be compared to a data store of facial images or characteristics and an identification of the face can be determined.

In various embodiments, the monitor application 215 can verify the intrusion from multiple sources before triggering an alarm, such as, for example, determining that a change in pressure readings occurred within the vehicle 106 followed by determining that the temperature reading indicates a human intrusion.

The analyses of the sensor readings can be determined based on a setting or mode of the security device 103. For example, in pet-friendly mode, the predetermined threshold for PIR readings is increased such that the presence of a small animal does not result in determinations of events. In another example, in valet mode, the predetermined geofence for monitoring the location of the security device 103 is increased (e.g., from several feet to several hundred feet) such that the valet's parking of the vehicle 106 at a nearby area is not determined to be an intrusion event.

In some embodiments, multiple determinations from sensor readings of differing sensors 218 are used to determine event occurrence. The use of multiple sensor readings of differing modes can reduce a likelihood of a false positive (e.g., a false alarm). In one example, the computing environment 203 determines that readings from a PIR sensor 218A exceed a predetermined threshold but also determines that readings from a video sensor 218B do not demonstrate motion or include a person. In this example, in response to the positive determination from the PIR data and the negative determination from the video data, the computing environment 203 determines that an event has not occurred. In another example, the monitor application 215 determines that readings from an ultrasonic sensor 218A exceed a predetermined threshold but also determines that readings from a PIR sensor 218B fall below a predetermined threshold (e.g., indicating that the detected object from the ultrasonic readings are not associated with a human). Other non-limiting examples of sensor reading combinations include, but are not limited to, ultrasonic distance and camera-based readings, PIR intensity and RFID-based readings, readings from a first PIR sensor and a second PIR sensor, and various combinations of sensor readings and readings from an OBD system 257.

As another example, the monitor application 215 determines that readings from a PIR sensor 218A and an audio sensor 218B exceed predetermined thresholds. In this example, the monitor application 215 receives data from an OBD system 257 indicating that a door of the vehicle 106 has been opened. Continuing this example, in response to the data from the OBD system 257, the monitor application 215 determines that the readings from the PIR sensor 218A and audio sensor 218B do not correspond to a false positive and thus a potential intrusion is detected.

The readings associated with one or more mobile devices 206 or remote devices 209 can be analyzed to detect various states and statuses thereof. In one example, a battery level for a key fob is compared to a predetermined threshold, the comparison for determining if the key fob has a low battery. In this example, in response to the battery level being less than a predetermined threshold, the key fob is determined to have a low battery (e.g., requiring replacement or recharging). In another example, a rolling code is calculated and authenticated for the key fob (e.g., via the OBD system 257 and/or monitor application 215). In this example, in response to successfully authenticating the rolling code, the presence of a person within the vehicle 106 is determined. In another example, a particular version of software running on the mobile device 206 can be compared to a plurality of software versions to determine if the mobile device 206 can be (or should be) updated from the particular software version.

At step 2312, the process 1100 includes performing one or more actions in response to the detected event. The one or more actions can include, but are not limited to, transmitting an alert, storing the sensor readings, retrieving and transmitting buffer data, serving data at a web page accessible via the security application 251, analyzing the sensor readings to determine additional information associated with the event, and initiating an alarm at the security device 103. In at least one embodiment, in response to determining that sensor readings correspond to a false positive, a warning notification is transmitted.

In one example, the monitor application 215 transmits an alert to law enforcement, a third-party security service, and/or to an emergency contact stored in user data 239. In another example, the computing environment 203 hosts a web page including a livestream of images from a camera sensor 218 and a link to the web page is transmitted to the security application 251. In this example, a user may access the web page and review the images to verify if an intrusion occurred, and the web page can include selectable options for taking additional actions. Buffer data, including video and/or audio data, can be retrieved, the buffer data corresponding to a predetermined time period (e.g., 30 seconds, 2 minutes, 15 minutes, etc.) preceding the detected event. For example, a video buffer corresponding to a period of 5 minutes prior to a detected increase in a PIR intensity reading is retrieved and transmitted to the security service 233.

In another example, the monitor application 215 transmits the sensor readings to the security application 251 that generates a summary of the detected event and renders the summary on the display 248. The summary can include, but is not limited to, the determination from the analysis, the sensor readings, buffer data, a timestamp corresponding to the intrusion event, a location of the vehicle 106, and/or contact information for emergency services.

In some embodiments, the security application 251 generates and causes the rendering of a user interface configured to receive commands for actions to be performed in response to the event. For example, the user interface includes selectable options for ignoring the event, requesting a summary, contacting law enforcement, disabling the security device 103, and other suitable options. In another example, the security application 251 includes or is integrated with a location application, such as Waze™ Google Maps™, etc., and the user can view the current location of the security device 103 in virtually real time.

In various embodiments, activating an alarm state may include sounding an audible alarm, activating certain sensors 218 for gathering additional data relating to the intrusion (e.g., video data for identifying the intruder, GPS data for locating the site of the intrusion, etc.), flashing a light, enabling voice commands or interaction by a user to be audibly heard by persons in proximity to the security device 103, etc. In other embodiments, activating an alarm state may also disable certain functionalities of the vehicle 106, for example, the ignition, accelerator, transmission, power steering, etc. Activating the alarm state can include sending notifications through one or more third party services, such as via an API or a phone call. As an example, the monitor application 215 transmits an indication of the alarm to a service associated with the automobile manufacturer (e.g., OnStar®, BMW Assist®, Mbrace®, CUE®, Uconnect®, Ford Sync®, or other service).

In some embodiments, the alarm can have several escalating alarm states. For example, the security device 103 may enter a first alarm state in response to detecting a human intrusion and an escalated alarm state in response to detecting an unauthorized attempt at removing or damaging the security device 103. The monitor application 215 can take different actions based on the level of the alarm state. As an example, the monitor application can sound an audible alarm in a first alarm state and disable the vehicle 106 in an escalated state.

According to one embodiment, power usage of a transceiver 221A can be increased or decreased in performance of one or more actions. For example, the transceiver 221A can be configured to a deactivated state in which the transceiver 221A draws a first magnitude of power. In this example, in response to receiving a command to transmit the notification, the transceiver 221A can be configured to an activated state in which the transceiver 221A draws a second amount of power greater than the first magnitude of power. In some embodiments, a signal from the transceiver 221A may interfere with certain types of sensors 218A, such as, for example, a PIR sensor. The transceiver 221A may be turned off when not in use to limit or reduce the interference. The monitor application 215 can schedule the transmission of data and/or cause data transmission on an ad hoc basis based on various inputs. In one example, the monitor application 215 can enable the transceiver 221A and transmit data in response to an alarm event occurring.

The monitor application 215 can alter behavior related to a sensor 218 known to conflict with the transceiver 221A when the transceiver 221A is enabled. As an example, the monitor application 215 may ignore a value read from a PIR sensor 218 meeting or exceeding a threshold when the transceiver 221A is in an enabled state. As another example, the monitor application 215 may increase or decrease or otherwise modify a threshold for triggering an alarm or taking another action based on whether the transceiver 221A is enabled.

In at least one embodiment, a second sensor 218 can be activated to obtain secondary readings for analysis. The secondary readings can be used to determine that a first set of readings corresponds to a false positive. In one example, in response to a first PIR sensor 218 recording a first intensity reading greater than a predetermined threshold, the monitor application 215 can activate a second PIR sensor 218 that records a secondary intensity reading. In this example, in response to the secondary intensity falling below the predetermined threshold (or a separate threshold), the monitor application 215 determines that the first intensity reading corresponds to a false positive and prevents the activation of an alarm and/or notification transmission. No limitation is placed on a number of sensors 218 that can be activated or read. For example, in response to a second sensor 218 demonstrating readings in excess of a predetermined threshold, a third, fourth, fifth, and etc., sensor 218 can be read to obtain additional readings.

In some embodiments, for the purposes of conserving power, among other potential purposes, a first sensor 218 may be a lower power sensor and a second sensor 218 can be a higher power sensor. For example, a first sensor 218 can be a PIR sensor and a second sensor 218 can be an ultrasonic or microwave sensor that consumes a greater magnitude of power than the first sensor 218. In various embodiments, the power usage of a currently activated sensor 218 is increased to increase a range, sensitivity, intensity, or other property improving performance of the sensor 218. In at least one embodiment, the increase of the range, sensitivity, intensity, or other property does not include increasing a magnitude of power provided to a sensor 218. In one example, in response to a sensor 218 demonstrating readings in excess of a predetermined threshold, the monitor application 215 increases a sensitivity of thereof to generate additional readings with greater specificity, accuracy and/or precision. In one or more embodiments, adjustments of range, sensitivity, intensity, power, or other sensor properties are performed based on a stored profile. The profile can be downloaded from the computing environment 203 or another source, for example, during installation or registration of the security device 103.

In another example, in response to determining that a key fob has a low battery level, a notification is transmitted to the user's mobile device 206, the notification instructing the user to replace the battery of or charge the key fob. In another example, in response to determining that a particular version of software is outdated (e.g., and/or that a newer version is available), a notification is transmitted to the mobile device 206 and/or the newer version of software is automatically downloaded from a remote server.

At step 2315, the process 2300 includes determining if a disarming command is received. The disarming command can refer to a command to configure the security device 103 to a disarmed state or to disable an alarm state thereof (e.g., and maintain the armed state). The disarming command can be received remotely via the security application 251 or computing environment 203. The disarming command can be received from a mobile device 206 such as a registered key fob or RFID device.

In response to determining that a disarming command is received, a disarming process 2600 (FIG. 26) can be performed. By the disarming process 2600, the security device 103 can be transitioned to a disarmed state, which may include one or more modes such as a low power or low frequency mode. The process 2300 can repeat step 2315 to continuously listen for a disarming command. In some embodiments, following a predetermined time period (e.g., 1 hour, 1 day, etc.), the disarming command is automatically initiated at the security device 103.

With reference to FIG. 24, shown is a flowchart of an exemplary device setup process 2400. At step 2403, the process 2400 includes inserting the security device 103 into a target site or otherwise attaching the device to the site. In one example, the security device 103 is inserted into a cup-holder of a vehicle 106. In another example, the security device 103 is inserted into a door receptacle. Other non-limiting examples of target sites include, but are not limited to, dashboards, compartments (e.g., glovebox, center console, etc.), air vents, arm rests, buckles, steering wheels, and windows. The security device 103 can be inserted in a disarmed state in which a locking mechanism 230 is disabled and an engaging component thereof is enabled. Inserting the security device 103 can include connecting the security device 103 to a power source 227, such as an auxiliary power outlet. In some embodiments, step 2403 includes attaching one or more sensors 218 and/or remote devices 209 in or around the vehicle 106. For example, a sensor 218 for reading data from an OBD system 128 is inserted into an OBD port. In another example, a camera sensor 218 is secured to the dashboard.

At step 2406, the process 2400 includes securing the position of the security device 103. To secure the position, the locking mechanism 230 can be engaged. For example, the first portion of the security device 103 can be rotated in a first direction (e.g., with respect to the second portion) from a first position to a second position. In this example, the rotation to the second position causes a plurality of legs to extend outward and contact walls of the target site. The continued rotation of the first portion can apply an outward force to the walls that generates frictional forces securing the security device 103 at the target site by providing resistance to upward or lateral forces. In some embodiments, the rotation of the first portion proceeds until a mechanism prevents further rotation. For example, upon the first portion rotating to a predetermined degree and/or upon a predetermined magnitude of outward force being applied by the legs, a slip clutch mechanism can engage and prevent further rotation of the first portion or suspend a linkage between the first portion and the plurality of legs such that the first portion may rotate without increasing the magnitude of the outward force. The slip clutch mechanism can prevent damage to the security device 103 and to the walls of the target site.

In one example, the plurality of legs are extended based on a radially applied outward force from a ridge of a disk that engages with corresponding ridges (and gaps therebetween) of each of the plurality of legs. In this example, the rotation of the disk causes the ridge thereof to apply the radial force to the ridges of each of the plurality of legs, thereby causing the extension. In another example, the plurality of legs are extended based on a force applied to the first portion toward the second portion that results in the downward movement of the first portion being translated into outward movement of the plurality of legs. In another example, the first portion is drawn upwards from the second portion and the upward movement causes generation of a suction or vacuum force between the second portion and a surface of the target site, thereby securing the position of the security device 103. In some embodiments the device position is secured automatically, for example, in response to a command from the mobile device 206 or computing environment 203.

In some embodiments, securing the security device 103 includes disabling an engaging component. The monitor application 215 can detect that the locking mechanism 230 is engaged and, in response to the detection, disable the engaging component. In one example, in response to determining the first portion has been rotated from the first position to the second position, the monitor application 215 determines that the security device 103 has transitioned from an unlocked to a locked state and disables the engaging component. In another example, upon determining that a slip clutch mechanism has been engaged, the monitor application 215 automatically disables the engaging component. The engaging component can remain disabled, for example, until receipt of a command to enable the engaging component.

At step 2409, the process 2400 includes activating the security device 103. Activating the security device 103 includes, for example, pressing a button or providing another input to the security device 103. In some embodiments, the security device 103 is automatically activated upon engaging the locking mechanism 230. The monitor application 215 can receive an activation command from the mobile device 206 or the computing environment 203.

In some embodiments, activating the security device 103 includes transmitting an activation signal. In one example, upon the locking mechanism 230 being engaged, the security device 103 automatically transmits an activation signal to the computing environment 203. In this example, the security service 233 authenticates the activation signal and determines the activation of the security device 103. Authenticating the activation signal can include, for example, initiating a dual authentication, challenge and response, or other process at the security application 251. In another example, upon being connected to the power source 227, the security device 103 automatically transmits an activation signal to the mobile device 206. In this example, the security application 251 authenticates the activation signal and generates a notification alerting the user of the activation. The activation signal can include various data including, but not limited to, an identifier associated with the security device 103, location data from a GPS sensor 218, and other information related to the status of the security device 103 or the vehicle 106.

In at least one embodiment, activating the security device 103 includes downloading a profile for configuring one or more sensors 218 and/or for communicating with an OBD system 257. The profile can be based on a make model, and/or type of the vehicle 106, a user account with which the security device 103 is associated, or other factors. In one example, a type of the vehicle (e.g., compact car) is transmitted to the computing environment 203. In response to receiving the vehicle type, the computing environment 203 retrieves and transmits a particular profile from a plurality of profiles stored in the data store 236 or that is downloaded from a third party service, such as a manufacturer service. In response to receiving the particular profile, the monitor application 215 adjusts sensitivities of a PIR sensor 218A and an ultrasonic sensor 218B to improve a quality of readings therefrom and/or to reduce a likelihood of false positives occurring. For example, based on the profile, a range parameter of the ultrasonic sensor 218B is reduced to conform to the reduced dimensions of the compact car-type vehicle 106. In another example, a profile for a vehicle 106 indicates that the vehicle 106 is a convertible. In this example, audio sensors are deactivated (e.g., to prevent false positives) and a PIR sensor is calibrated to increase a threshold value for detecting intrusions (e.g., to reduce a risk of ambient light triggering a false positive).

A selection can be received for a particular profile from a plurality of profiles and the selected profile can be downloaded and/or transmitted to the security device 103. As an example, a security application 251 generates a user interface comprising a plurality of profiles and metadata corresponding to each of the plurality of profiles (e.g., such as a make, model, etc. with which the profile is associated). In this example, a user selects a particular profile of the plurality of profiles, and the particular profile is transmitted to the security device 103.

The security device 103 can download a profile of the vehicle 106 based on make, model, and other information, such as information provided by a user to a security application 251. In one example, the security device 103 determines that vehicle 106 is manufactured by Buick™. In this example, the monitor application 215 communicates with the security service 233 and/or an external system 259 (e.g., hosted by the manufacturer) to identify and download a profile associated with the make of the vehicle 106. Continuing this example, the profile is processed and one or more calibration parameters are extracted that correspond to one or more sensors 218. The calibration parameter includes, for example, an updated value for a predetermined threshold that is used by audio sensors for detecting window breaks. The threshold can be a frequency and/or decibel threshold that is lowered to the updated value in response to the vehicle 106 having thicker windows than vehicles of other makes (e.g., which may result in sounds of window breaks having a lower frequency and/or lower volume).

At step 2412, the process 2400 includes pairing the security device 103 with the mobile device 206, vehicle 106, a user account, and/or other computing devices or profiles. Pairing can include, but is not limited to, updating user data 239 to indicate an association between the security device 103, the mobile device 206, the vehicle 106. For example, a user can input an identifier from the security device 103 into the security application 251 that transmits a signal to the computing environment 203. In this example, in response to receiving the signal, the computing environment 203 can authenticate the identifier and associate the user with the security device 103 (e.g., by updating user data 239 for a user account). In another example, the user scans a barcode, QR code, or other indicia and the monitor application 215 extracts or generates the identifier of the security device 103 based on the scan. In this example, the security service 233 can receive and authenticate the identifier to pair the device. In at least one embodiment, pairing the security device 103 can include receiving information associated with the vehicle 106 and/or the user. For example, in response to receiving the activation signal, the security application 251 can launch a window requesting a license plate, vehicle make, and vehicle model of the vehicle 106. In another example, the security application 251 can request the user capture a facial image of themselves and/or provide other credentials for use in securing access to the security device 103 and authenticating future commands to the same.

Figure 25:
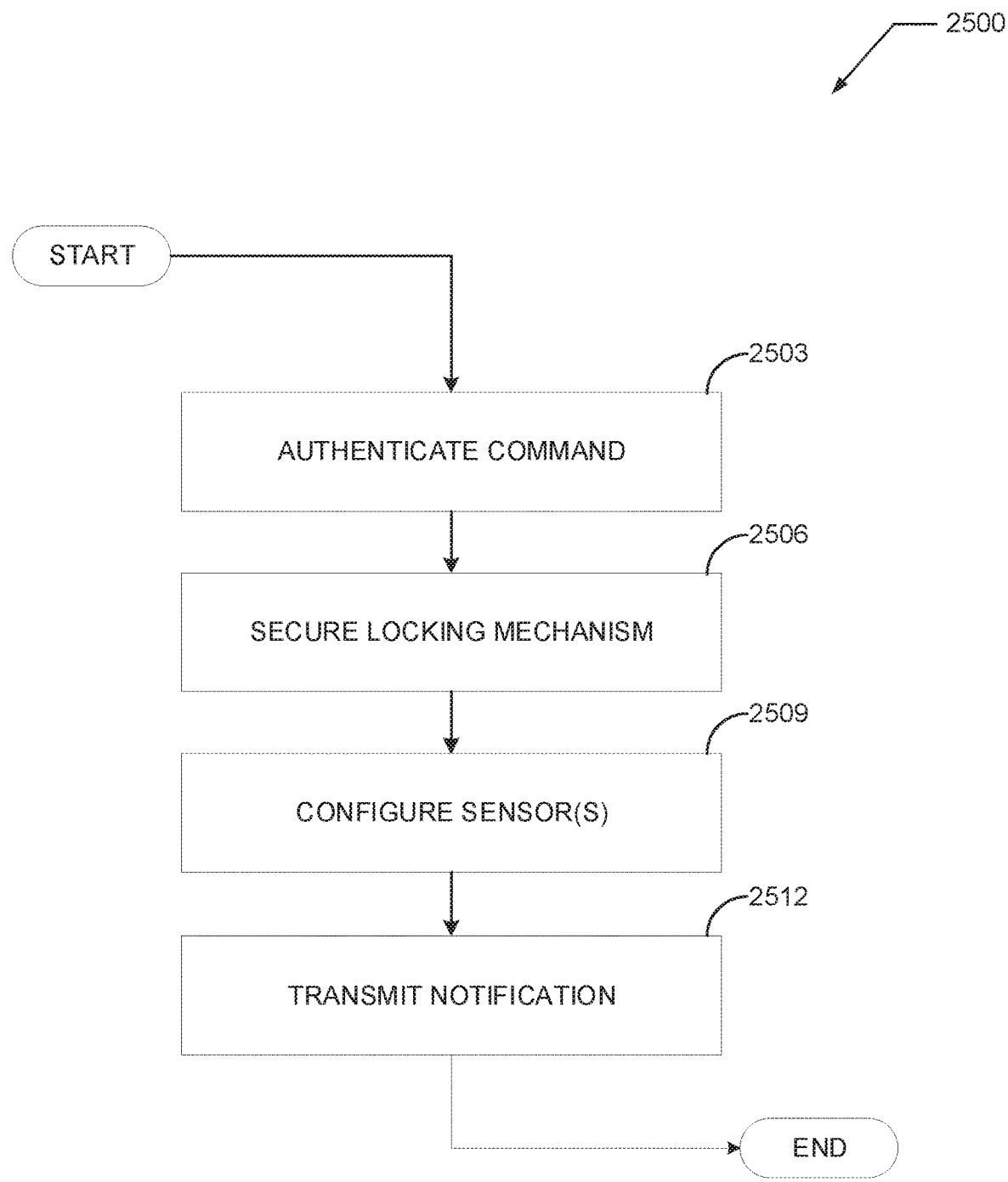
FIG. 25 is a flowchart of an exemplary device arming process according to one embodiment of the present disclosure.

With reference to FIG. 25, shown is a flowchart of an exemplary device arming process 2500. At step 2503, the process 2500 includes authenticating a command. Authenticating the command can include determining that an identifier included therein corresponds to a stored identifier associated with the security device 103 and/or a user account. In another example, authenticating the command includes the security application 251 generating an authentication window on the mobile device 206. In this example, the authentication window can include a field for receiving credentials or other selection for authenticating the command. As another example, the computing environment 203 transmits a request to the mobile device 206 for capture of a facial image of the user. In this example, in response to receiving the facial image, the security service 233 compares the facial image to a stored facial image and authenticates the identity of the user, which results in authentication of the command.

At step 2506, the process 2500 includes securing the locking mechanism 230. For example, the security device 103 can receive a command to disable the engaging component of the locking mechanism 230. In this example, disabling the engaging component can include transmitting an electrical signal to a motor unit causing the rotation of a cam such that a connection plate and one or more pins thereof retract upward from a clutch mechanism (e.g., from apertures within a second disk forming a portion of the clutch mechanism).

At 2509, the process 2500 includes configuring one or more sensors 218. Configuring the sensor 218 can include, but is not limited to, activating the sensor 218, transitioning the sensor 218 to a particular mode, and adjusting other parameters of sensor performance. The security service 233 or monitor application 215 can retrieve configuration data 245 for each sensor 218. Each sensor 218 can receive a command causing a configuration change according to the corresponding configuration data 245. The mobile device 206 can receive selections configuring a mode or other parameter of the sensor 218. In one example, the sensor 218 can be transitioned from a low power mode to a normal- or high-power mode. In another example, the security application 251 can receive a selection to configure the security device 103 to a pet-friendly mode. In this example, the security application 251 can retrieve configuration data 245 associated with the pet-friendly mode and reduce a sensitivity of the sensor 218. In another example, the selection is for a valet-mode and, in response to the selection, one or more sensors 218 are deactivated including, but not limited to, an ultrasonic sensor 218, a PIR sensor 218, a weight sensor 218, and other sensors. In another example, the selection is for a sensitive mode and, in response to the selection, the sensitivity of a microwave sensor 218 increased to detect movement outside of the vehicle 106.

At step 2512, the process 2500 includes transmitting a notification indicating the transition of the security device 103 to the armed state. The notification can comprise a text message, email, pop-up alert, or other electronic message. In one example, the security device 103 transmits a notification to the security application 251 that causes a message, such as "Armed State Initiated," to be rendered on the display 248. In another example, the security application 251 updates a tool bar on the display 248 to include indicia indicating the armed state. In another example, the notification comprises activating a lighting element, such as an LED, on the security device 103 to visually indicate the armed state.

Figure 26:
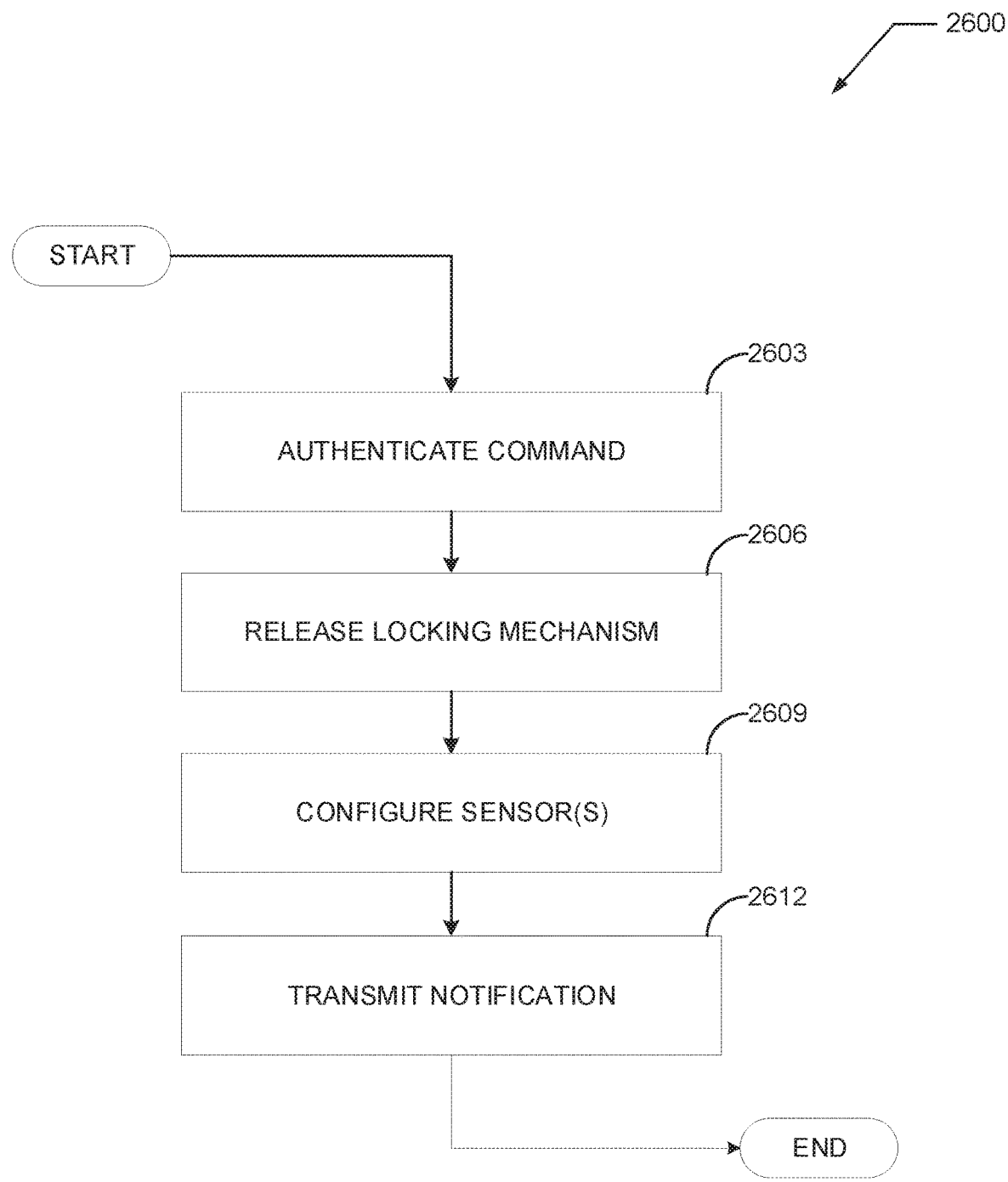
FIG. 26 is a flowchart of an exemplary device disarming process according to one embodiment of the present disclosure.

FIG. 26 is a flowchart of an exemplary device disarming process 2600 according to one embodiment of the present disclosure.

At step 2603, the process 2600 includes authenticating a command. The actions performed to authenticate the command can be generally similar to one or more actions performed at step 2503 of the process 2500 (FIG. 25). For example, the command includes authentication data, such as an identifier and/or credentials, that are verified against user data 239. In another example, the security application 251 initiates an interface for capturing a facial image of a user that is compared to a stored facial image. According to one embodiment, if the command is not authenticated, the process 1400 can be suspended and one or more actions can be taken including, but not limited to, transmitting alerts, storing data, such as a time and transmission source, associated with the command, and other appropriate actions.

At step 2606, the process 2600 includes releasing the locking mechanism 230. In one example, in response to authenticating the command, the engaging component can be enabled, thereby allowing the security device 103 to be removed from a cup holder or other location within the vehicle 106. Enabling the engaging component can include causing a motor unit to rotate a cam such that one or more pins of a connection plate are driven downward and received into a second disk. In some embodiments, the process 2600 omits step 2606 and, thus, the security device 103 remains in a locked state within the vehicle 106 but is configured, as further discussed below, such that alarms and other actions are not taken in response to activities occurring in or around the vehicle 106.

At step 2609, the process 1400 includes configuring one or more sensors 218 such that sensor readings do not cause an alarm to be raised (e.g., in response to the security device 103 determining that a potential intrusion has occurred). The sensor 218 can be configured to one or more modes, such as, for example, a low power mode. In another example, the sensor 218 is configured to a valet mode or pet friendly mode. In some embodiments, the sensor 218 is deactivated.

In at least one embodiment, a second sensor 218 is activated. For example, to conserve power, a camera sensor can be deactivated and an ultrasonic sensor (e.g., which may use less power than the camera sensor) is activated.

At step 2612, the process 1400 includes transmitting a notification indicating the transition of the security device 103 to the disarmed state and/or particular mode (e.g., pet friendly mode, low power mode, etc.). The notification can comprise a text message, email, pop-up alert, or other electronic message. In one example, the security device 103 transmits a notification to the security application 251 that causes a message, such as "Security Device Disarmed," to be rendered on the display 248. The security application 251 updates a tool bar on the display 248 to include indicia indicating the disarmed state and/or particular mode. For example, the display 248 can be updated to include a paw print symbol indicating a pet friendly mode or an unlock symbol indicating the disarmed state. In some embodiments, the notification comprises activating or deactivating a lighting element, such as an LED, on the security device 103 to visually indicate the disarmed state. For example, a color of an LED switches from red to green, thereby indicating the transition from the armed state to the disarmed state.

Figure 27:
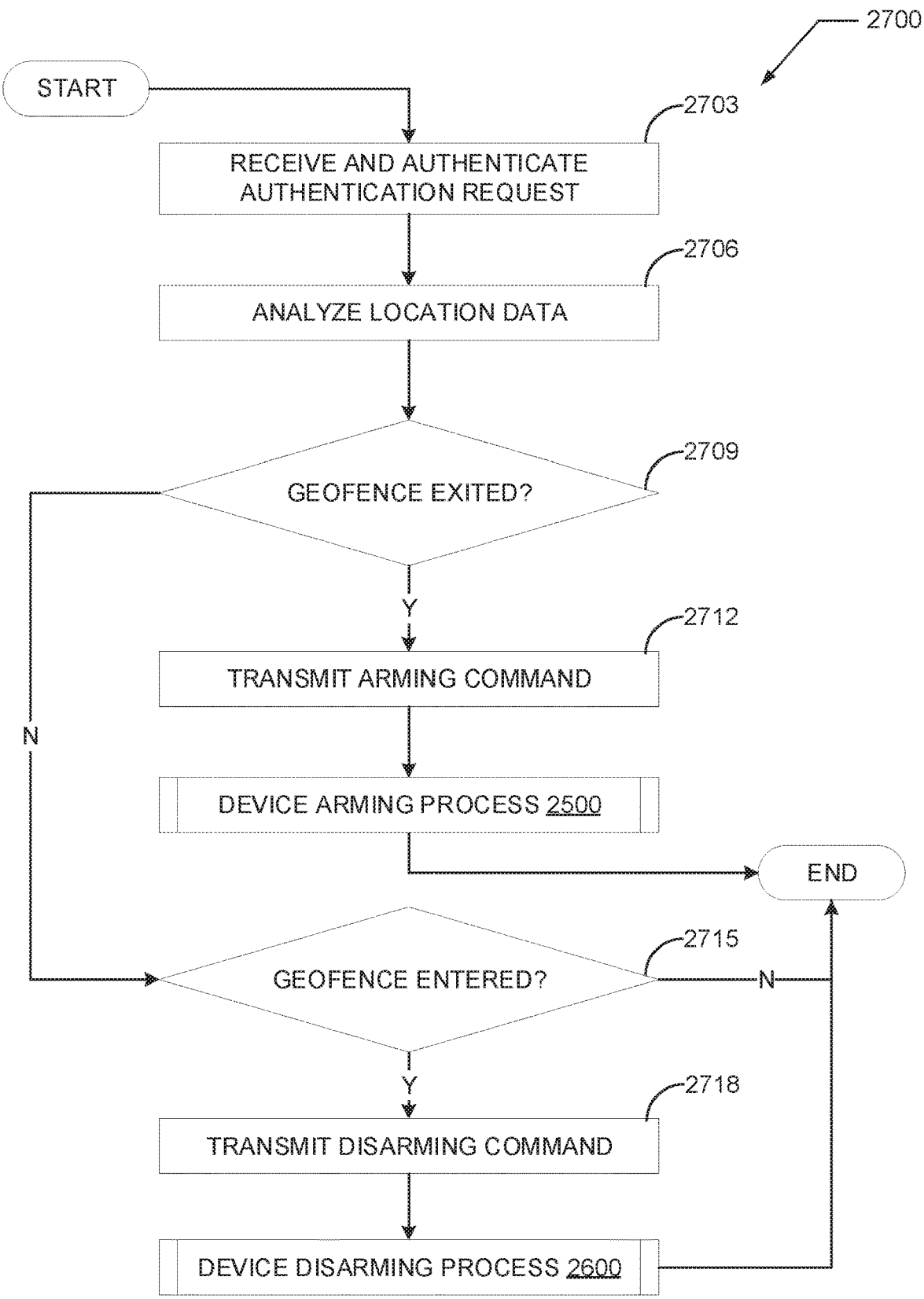
FIG. 27 is a flowchart of an exemplary location-based detection process according to one embodiment of the present disclosure.

With reference to FIG. 27, shown is a flowchart of an exemplary location-based detection process 2700. At step 2703, the process 2700 includes receiving and authenticating an authentication request. Authenticating the authentication request can include extracting and authenticating credentials. In one example, the security service 233 receives an authentication request from the security application 251 that comprises a security device identifier and user credentials. In this example, the security service 233 can extract the security device identifier and user credentials and determine that the extracted information matches corresponding information from user data 239.

At step 2706, the process 2700 includes analyzing location data. The location data can include, for example, a longitude and latitude or other forms of GPS-based coordinates. The location data can be received from a GPS sensor 218 of the mobile device 206 or another device on the person of the user, such as a key fob. In one embodiment, the analysis can include comparing the location data to one or more geofences defining a predetermined area surrounding the vehicle 106. In one example, the security service 233 retrieves a location of the security device 103 and generates a geofence of a predetermined distance around the security device 103. Continuing this example, the security service 233 compares the location data to the geofence to determine if the mobile device 206 or other device (e.g., and thus the user) has moved beyond a predetermined distance from the security device 103. In another example, the security application 251 receives a location of the vehicle 106 from a GPS sensor 218 or OBD system 257. Based on the vehicle location and the location data, the security application 251 computes a distance between the vehicle 106 and the mobile device 206.

At step 2709, the process 2700 includes determining, based on the location data analysis, whether the mobile device 206 (e.g., a key fob or other device) has moved beyond a predetermined range of the vehicle 106. For example, the security service 233 can determine that the mobile device 206 has exited the geofence. In another example, the security application 251 determines that the distance between the vehicle 106 and the mobile device 206 meets or exceeds a predetermined threshold. In one example, the distance may meet or exceed the predetermined threshold when a value is either greater than or equal, or less than or equal to a value of the predetermined threshold. In response to determining that the mobile device 206 has moved beyond the geofence, the process 2700 can proceed to step 2712. In response to determining that the mobile device 206 has not moved beyond the geofence, the process 2700 can proceed to step 2715. In some embodiments, a loss of communication with the mobile device 206 is used to determine that the predetermined geofence has been traversed. For example, in response to a failure to interrogate a key fob, the monitor application 215 determines that the key fob has moved beyond a predetermined distance from the vehicle 106.

At step 2712, the process 2700 includes transmitting an arming command to the security device 103. For example, the computing environment 203 can send an arming command to the security device 103 that initiates the device arming process 2500. The arming command can include one or more modes or other operating parameters. For example, the command can instruct the security device 103 to initiate an armed mode for a predetermined period, after which the security device 103 initiates a disarming mode or transmits a query to the security application 251. In another example, in response to determining that the mobile device 206 has moved beyond a predetermined range of the security device 103, an engagement component of the security device is disabled.

At step 2715, the process 2700 includes determining if the mobile device 206 has moved with a predetermined range of the vehicle 106. In at least one embodiment, the process 2700 proceeds to step 2715 upon determining that the security device 103 is currently in the armed mode. In response to determining that the mobile device 206 has moved within the predetermined range of the vehicle 106, the process 2700 can proceed to step 2718. In response to determining that the mobile device 206 has not moved within the predetermined range, the process 2700 can be suspended.

In one example, the security application 251 determines that the distance between the security device 103 and the mobile device 206 is less than a predetermined minimum. In another example, the security service 233 determines that the mobile device 206 has entered a geofence around the vehicle 106. In another example, in response to determining that the mobile device 206 has moved within a predetermined range of the security device 103, an engagement component of the security device 103 is enabled.

At step 2718, the process 2700 includes transmitting a disarming command to the security device 103. For example, the computing environment 203 can send a disarming command to the security device 103 that initiates the device disarming process 2600.

Figure 28:
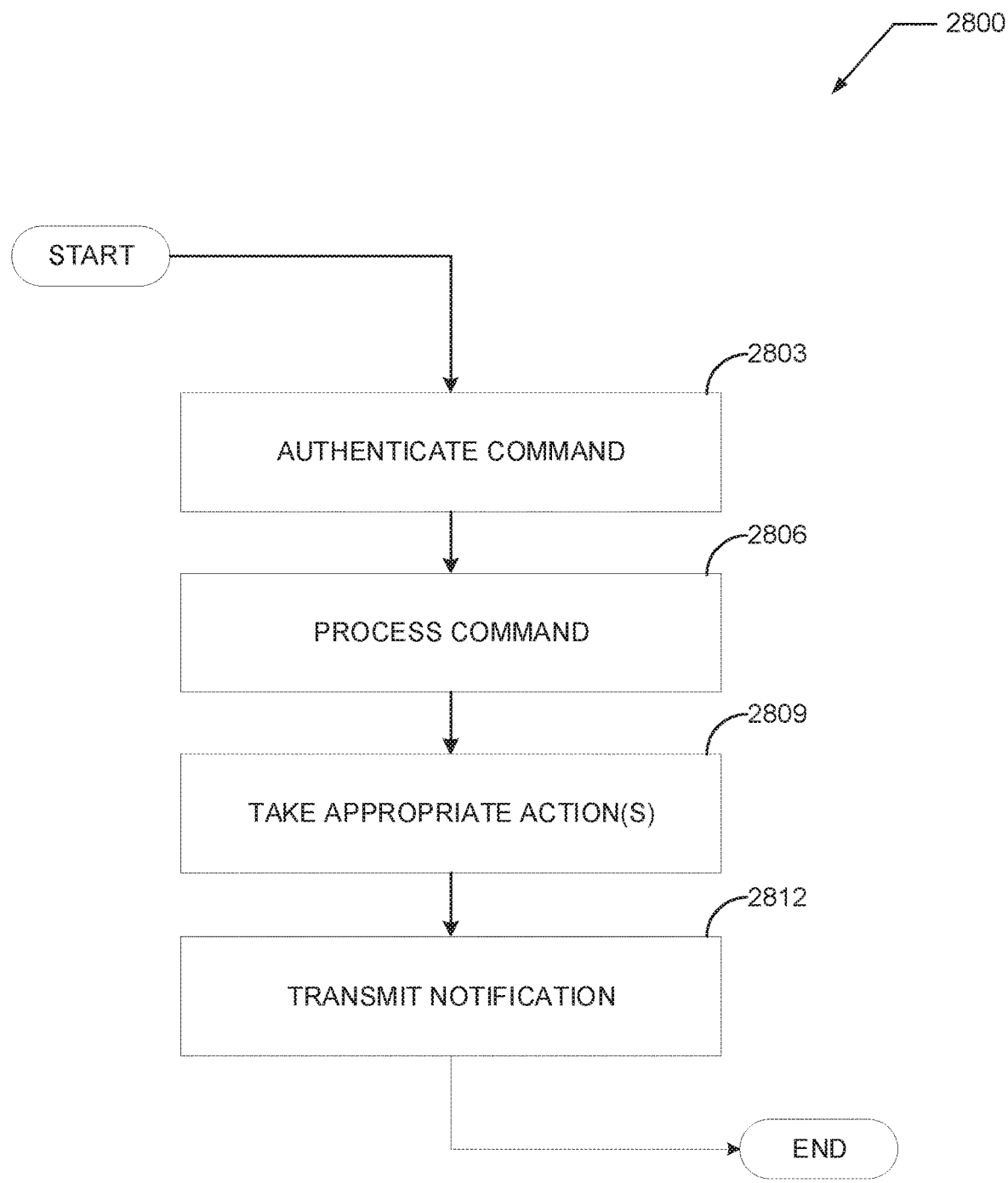
FIG. 28 is a flowchart of an exemplary command process according to one embodiment of the present disclosure.

With reference to FIG. 28, shown is an exemplary command process 2800 according to one embodiment. At step 2803, the process 2800 includes authenticating a command, such as, for example, a command for purchase of a particular product or service from an external system (e.g., associated with a physical or online store, a restaurant, etc.). Authenticating the command can include processing inputs to a security application 251 or processing recording from one or more sensors 218. In one example, an audio sensor 218 records a user announcing a command to purchase a particular product. In this example, the audio stream can be analyzed to extract the voice command (e.g., which may occur at the security service 233, security application 251, or a third-party service). In another example, a video sensor 218 records a user performing a particular gesture. In this example, the video stream is analyzed to extract the particular gesture and the particular gesture is compared to one or more stored gestures to extract the command.

The command can be authenticated in a manner generally similar to manners in which commands are authenticated at step 2503 (see FIG. 25) or step 2603 (see FIG. 26). In one example, authenticating a voice command includes performing a voice recognition technique to confirm that the voice command matches a voice associated with a particular user account. In another example, authenticating a gesture-based command includes performing a biometric recognition technique to confirm that the gesturing user is the same user associated with a particular user account.

The command can be authenticated based on location data and/or detection of a mobile device. For example, a voice command for purchase of a food item at a drive-thru restaurant is authenticated based on determining that location data from a GPS sensor 218 (or from an OBD system 257) is within a predetermined proximity to the drive-thru restaurant (e.g., thereby indicating the security device 103, vehicle 106, mobile device 206, and/or user is within the predetermined proximity). As another example, a gesture command is authenticated based on detection of a near-field communication device. In some embodiments, a dual verification process is used to authenticate the command. For example, in response to processing a voice command, the monitor application 215 can transmit a signal to the security application 251 causing a user interface to be rendered on an associated mobile device 206. Continuing this example, based on a confirmation, password, image, etc., input by the user to the user interface, the command is authenticated.

The command can be received from a POS device 161, for example, in response to the security device 103 moving within a predetermined range of the POS device 161 or another location, such as a store. In an exemplary scenario, the vehicle 106 moves within a predetermined proximity of a POS device 161 at a drive thru window of a restaurant. In response to the vehicle 106 moving within the predetermined proximity, the POS device 161 transmits a command, including a POS identifier and a request for payment processing details, to the security device 103. The security device 103 authenticates the command by transmitting the POS identifier and location data to a commerce service 263. The commerce service 263 confirms that the POS identifier and location data match a stored POS identifier associated with the location and, in response to the confirmation, transmits an authentication signal to the security device 103.

In various embodiments, a command to generate a random or pseudo-random number is initiated and authenticated. In one example, a security application 251 initiates a command to generate a pseudo-random number for verifying a firmware image of the security device 103.

At step 2806, the process 2800 includes processing the command. Processing the command can include, for example, determining a particular product or service corresponding to the command. In one example, the command is "Order a Combo No. 2 from Taco King," and, in response, the monitor application 215 identifies a particular external system 259 (e.g., associated with Taco King) and a particular product, Combo No. 2. Continuing this example, the monitor application 215 transmits a signal to the security application 251 that, in response, causes a user interface to be updated with a summary of the command. In this same example, the security application 251 can receive a response from the user that confirms or rejects the retrieved external system 259 or product. In a similar example, a POS device 161 receives the processed command (e.g., via NFC transmission from the security device 103 or other wireless means) and updates a display near the vehicle 106 to include a summary of the command.

Additional commands revising or adding to the first command can also be received, authenticated and processed. For example, an audio sensor can record a user announcing "Add a Large Soda," and, in response, the monitor application 215 identifies the requested product, large soda, and causes the security application 251 to update the interface to include the additional product. As another example, a camera sensor can record a user making a thumbs-down gesture and, in response, the monitor application 215 can cause the security application 251 to suspend the user interface.

In at least one embodiment, processing the command includes identifying one or more firmware images associated with one or more security devices 103, sensors 218, remote devices 209, or other devices. In some embodiments, processing the command includes generating a random or pseudo-random number that is used, for example, as a seed for generating a local hash of the identified firmware.

At step 2809, the process 2800 includes performing one or more actions based on the command. The one or more actions can include, but are not limited to, generating and/or transmitting one or more orders for requested products or services to an external system, processing a request for payment from the external system (e.g., as received from a near-field communication device or a remote server), retrieving and transmitting payment processing information, authenticating payment processing information, and authorizing payment for an order.

In one example, the monitor application 215 transmits a request to an online ticketing service (e.g., hosted by an external system 259) for two tickets to a concert. In this example, in response to receiving the request, the external system 259 generates an order for the two tickets and transmits a request for payment. Continuing this example, in response to receiving the request for payment, the monitor application 215 retrieves and transmits one or more payment credentials (e.g., credit card information, wallet ID, etc.) to the external system 259 or another third-party payment processor. The one or more payment credentials can be retrieved from user data 239 or can be input by the user to the security device 103 (e.g., vocally) to the security application 251 (e.g., via selections on a user interface. In some embodiments, a dual verification process is initiated in which the user is instructed to review and confirm the payment credentials. Continuing the above example, the external system 259 authenticates and processes the transaction and the two tickets are transmitted to the user's mobile device 206.

In a similar example, the payment processing information is transmitted to a nearby POS device 161, which communicates with a commerce service 263 to initiate an order for the two tickets. In this example, in response to the communication, the POS device 161 transmits a request for payment credentials (e.g., credit card number, expiration, name, etc.) to the security device 103, which authenticates the request and retrieves and transmits the payment credentials to the POS device 161. In the same example, the POS device 161 generates and processes the order using the payment credentials. Continuing this example, in response to successfully processing the order, the POS device 161 transmits a signal to the commerce system 263 that causes the requested tickets to be transmitted to a mobile device 206 associated with the security device 103.

In another example, the POS device 161 is proximate to a drive thru window of a restaurant. In this example, a user associated with a vehicle 106 has placed an order for food at the restaurant and the vehicle 106, which includes a security device 103, is moved within a predetermined range of the POS device 161. In response to the movement, the POS device 161 automatically detects the security device 103 and requests payment credentials. The request is communicated to the user via a notification pushed to a security application 251. In response to the user confirming the request at the security application 251, the security device 103 downloads a profile associated with the user and transmits payment credentials therein to the POS device 161. The POS device 161 processes the purchase of the food and the security device 103 generates an audible notification in response to receiving a signal indicating the successful processing.

In at least one embodiment, a seed is generated and a local hash of an identified firmware image is generated using the seed. In one example, the seed is a pseudo-random number and the local hash is generated by a security service 233. A request to hash a firmware image being executed on the security device 103 (or another device) can be transmitted. The request can include the pseudo-random number for use as a seed in hashing the firmware image. In one example, the security service 233 identifies a firmware image associated with a security device 103, generates a pseudo-random number, generates a local hash of the associated firmware image, and transmits a request to a monitor application 215 to generate a hash of the firmware image being executed on the security device 103 (e.g., using the pseudo-random number as a seed). In this example, in response to the request, the monitor application 215 hashes the firmware image using the pseudo-random number and transmits the result of the hash to the security service 233.

A result of the hashing of the executed firmware image can be compared to the local hash and one or more remedial actions can be performed based on the comparison. For example, in response to the result differing from the local hash, the security device 103 is disabled. In a similar example, an alert is transmitted to a mobile device 206 associated with the security device 103, the alert indicating that the security device 103 requires an update. In another example, an update is automatically initiated at the security device 103. In this example, an optimal version of the firmware image (and/or one or more intermediary images) are identified and downloaded to the security device 103 and the security device 103 initiates an update for transitioning the current version of the firmware to the optimal version (e.g., which may include first transitioning to the one or more intermediary versions).

At step 2812, the process 2800 includes transmitting a notification. For example, in response to the external system processing the requested transaction, a summary of the initial command and/or the transaction can be transmitted as a push notification to the user's mobile device 206. In another example, the security application 251 can generate a notification indicating the execution of the command. In another example, the security device 103 can emit a particular sound and/or emit a particular light color or pattern to indicate the execution of the command. In this example, the security device 103 emits a green light to indicate a successful execution of the command or a red light to indicate an unsuccessful execution of the command (e.g., a failure to process the transaction, identify a requested product, communicate with an external system, etc.). In another example, a notification is transmitted to the user's mobile device 206 indicating the update to the firmware image of the security device 103. In some embodiments, the security device 103 can play one or more recorded messages, such as, for example, a query for additional commands or an explanation for the failed execution of the command.

Figures 29A, 29B, 29C:
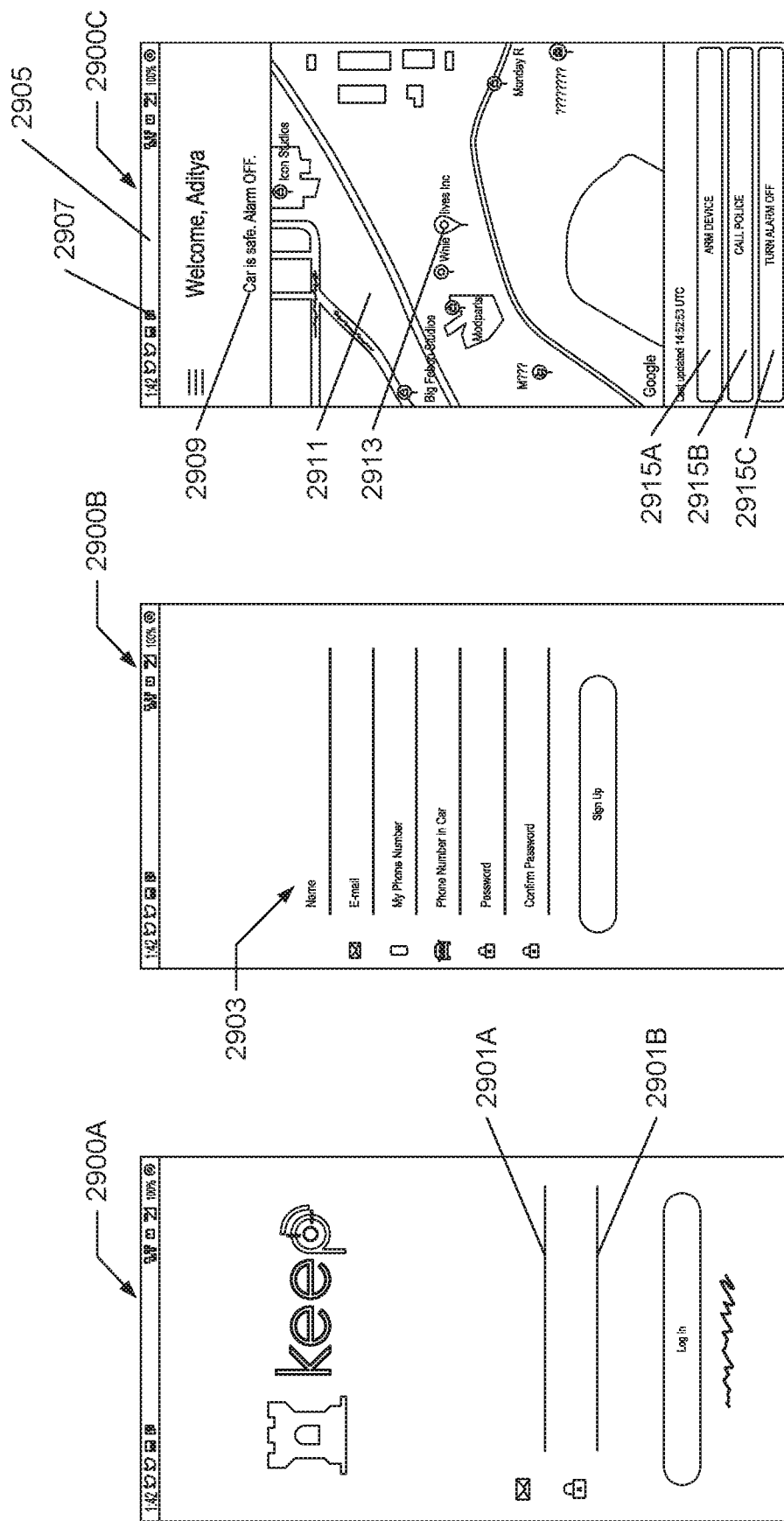
FIGS. 29A-C are exemplary user interface views of a mobile application according to various embodiments of the present disclosure.

FIGS. 29A-C are exemplary windows of a mobile application according to various embodiments of the present disclosure. In one example, the windows shown in FIGS. 29A-C are initiated by a security application 251 on a display 248 of a mobile device 206 (see FIG. 2).

FIG. 29A shows an exemplary login window 2900A of the mobile application. The login page 2900A can include text fields 2901A, 2901B for accepting user login credentials (e.g., username, password, etc.), or new users may select another field (not shown) to create/register new accounts at a registration window 2900B (FIG. 29B). In some embodiments, the identity of the user is verified using one or more techniques, including, but not limited to, multi-factor authentication, biometric authentication, or other enhanced security features.

FIG. 29B shows an exemplary registration window 2900B by which a user may establish a new account for association with a particular security device. The registration window 2900B can include a plurality of fields 2903 for receiving various information. The various information can include one or more of, but is not limited to, name, email, telephone number, username, password, automobile make and model, license plate number, driver's license number, security device identification number, facial image, etc.

FIG. 29C shows an exemplary control window 2900C by which a user may control various functions of the mobile application and one or more security devices (e.g., security devices 103). The window 2900C includes a notification bar 2905 that can be updated to include one or more indicia 2907. The indicia 2907 can communicate a current status of a security device. For example, a lock symbol can be displayed in response to the security device being configured to an armed state. In another example, a paw print symbol in response to the security device (or one or more connected sensors) being configured to a pet-friendly mode.

The window 2900C can include a notification 2909 that provides a text-based summary of a status of the security device. In one example, the notification 2909 reads "Care is safe. Alarm off." to indicate that a security device (installed within a vehicle) is in communication with the security application 251 and that the security device is configured in a disarmed state. In another example, the notification 2909 reads "Potential intrusion detected. Alarm on." to indicate that the security device detected a potential intrusion event and is configured in an armed state.

The window 2900C can include a map 2911 that can display a pin 2913 corresponding to a current location of the security device. The map 2911 can include multiple pins 2913 corresponding to locations of multiple security devices (e.g., each associated with a shared user account) and/or locations of mobile devices, such as a user's smartphone. In at least one embodiment, the map 2911 includes a geofence (not shown) defining a predetermined area surrounding the security device. The user may adjust the geofence via inputs provided to the map 2911. For example, the user may slide a finger across the map 2911 to expand or contract the geofence.

The window 2900C can include a plurality of selectable fields 2915A, 2915B, 2915 that each correspond to a particular command or action. In one example, the field 2915A is selected to initiate an arming of the security device. In another example, the field 2915B is selected to contact law enforcement. In this example, in response to the field 2915B being selected, the security application 251 launches a dialing window (not shown) that is preconfigured with a number for local law enforcement (e.g., determined based on a current location of the security device). In another example, the field 2915C is selected to deactivate an alarm function of the security device. In this example, the selection of the field 2915C can cause a second set of fields to be rendered that include options for configuring the security device to be configured to various modes, such as a pet-friendly, valet, or low power mode. It will be understood and appreciated that any of the various functions and modes of security devices described herein may include corresponding fields displayable within the window 2900C.

Figure 30A:
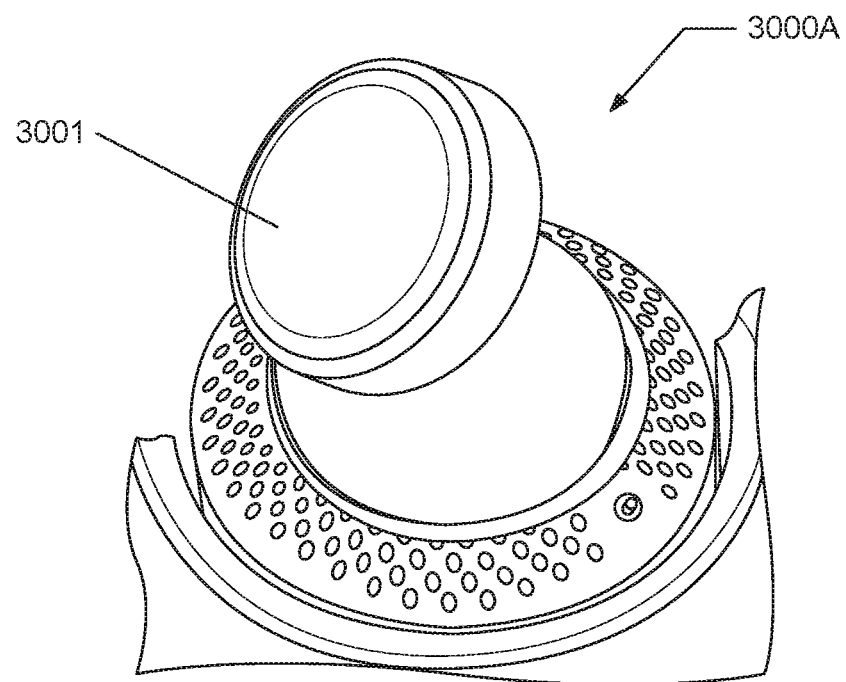
FIGS. 30A-D are exemplary perspective views of a first portion of a security device, according to various embodiments of the present disclosure.

FIG. 30A shows a perspective view of an exemplary top portion 3000A. The top portion 3000A can be included in the security device 103 in place of the top portion 303. The top portion 3000A can include a mount 3001 that can be configured to receive and hold a mobile device 206. The mount 3001 can include high friction, adhesive, and/or magnetic materials for securing the position of the mobile device 206. The mount 3001 can be configured to rotate independently from the top portion 3000A.

Figure 30B:
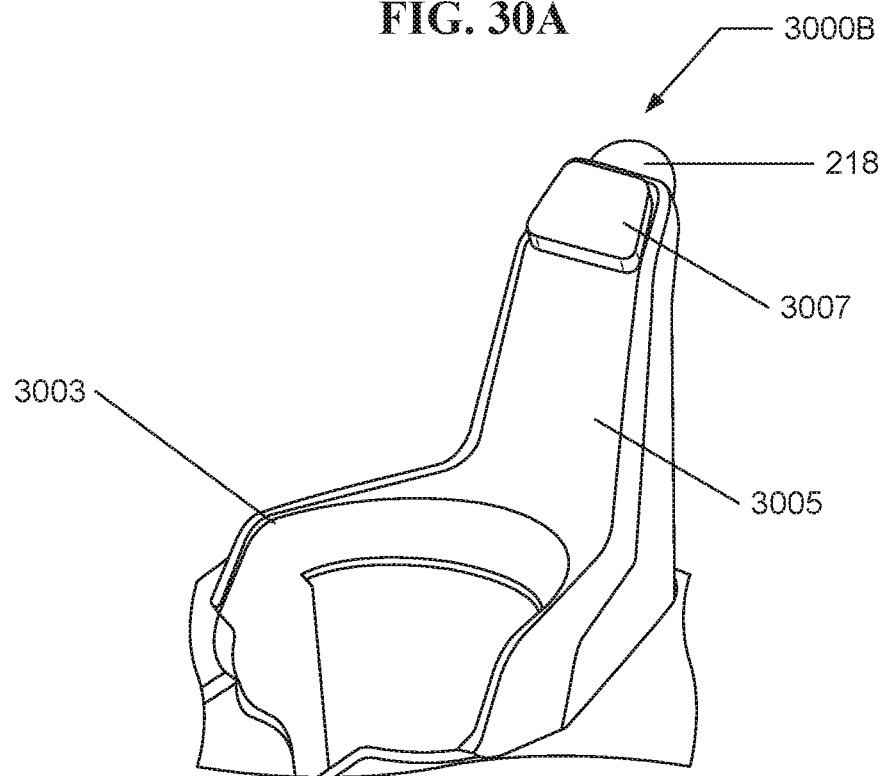

FIG. 30B shows a perspective view of an exemplary top portion 3000B. The top portion 3000B can be included in the security device 103 in place of the top portion 303. The top portion 3000B can include a cup holder 3003 configured to receive a beverage or other item. The top portion 3000B can include a mount 3005 for receiving and securing a mobile device 206. One or more sensors 218 can be attached to the mount 3005. For example, a motion sensor can be attached at or near the top of the mount 3005. The mount 3005 can include a portion 3007 that comprises friction-generating, magnetic, and/or adhesive materials for securing the position of the mobile device 206.

Figure 30C:
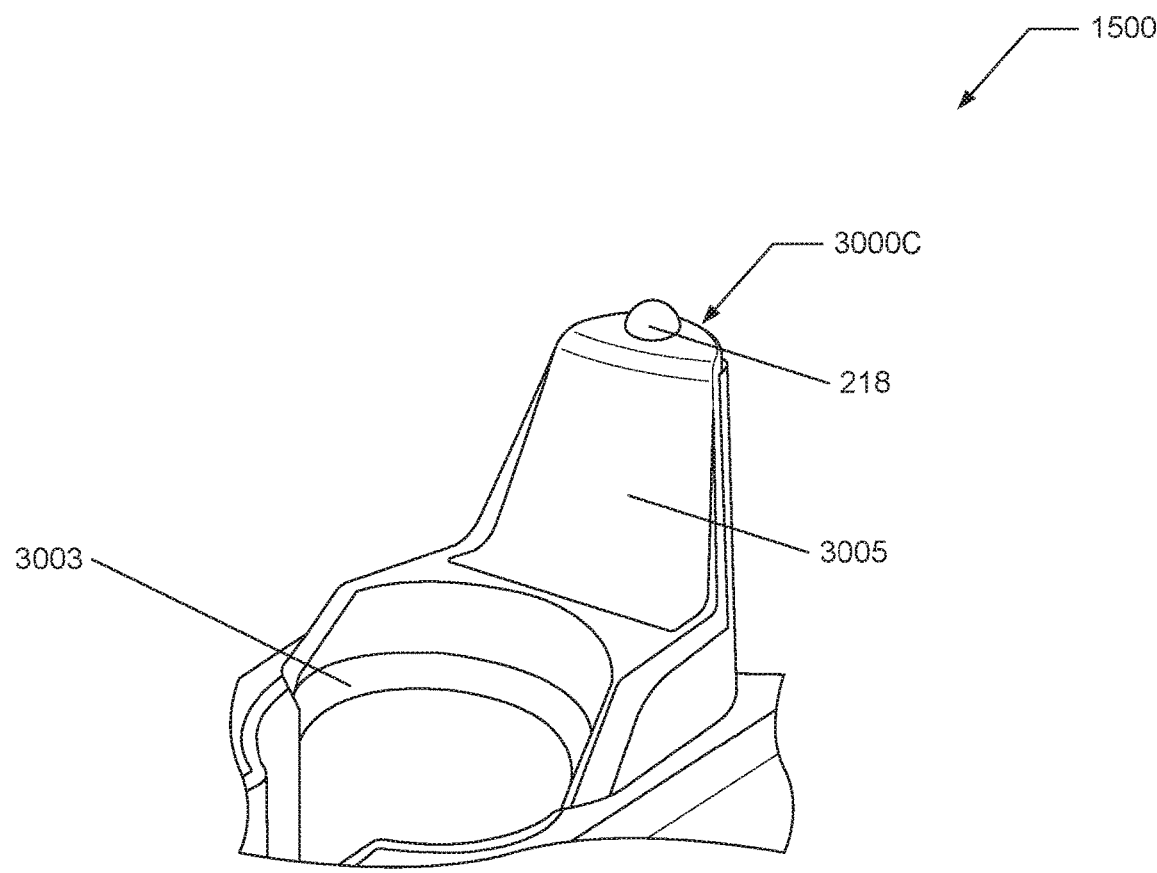

FIG. 30C shows a perspective view of an exemplary top portion 3000C. The top portion 3000C can be included in the security device 103 in place of the top portion 303. The top portion 3000C can include a cup holder 3003 and a mount 3005, and can be configured to receive a sensor 218.

Figure 30D:
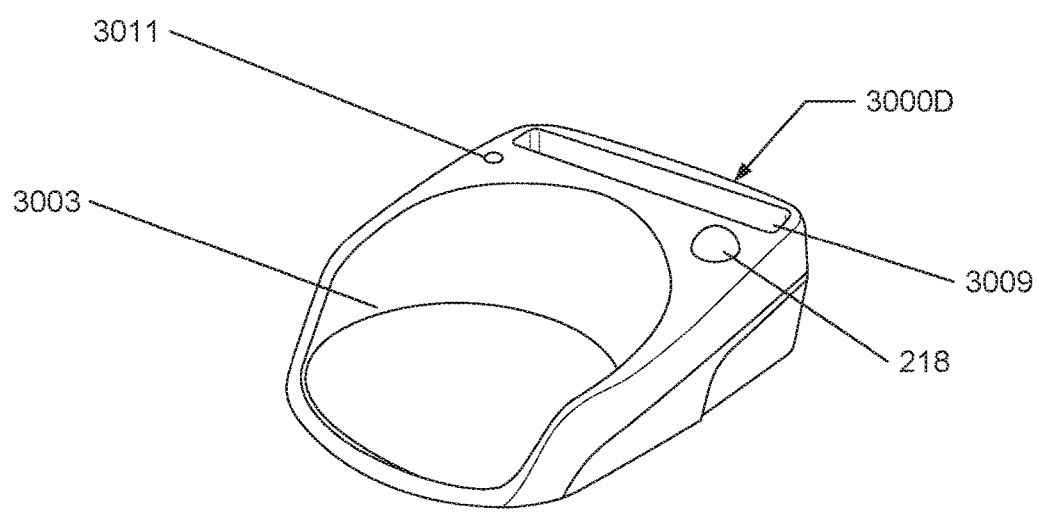

FIG. 30D shows a perspective view of an exemplary top portion 3000D. The top portion 3000D can be included in the security device 103 in place of the top portion 303. The top portion 3000D can include a cup holder 3003 and/or a slot 3009. The slot 3009 can be sized to accommodate a mobile device 206 or other objects, such as business cards, credit cards, etc. The top portion 3000D can include an indicator 3011 that includes one or more lighting elements for signaling a status of the security device 103.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multiprocessor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence (s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Aspects, features, and benefits of the claimed devices and methods for using the same will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the devices and methods for using the same to the precise forms disclosed. Many modifications and variations are possible in light of the above teaching.

The embodiments were chosen and described in order to explain the principles of the devices and methods for using the same and their practical application so as to enable others skilled in the art to utilize the devices and methods for using the same and various embodiments and with various modifications as are suited to the particular use contemplated. Alternative embodiments will become apparent to those skilled in the art to which the present devices and methods for using the same pertain without departing from their spirit and scope. Accordingly, the scope of the present devices and methods for using the same is defined by the appended claims rather than the foregoing description and the exemplary embodiments described therein.

What is claimed is:

1. A vehicle theft-prevention apparatus, comprising:
a body comprising a first portion and a second portion, the first portion configured to rotate about the second portion to affix the body into a cup holder of a vehicle;
a plurality of sensors configured to sense measurements proximate to the vehicle;
a wireless transceiver; and
at least one computing device coupled to the plurality of sensors and the wireless transceiver, the at least one computing device configured to:
read a plurality of first measurements of a first sensor of the plurality of sensors;
determine that a key fob moved outside of a range of the first sensor based on the plurality of first measurements from the first sensor;
in response to the key fob moving outside of the range of the first sensor, transition to an armed state;
read a plurality of second measurements from a subset of the plurality of sensors;
transition to an unarmed state based on communicating with the key fob; and
in response to entering the unarmed state, disable measurements from the plurality of sensors.

2. The vehicle theft-prevention apparatus of claim 1, wherein the at least one computing device is further configured to:
determine that a battery level of the key fob has fallen below a threshold; and
send a notification to change a battery in the key fob based on the battery level falling below the threshold.

3. The vehicle theft-prevention apparatus of claim 1, wherein the at least one computing device is further configured to:
determine that a battery level of the key fob; and
send the battery level to at least one server.

4. The vehicle theft-prevention apparatus of claim 1, wherein the at least one computing device is further configured to:
calculate a rolling code for the key fob; and
determine that a person has entered the vehicle based on authenticating the rolling code of the key fob.

5. The vehicle theft-prevention apparatus of claim 1, wherein the plurality of first measurements are read by interrogating the key fob.

6. The vehicle theft-prevention apparatus of claim 1, wherein the at least one computing device is further configured to:
determine that at least one door of the vehicle is open; and
in response to the at least one of the vehicle being open, transition to the unarmed state.

7. The vehicle theft-prevention apparatus of claim 1, wherein the at least one computing device is further configured to:
determine that at least one door lock of the vehicle is disengaged; and
in response to at least one door handle being disengaged, transition to the unarmed state.

8. The vehicle theft-prevention apparatus of claim 1, wherein the at least one computing device is further configured to determine that a person has entered the vehicle based on the plurality of second measurements.

9. The vehicle theft-prevention apparatus of claim 1, wherein the at least one computing device is further configured to:
determine that the vehicle is running based on a status related to the vehicle; and
in response to the vehicle running, transition to the unarmed state.

10. A vehicle theft-prevention apparatus, comprising:
a body comprising a first portion and a second portion, the first portion configured to rotate about the second portion to affix the body into a cup holder of a vehicle;
at least one computing device configured to at least:
establish communication with an external device;
transition to an unarmed state based on communicating with the external device; and
in response to entering the unarmed state, disable measurements from a plurality of sensors.

11. The vehicle theft-prevention apparatus of claim 10, wherein the at least one computing device is further configured to:
determine that a person has left the vehicle based on loss of the communication with the external device; and
transition to an armed state based on the loss of the communication.

12. The vehicle theft-prevention apparatus of claim 10, further comprising a locking mechanism embedded within the second portion.

13. The vehicle theft-prevention apparatus of claim 10, wherein the external device comprises at least one of: a smart phone and a smart watch.

14. The vehicle theft-prevention apparatus of claim 10, wherein the at least one computing device is further configured to determine a status related to the vehicle comprising whether the external device is within a range of the vehicle.

15. A method, comprising:
rotating a first portion of a body about a second portion of the body to affix the body into a cup holder of a vehicle;
establishing, via at least one computing device disposed within the body, communication with an external device;
transitioning, via the at least one computing device, to an unarmed state based on communicating with the external device; and
in response to entering the unarmed state, disabling, via the at least one computing device, measurements from a plurality of sensors.

16. The method of claim 15, further comprising:
determining, via the at least one computing device, that a person has left the vehicle based on loss of the communication with the external device; and
transitioning, via the at least one computing device, to an armed state based on the loss of the communication.

17. The method of claim 15, wherein the second portion comprises a locking mechanism embedded within.

18. The method of claim 15, wherein the external device comprises at least one of: a smart phone and a smart watch.

19. The method of claim 15, further comprising:
calculating a rolling code for the external device; and
determine that a person has entered the vehicle based on authenticating the rolling code of the external device.

20. The method of claim 15, further comprising:
determining that a battery level of the external device; and
sending the battery level to at least one server.

* * * * *